US012142166B1

(12) United States Patent
Kraft et al.

(10) Patent No.: US 12,142,166 B1
(45) Date of Patent: Nov. 12, 2024

(54) WRISTBAND LABEL FORM WITH UNEVEN LAMINATION PANELS

(71) Applicant: Ward-Kraft, Inc., Fort Scott, KS (US)

(72) Inventors: Roger Kraft, Fort Scott, KS (US); Gina Staudinger, Louisburg, KS (US)

(73) Assignee: Rekon, LLC, Pittsburg, KS (US)

( * ) Notice: Subject to any disclaimer, the term of this patent is extended or adjusted under 35 U.S.C. 154(b) by 0 days.

(21) Appl. No.: 18/227,853

(22) Filed: Jul. 28, 2023

Related U.S. Application Data

(63) Continuation of application No. 17/659,140, filed on Apr. 13, 2022, now Pat. No. 11,715,394, which is a continuation-in-part of application No. 17/588,405, filed on Jan. 31, 2022, now Pat. No. 11,694,580, which is a continuation of application No. 17/090,883, filed on Nov. 5, 2020, now Pat. No. 11,238,759, which is a continuation-in-part of application No. 17/013,065, filed on Sep. 4, 2020, now Pat. No. 11,232,719, which is a continuation-in-part of application No. 16/418,723,
(Continued)

(51) Int. Cl.
*G09F 3/00* (2006.01)
*G09F 3/02* (2006.01)

(52) U.S. Cl.
CPC ............ *G09F 3/0288* (2013.01); *G09F 3/005* (2013.01); *G09F 2003/0201* (2013.01); *G09F 2003/0267* (2013.01)

(58) Field of Classification Search
CPC ................... G09F 3/0288; G09F 3/005; G09F 2003/0201; G09F 2003/0267; G09F 3/14
See application file for complete search history.

(56) References Cited

U.S. PATENT DOCUMENTS

| | | |
|---|---|---|
| 230,455 A | 7/1880 | Wilcox |
| 919,983 A | 4/1909 | Walsh |

(Continued)

FOREIGN PATENT DOCUMENTS

| | | |
|---|---|---|
| DE | 1039431 B | 9/1958 |
| EP | 0996106 A1 | 4/2000 |

(Continued)

OTHER PUBLICATIONS

Notice of Allowance, dated Sep. 16, 2022, 8 pages, issued in U.S. Appl. No. 17/307,622.

(Continued)

*Primary Examiner* — Cassandra Davis
(74) *Attorney, Agent, or Firm* — AVEK IP, LLC

(57) ABSTRACT

A combination wristband and label form. A combination wristband and label includes a front side formed of paper and a back side. The back side has a polyester section having a first section and a second section. The first section is removable from the form and the second section is permanently adhered to the form. The first section comprises a removable wristband and a removable extender. The wristband has a first panel and a second panel, a first strap extending outboard from said first panel and a second strap extending outboard from said second panel. The first panel has the printable area defined therein and a surrounding area surrounds the printable area. A size of the printable area is disparate from a size of said first panel.

16 Claims, 48 Drawing Sheets

Related U.S. Application Data filed on May 21, 2019, now Pat. No. 10,997,874, which is a continuation-in-part of application No. 15/403,922, filed on Jan. 11, 2017, now Pat. No. 10,297,170, which is a continuation of application No. 15/339,105, filed on Oct. 31, 2016, now Pat. No. 10,249,221.

(60) Provisional application No. 63/174,381, filed on Apr. 13, 2021, provisional application No. 62/930,646, filed on Nov. 5, 2019, provisional application No. 62/895,547, filed on Sep. 4, 2019, provisional application No. 62/257,086, filed on Nov. 18, 2015, provisional application No. 62/256,465, filed on Nov. 17, 2015, provisional application No. 62/247,863, filed on Oct. 29, 2015.

(56) References Cited

U.S. PATENT DOCUMENTS 922,948 A 5/1909 Portmore
1,039,431 A 9/1912 Moore
1,383,335 A 7/1921 Stanley
1,517,456 A 12/1924 Edward
2,054,227 A 9/1936 Shelby
2,073,280 A 3/1937 Lederer
2,553,676 A 5/1951 Jacob
2,641,074 A 6/1953 Richmond
2,687,978 A 8/1954 Vogt
2,914,166 A 11/1959 Bihler
3,153,869 A 10/1964 Twentier
3,197,899 A 8/1965 Twentier
3,402,808 A 9/1968 Anthony
3,517,802 A 6/1970 Petrie
3,585,743 A 6/1971 Jeffers
3,660,916 A 5/1972 Mcdermott et al.
3,854,229 A 12/1974 Morgan
4,004,362 A 1/1977 Barbieri
4,078,324 A 3/1978 Wiebe
4,138,234 A 2/1979 Kubesa
4,179,833 A 12/1979 Knodel
4,226,036 A 10/1980 Krug
4,233,715 A 11/1980 McDermott
4,314,415 A 2/1982 Woskin
4,318,234 A 3/1982 Charles et al.
4,370,370 A 1/1983 Iwata et al.
4,565,731 A 1/1986 Komatsu et al.
4,612,718 A 9/1986 Golub et al.
4,627,994 A 12/1986 Welsch
4,630,384 A 12/1986 Breen
4,682,431 A 7/1987 Kowalchuk
4,696,843 A 9/1987 Schmidt
4,783,917 A 11/1988 Smith et al.
4,829,604 A 5/1989 Allen et al.
4,854,610 A 8/1989 Kwiatek
4,855,277 A 8/1989 Walter
4,914,843 A 4/1990 DeWoskin
4,941,210 A 7/1990 Konucik
4,950,638 A 8/1990 Yuyama et al.
4,956,931 A 9/1990 Selke
D312,654 S 12/1990 Giordano
4,978,144 A 12/1990 Schmidt et al.
4,991,337 A 2/1991 Solon
RE33,616 E 6/1991 Welsch
5,026,084 A 6/1991 Pasfield
5,031,382 A 7/1991 Boyle
5,045,426 A 9/1991 Maierson et al.
5,048,870 A 9/1991 Mangini et al.
5,103,583 A 4/1992 VanErmen
5,135,789 A 8/1992 Schmidt
5,222,823 A 6/1993 Conforti et al.
5,227,004 A 7/1993 Beiger
5,227,209 A 7/1993 Garland
5,283,969 A 2/1994 Weiss
5,311,689 A 5/1994 Lindsey
5,318,326 A 6/1994 Garrison
5,331,140 A 7/1994 Stephany
5,351,993 A 10/1994 Wright et al.
5,364,133 A 11/1994 Hofer et al.
5,370,420 A 12/1994 Khatib et al.
5,381,617 A 1/1995 Schwartztol et al.
5,383,686 A 1/1995 Laurash
5,395,667 A 3/1995 Ohno et al.
5,401,110 A 3/1995 Neeley
5,418,026 A 5/1995 Dronzek, Jr. et al.
5,421,942 A 6/1995 Hoffmann
5,423,574 A 6/1995 Forte-Pathroff
5,427,416 A 6/1995 Birch
5,448,846 A 9/1995 Peterson et al.
5,457,906 A 10/1995 Mosher, Jr.
5,486,021 A 1/1996 Laurash
5,486,436 A 1/1996 Dale
5,509,693 A 4/1996 Kohls
5,509,694 A 4/1996 Laurash et al.
5,518,787 A 5/1996 Konkol
5,524,934 A 6/1996 Schwan et al.
5,547,227 A 8/1996 Laurash et al.
5,560,657 A 10/1996 Morgan
5,562,789 A 10/1996 Hoffmann
5,581,924 A 12/1996 Peterson
5,586,788 A 12/1996 Laurash
5,595,404 A 1/1997 Skees
5,596,202 A 1/1997 Arakawa
5,598,970 A 2/1997 Mudry et al.
5,601,222 A 2/1997 Haddad
5,601,313 A 2/1997 Konkol et al.
5,630,627 A 5/1997 Stewart
5,637,369 A 6/1997 Stewart
5,648,143 A 7/1997 Mehta et al.
5,653,472 A 8/1997 Huddleston et al.
5,662,976 A 9/1997 Popat et al.
5,670,015 A 9/1997 Finestone et al.
5,687,903 A 11/1997 Akridge et al.
5,721,178 A 2/1998 Lalande
D391,991 S 3/1998 Conner
5,752,722 A 5/1998 Moore et al.
5,765,885 A 6/1998 Netto
5,785,354 A 7/1998 Haas
5,837,337 A 11/1998 Schnitzer
5,837,341 A 11/1998 Johnstone
5,840,143 A 11/1998 Swanson
5,842,722 A 12/1998 Carlson
5,877,742 A 3/1999 Klink
5,933,993 A 8/1999 Riley
5,984,363 A 11/1999 Dotson et al.
6,000,160 A 12/1999 Riley
6,006,460 A 12/1999 Blackmer
6,016,618 A * 1/2000 Attia ...................... G09F 3/005
156/289
D423,044 S 4/2000 Burke et al.
6,053,535 A 4/2000 Washburn et al.
6,055,756 A 5/2000 Aoki
6,058,639 A 5/2000 Tinklenberg et al.
6,067,739 A 5/2000 Riley
6,071,585 A 6/2000 Roth
6,092,321 A 7/2000 Cheng
6,108,876 A 8/2000 Hubbert
6,155,476 A 12/2000 Fabel
6,155,603 A 12/2000 Fox
6,159,570 A 12/2000 Ulrich et al.
6,199,730 B1 3/2001 Chisolm
D448,404 S 9/2001 Hamilton et al.
6,303,539 B1 10/2001 Tony
6,331,018 B1 12/2001 Roth et al.
6,343,819 B1 2/2002 Shiozaki
6,361,078 B1 3/2002 Chess
6,364,366 B1 4/2002 Schwartz
6,409,871 B1 6/2002 Washburn et al.
6,438,881 B1 8/2002 Riley
6,510,634 B1 1/2003 Riley
6,517,921 B2 2/2003 Ulrich et al.
D473,264 S 4/2003 Sanford et al.
6,611,962 B2 9/2003 Redwood et al.

(56) References Cited

U.S. PATENT DOCUMENTS

| | | | |
|---|---|---|---|
| 6,641,048 | B1 | 11/2003 | Schintz et al. |
| 6,685,228 | B2 | 2/2004 | Riley |
| 6,748,687 | B2 | 6/2004 | Riley |
| 6,782,648 | B1 | 8/2004 | Mosher, Jr. |
| 6,807,680 | B2 | 10/2004 | Sloot |
| 6,836,215 | B1 | 12/2004 | Laurash et al. |
| 6,844,041 | B2 | 1/2005 | Squier et al. |
| D503,197 | S | 3/2005 | Stewart et al. |
| 6,863,311 | B2 | 3/2005 | Riley |
| 6,971,200 | B2 | 12/2005 | Paul et al. |
| 6,981,948 | B2 | 1/2006 | Pellegrino et al. |
| 7,017,293 | B2 | 3/2006 | Riley |
| 7,017,294 | B2 | 3/2006 | Riley et al. |
| D521,565 | S | 5/2006 | Stewart et al. |
| 7,047,682 | B2 | 5/2006 | Riley |
| 7,197,842 | B2 | 4/2007 | Ali |
| 7,222,448 | B2 | 5/2007 | Riley |
| 7,240,446 | B2 | 7/2007 | Bekker |
| 7,286,055 | B2 | 10/2007 | Girvin et al. |
| 7,325,347 | B2 | 2/2008 | Riley |
| 7,386,949 | B2 | 6/2008 | Riley |
| 7,454,854 | B2 | 11/2008 | Riley et al. |
| 7,461,473 | B2 | 12/2008 | Riley |
| 7,520,077 | B2 | 4/2009 | Riley |
| 7,523,576 | B1 | 4/2009 | Petty |
| 7,654,024 | B2 | 2/2010 | Riley |
| 7,658,026 | B2 | 2/2010 | Jain et al. |
| 7,658,027 | B2 | 2/2010 | Jain et al. |
| D611,984 | S | 3/2010 | Ali et al. |
| 7,763,344 | B2 | 7/2010 | Riley et al. |
| 7,779,569 | B2 | 8/2010 | Riley et al. |
| 7,779,570 | B2 | 8/2010 | Riley |
| 7,784,209 | B2 | 8/2010 | Greer |
| 7,784,210 | B2 | 8/2010 | Riley et al. |
| 7,818,908 | B2 | 10/2010 | Greer |
| 7,823,310 | B2 | 11/2010 | Jain et al. |
| 7,877,915 | B2 | 2/2011 | Jain et al. |
| 7,883,018 | B2 | 2/2011 | Riley et al. |
| 7,918,045 | B2 | 4/2011 | Riley |
| D640,738 | S | 6/2011 | Jain et al. |
| 7,967,340 | B2 | 6/2011 | Hofer et al. |
| 8,006,422 | B2 | 8/2011 | Riley |
| 8,011,125 | B2 | 9/2011 | Riley et al. |
| 8,042,293 | B1 | 10/2011 | Bennett et al. |
| 8,074,389 | B2 | 12/2011 | Greer et al. |
| 8,099,888 | B2 | 1/2012 | Riley |
| 8,109,021 | B2 | 2/2012 | Jain et al. |
| 8,424,115 | B2 | 4/2013 | Greer |
| 8,776,417 | B2 | 7/2014 | Jain et al. |
| 8,844,972 | B2 | 9/2014 | Riley et al. |
| 8,904,686 | B2 | 12/2014 | Greer |
| 9,114,187 | B2 | 8/2015 | Hofer et al. |
| 10,207,020 | B2 | 2/2019 | Hofer et al. |
| 10,249,221 | B2 | 4/2019 | Davis et al. |
| 10,997,874 | B1 | 5/2021 | Kraft et al. |
| 11,232,719 | B1 | 1/2022 | Kraft et al. |
| 11,238,759 | B1 | 2/2022 | Staudinger et al. |
| 11,715,394 | B1 | 8/2023 | Kraft et al. |
| 2002/0152928 | A1 | 10/2002 | Lawandy et al. |
| 2002/0176973 | A1 | 11/2002 | Keiser |
| 2003/0001381 | A1 | 1/2003 | Riley |
| 2003/0003249 | A1 | 1/2003 | Benim et al. |
| 2003/0011190 | A1 | 1/2003 | Ryan |
| 2004/0060216 | A1 | 4/2004 | Riley |
| 2004/0068906 | A1 | 4/2004 | Riley et al. |
| 2004/0128892 | A1 | 7/2004 | Paul et al. |
| 2004/0148836 | A1 | 8/2004 | Riley |
| 2004/0244251 | A1 | 12/2004 | Riley |
| 2005/0091896 | A1 | 5/2005 | Kotik et al. |
| 2005/0108912 | A1 | 5/2005 | Bekker |
| 2005/0279001 | A1 | 12/2005 | Riley |
| 2005/0281989 | A1 | 12/2005 | Finger |
| 2006/0113788 | A1 | 6/2006 | Riley |
| 2006/0230661 | A1 | 10/2006 | Bekker |
| 2006/0236578 | A1 | 10/2006 | Saint et al. |
| 2006/0242875 | A1 | 11/2006 | Wilson et al. |
| 2006/0261958 | A1 | 11/2006 | Klein et al. |
| 2007/0089342 | A1 | 4/2007 | Jain et al. |
| 2007/0120358 | A1 | 5/2007 | Waggoner et al. |
| 2007/0243361 | A1 | 10/2007 | Riley et al. |
| 2007/0257113 | A1 | 11/2007 | Davis et al. |
| 2008/0098636 | A1 | 5/2008 | Greer |
| 2008/0236011 | A1 | 10/2008 | Bekker |
| 2009/0031602 | A1 | 2/2009 | Riley |
| 2009/0094872 | A1 | 4/2009 | All et al. |
| 2009/0094873 | A1 | 4/2009 | Riley |
| 2009/0193701 | A1* | 8/2009 | Greer .................... G09F 3/0288 283/81 |
| 2009/0277061 | A1 | 11/2009 | Jain et al. |
| 2009/0282717 | A1 | 11/2009 | Jain et al. |
| 2010/0071241 | A1 | 3/2010 | Jain et al. |
| 2010/0253060 | A1 | 10/2010 | Riley et al. |
| 2010/0281724 | A1 | 11/2010 | Greer et al. |
| 2011/0042933 | A1 | 2/2011 | Landsman et al. |
| 2012/0210620 | A1* | 8/2012 | Jain ........................ G09F 3/005 40/633 |
| 2013/0056974 | A1* | 3/2013 | Jain ........................ G09F 3/005 283/99 |
| 2016/0335928 | A1 | 11/2016 | Lux |

FOREIGN PATENT DOCUMENTS

| | | | |
|---|---|---|---|
| EP | 1974603 | A2 | 10/2008 |
| EP | 2806594 | A1 | 11/2014 |
| FR | 960859 | A | 4/1950 |
| GB | 561777 | A | 6/1944 |
| GB | 2045718 | A | 11/1980 |
| GB | 2160492 | A | 12/1985 |
| GB | 2228915 | A | 9/1990 |
| JP | H08190350 | A | 7/1996 |
| JP | H08299035 | A | 11/1996 |
| JP | 3032299 | U | 12/1996 |
| JP | H10207374 | A | 8/1998 |
| JP | H1115383 | A | 1/1999 |
| JP | 2001316921 | A | 11/2001 |
| JP | 2002117190 | A | 4/2002 |
| JP | 2002351321 | A | 12/2002 |
| JP | 2003066849 | A | 3/2003 |
| JP | 2003157010 | A | 5/2003 |
| JP | 2003164307 | A | 6/2003 |
| JP | 2006039209 | A | 2/2006 |
| WO | 9612618 | A1 | 5/1996 |
| WO | 9823081 | A1 | 5/1998 |
| WO | 9918817 | A1 | 4/1999 |
| WO | 0239412 | A2 | 5/2002 |
| WO | 03003331 | A2 | 1/2003 |
| WO | 2004028826 | A2 | 4/2004 |
| WO | 2005064574 | A1 | 7/2005 |
| WO | 2006007356 | A1 | 1/2006 |
| WO | 2007021375 | A2 | 2/2007 |
| WO | 2007133906 | A2 | 11/2007 |
| WO | 2008079952 | A2 | 7/2008 |
| WO | 2009099787 | A1 | 8/2009 |
| WO | 2009137195 | A1 | 11/2009 |
| WO | 2010129131 | A1 | 11/2010 |

OTHER PUBLICATIONS

Final Office Action, dated Jul. 8, 2021, 9 pages, issued in U.S. Appl. No. 17/013,065.

Non-Final Office Action, dated Dec. 29, 2017, 15 pages, issued in U.S. Appl. No. 15/339,105.

Non-Final Office Action, dated Jan. 6, 2021, 8 pages, issued in U.S. Appl. No. 17/013,065.

Non-Final Office Action, dated Jun. 16, 2022, 6 pages, issued in U.S. Appl. No. 16/426,708.

Non-Final Office Action, dated Nov. 25, 2022, 8 pages, issued in U.S. Appl. No. 17/659,140.

Non-Final Office Action, dated Oct. 30, 2017, 14 pages, issued in U.S. Appl. No. 15/403,922.

Non-Final Office Action, dated Oct. 6, 2022, 16 pages, issued in U.S. Appl. No. 17/588,405.

(56) References Cited

OTHER PUBLICATIONS

Non-Final Office Action, dated Sep. 16, 2022, 9 pages, issued in U.S. Appl. No. 17/307,622.
Notice of Allowance, dated Feb. 17, 2023, 7 pages, issued in U.S. Appl. No. 17/588,405.
Notice of Allowance, dated Jan. 11, 2021, 11 pages, issued in U.S. Appl. No. 16/418,723.
Notice of Allowance, dated Mar. 10, 2023, 7 pages, issued in U.S. Appl. No. 17/659,140.
Notice of Allowance, dated Oct. 5, 2021, issued in U.S. Appl. No. 17/090,883.
Notice of Allowance, dated Oct. 19, 2022, 8 pages, issued in U.S. Appl. No. 16/426,708.
Notice of Allowance, dated Sep. 2, 2022, 9 pages, issued in U.S. Appl. No. 17/514,620.
Notice of Allowance, dated Sep. 29, 2021, issued in U.S. Appl. No. 17/013,065.

* cited by examiner

WRISTBAND LABEL FORM WITH UNEVEN LAMINATION PANELS

RELATED APPLICATIONS

This application is a continuation of U.S. application Ser. No. 17/659,140, filed Apr. 13, 2022, which claims priority to U.S. Provisional Application No. 63/174,381, filed on Apr. 13, 2021. The Ser. No. 17/659,140 application is also a continuation of U.S. application Ser. No. 17/588,405, filed Jan. 31, 2022, which is a continuation of U.S. application Ser. No. 17/090,883, filed Nov. 5, 2020, which granted as U.S. Pat. No. 11,238,759, which claims priority to U.S. Provisional Application No. 62/930,646, filed on Nov. 5, 2019. U.S. application Ser. No. 17/090,883 is also a continuation-in-part of U.S. patent application Ser. No. 17/013,065, filed Sep. 4, 2020, which granted as U.S. Pat. No. 11,232,719, which claims priority to U.S. Provisional Patent Application No. 62/895,547, filed on Sep. 4, 2019, and which is a continuation-in-part of U.S. patent application Ser. No. 16/418,723, filed May 21, 2019, which granted as U.S. Pat. No. 10,997,874, which is a continuation-in-part of U.S. patent application Ser. No. 15/403,922, filed Jan. 11, 2017, which granted as U.S. Pat. No. 10,297,170, and which is a continuation of, and claims priority to, U.S. patent application Ser. No. 15/339,105, filed Oct. 31, 2016, which granted as U.S. Pat. No. 10,249,221, and which claims priority to U.S. Provisional Application No. 62/247,863, filed on Oct. 29, 2015, U.S. Provisional Application No. 62/256,465, filed on Nov. 17, 2015, and U.S. Provisional Patent Application No. 62/257,086, filed on Nov. 18, 2015. Priority is claimed to each of these applications and the disclosures of each of these applications are incorporated by reference in their entireties herein.

FIELD OF THE DISCLOSURE

The disclosure relates generally to the field of wristband label forms. Specifically, the disclosure relates to wristband label forms having wristbands with uneven lamination panels.

BACKGROUND

The wristband is a frequently-used instrument for distinguishing among various groups of people. For example, wristbands may be used to identify persons in short term healthcare facilities, or to distinguish between levels of access (e.g., at a concert) or permissions. Prior art wristbands often have disadvantages. For instance, some wristbands include a paper layer which is not water resistant causing the wristband to become torn and tattered. Other wristbands have mechanisms to laminate the paper layer, but the paper may undesirably add to the thickness of the wristband, make the wristband uncomfortable to wear, and/or increase manufacturing costs.

SUMMARY

Said following presents a simplified summary of said invention in order to provide a basic understanding of some aspects of said invention. This summary is not an extensive overview of said invention. It is not intended to identify critical elements of said invention or to delineate said scope of said invention. Its sole purpose is to present some concepts of said invention in a simplified form as a prelude to said more detailed description that is presented elsewhere herein.

In some aspects, said techniques described herein relate to a combination wristband and label form, including: a front side formed of paper, said front side including: a first portion having a plurality of labels die cut saidrein; and a second portion having a printable area associated saidrewith; a back side including a polyester section, said polyester section including a first section and a second section, said first section being removable from said form and said second section being permanently adhered to said form, said first section including a removable wristband and a removable extender, said wristband having a first panel and a second panel, a first strap extending outboard from said first panel and a second strap extending outboard from said second panel, said first panel having defined saidrein said printable area and a surrounding area surrounding said printable area, a size of said printable area being disparate from a size of said first panel, said second panel configured to folded over said first panel; wherein, at least said second panel, said surrounding area of said first panel, said first strap, and said second strap are each devoid of paper.

In some aspects, said techniques described herein relate to a combination wristband and label form, wherein said wristband is formed of a solitary ply.

In some aspects, said techniques described herein relate to a combination wristband and label form, wherein said printable area is defined by a coating configured to accept printed indicia.

In some aspects, said techniques described herein relate to a combination wristband and label form, wherein said second panel is configured to laminate said printed indicia.

In some aspects, said techniques described herein relate to a combination wristband and label form, wherein said wristband is devoid of paper.

In some aspects, said techniques described herein relate to a combination wristband and label form, wherein a size of said first panel and said second panel is disparate.

In some aspects, said techniques described herein relate to a combination wristband and label form, wherein said extender is devoid of paper.

In some aspects, said techniques described herein relate to a combination wristband and label form, including: a front side formed of paper, said front side including: a first portion having a plurality of labels die cut therein; and a second portion having associated therewith an imaging area; a back side including a polyester section, said polyester section including a removable section and a fixed section, said removable section including a removable wristband and an extender, said wristband defined by die cuts in said polyester section and including a first panel and a second panel, said first panel having said imaging area and a surrounding area surrounding said imaging area, said second panel configured to laminate said imaging area, and a first strap extending outboard of said first panel and a second strap extending outboard of said second panel; wherein, no adhesive is associated with said imaging area.

In some aspects, said techniques described herein relate to a combination wristband and label form, wherein said wristband is formed of a solitary ply.

In some aspects, said techniques described herein relate to a combination wristband and label form, wherein said imaging area is defined by a coating configured to accept printed indicia.

In some aspects, said techniques described herein relate to a combination wristband and label form, wherein said second panel is configured to laminate said printed indicia.

In some aspects, said techniques described herein relate to a combination wristband and label form, wherein said wristband is devoid of paper.

In some aspects, said techniques described herein relate to a combination wristband and label form, wherein a size of said first panel and said second panel is disparate.

In some aspects, said techniques described herein relate to a combination wristband and label form, wherein said extender is devoid of paper.

In some aspects, said techniques described herein relate to a combination wristband and label form, including: a front side formed of paper, said front side including: a first portion having a plurality of labels die cut therein; and a second portion having associated therewith an imaging area; a back side including a polyester section, said polyester section including a removable section and a fixed section, said removable section including a removable wristband and an extender, said wristband defined by die cuts in said polyester section and including a first panel and a second panel, said first panel having said imaging area and a surrounding area surrounding said imaging area, said second panel configured to laminate said imaging area, and a first strap extending outboard of said first panel and a second strap extending outboard of said second panel; wherein, said imaging area includes printable coating.

In some aspects, said techniques described herein relate to a combination wristband and label form, wherein said wristband is formed of a solitary ply.

In some aspects, said techniques described herein relate to a combination wristband and label form, wherein said form includes a tag.

In some aspects, said techniques described herein relate to a combination wristband and label form, wherein said tag is devoid of paper.

In some aspects, said techniques described herein relate to a combination wristband and label form, wherein said first strap has a tapered section.

BRIEF DESCRIPTION OF THE SEVERAL VIEWS OF THE DRAWINGS

Illustrative embodiments of the invention are described in detail below with reference to the attached drawing figures.

DETAILED DESCRIPTION

Business forms comprising one or more wristbands die cut therein are known in the art. Such wristbands are shown, for example, in U.S. Pat. No. 7,017,294. These wristbands have a paper layer that is laminated with panels of a lamination ply after the wristband is removed from the business form. The wristband disclosed herein is formed from a solitary ply. The wristband is devoid of paper.

Figure 1:
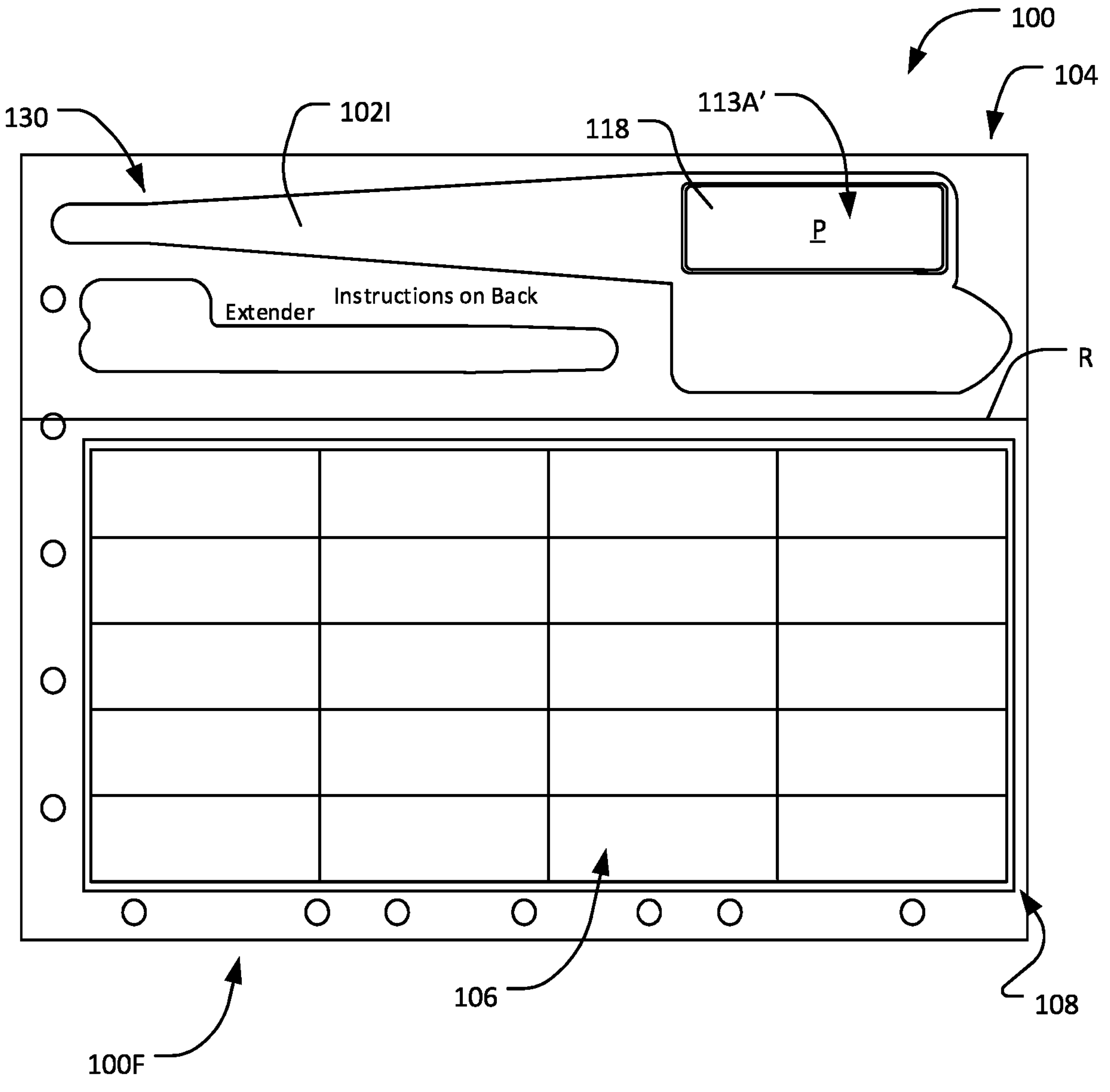
FIG. 1 shows a front view of a business form having a single ply wristband, according to an embodiment.
Figure 2:
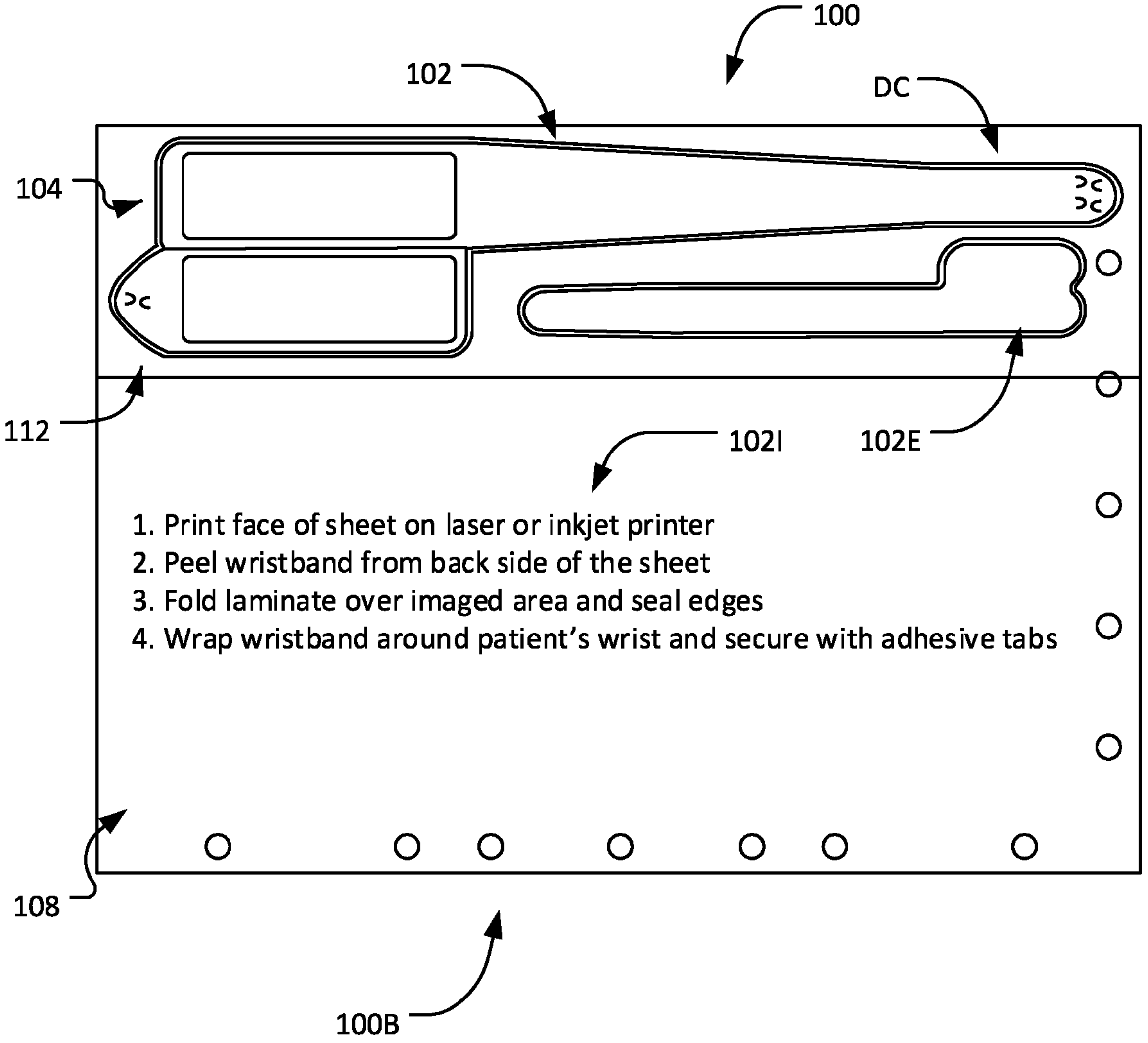
FIG. 2 shows a rear view of the business form of FIG. 1.
Figure 3:
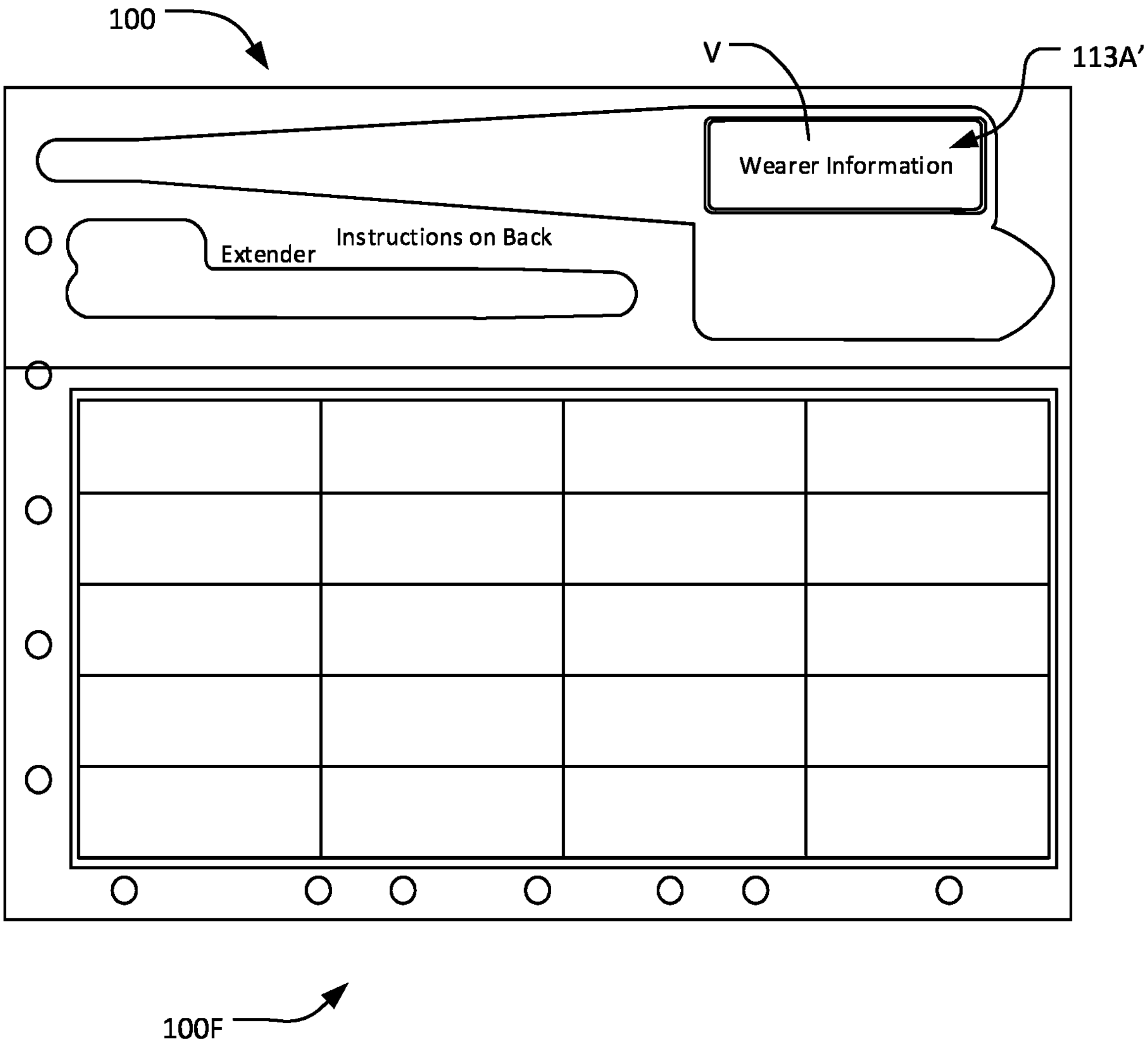
FIG. 3 shows variable indicia on a printable portion of a folding area of the single ply wristband.

FIGS. 1-3 and 6 show a business form 100, in an embodiment. The form 100 has a front side 100F (FIG. 1) and a back side 100B (FIG. 2). A wristband 102 is provided in a wristband area 104 of the form 100 on the back side 100B of the form 100. The form 100 also has a plurality of labels 106 provided in a label area 108 (see FIG. 1).

The wristband area 104 of the form 100, at the front side 100F, may comprise a paper or other printable material (the wristband area 104 also has a void portion, as discussed herein). The label area 108, at the form front side 100F, may likewise comprise paper or other suitable materials and include face stock of one or more labels 106. In embodiments, the wristband area 104 and the label area 108 may be two distinct sections of the form 100 (e.g., may be separated using perforations R (FIG. 1), may be visually separated using markings on the front side 100F and/or the back side 100B, et cetera). The labels 106 may be configured for printing (e.g., via a printable coating) and may be removable from the form 100 for selective adherence to a substrate. In embodiments, the wristband area 104 and the label area 108 at the form front side 100F may be formed of a solitary paper ply.

The form 100 may comprise printed indicia 1021. The printed indicia 102I may be preprinted (e.g., by the manufacturer) and may comprise instructions for using the form 100 on the back side 100B, a representation of the wristband 102 on the front side 100F, et cetera. As discussed herein, the wristband 102 may also comprise printed matter which is selectively applied thereto.

At the back side 100B, the label area 108 may comprise a liner ply to which the labels 106 are removably adhered. The wristband area 104, at the back side 100B, may comprise a ply formed of polyester or other suitable synthetic material(s) (collectively herein, "polyester"). The back side 100B of the wristband area 104 may be referred to herein as the polyester section 112. The wristband 102 may be formed in the polyester ply and may be defined in the polyester section 112 using die cuts DC. In embodiments, the wristband area 104 may also include an extender 102E, which may also be defined in the polyester section 112 using die cuts. The extender 102E may be usable to extend a length of the wristband 102. In embodiments, an extender may be omitted from the form 100. Printed matter and variable indicia may be provided on the wristband 102 of the polyester section 112 as discussed herein. The polyester section 112 may otherwise be generally transparent or translucent.

Figure 4:
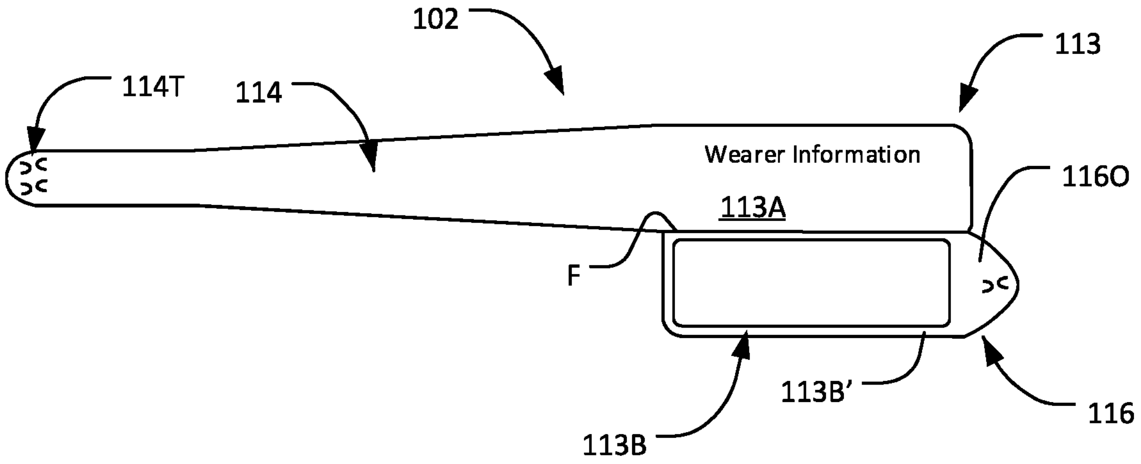
FIG. 4 shows the single ply wristband, with the variable indicia of FIG. 3 thereon, after the wristband is removed from the form of FIG. 1.

Looking now at FIG. 4, the wristband 102, which as noted is on the back side 100B of the form 100, may include a foldable area 113 having two panels 113A and 113B that may be folded along a fold line F. The panels 113A and 113B may have the same size and/or may be similarly sized. One of the panels, e.g., panel 113A, may be configured to receive printed variable indicia, whereas the other panel, e.g., panel 113B, may be generally transparent or translucent in whole or in part. In some embodiments, at the back side 100B, a perimeter portion 113B' of one panel (e.g., panel 113B) may comprise printed matter to give the panel 113B a picture frame appearance. In embodiments, each panel 113A and 113B may have a printed perimeter portion.

A strap 114 may extend generally laterally from the foldable area 113, e.g., from one of the panels 113A and 113B. In embodiments, all or part of the strap 114 may have a width that decreases with increasing distance from the foldable area 113. In other embodiments, the strap 114 may have a generally constant width. The length of each of the panels 113A, 113B may be substantially shorter than the length (e.g., one half the length, one third the length, one quarter the length, etc.) of the strap 114.

The strap 114 may comprise printed matter. In embodiments, the strap 114 may include printed matter of two or more colors. Alternately or in addition, only certain portions of the strap 114 may include printed matter whereas the other portions thereof may be devoid of printed matter or include different types of printed matter. For example, as shown in FIG. 4, a tip 114T of the strap 114 may appear visually distinct from the remainder of the strap 114. In embodiments, the tip 114T may have a rounded shape (e.g., the tip 114 may be a rounded tip).

A protruding portion 116 may also protrude generally laterally from the foldable area 113. In an embodiment, the protruding portion 116 may protrude from one of the panels 113A, 113B in one direction and the strap 114 may extend from the other of the panels 113A, 113B in the opposite direction. For example, in the embodiment illustrated in FIG. 4, the strap 114 extends from panel 113A in one direction and the protruding portion 116 protrudes from panel 113B in the opposite direction. The protruding portion 116 may have a symmetrical or nonsymmetrical shape. In embodiments, the protruding portion 116 may be a generally rounded tab (e.g., the protruding portion 116 may have a semi-circular, or generally semi-circular or frusto-circular outer surface 1160), and the length of the protruding portion 116 may be substantially shorter than the length of the strap 114. A protruding portion 116 having a generally rounded shape may preclude the wristband 102 from uncomfortably digging into a wearer's wrist when worn. In embodiments, the length of the protruding portion 116 may also be substantially shorter than the length (e.g., less than half the length) of each of the panels 113A, 113B. In operation, the protruding portion 116 may provide an area where the strap 114 may be secured without undue interference of the panels 113A, 113B. That is, the wristband 102 may be secured to a wearer via securing the strap 114 to the protruding portion 116 such that indicia located on the panels 113A, 113B is unblocked and available for viewing. While the figures show a full size wristband 102 sized to be worn by an adult, the artisan will understand the wristband 102 may be sized for a child or an infant.

The wristband 102, once removed from the form 100, has no paper. Rather, indicia is printed directly on the polyester forming the wristband, and specifically, on one of the panels (e.g., on panel 113A) of the foldable area 113 that is configured to be printable. In embodiments, indicia may be printed on the protruding portion 116 to indicate a desirable location for where a user may apply the strap 114 to secure the wristband 102 to a wearer. The wristband 102 may, in embodiments, be made from a different material than the rest of the form back side 100B. For example, the form back side 100B may be made of a release liner material, and the wristband 102 may be made of polyester or plastic.

Figure 1A:
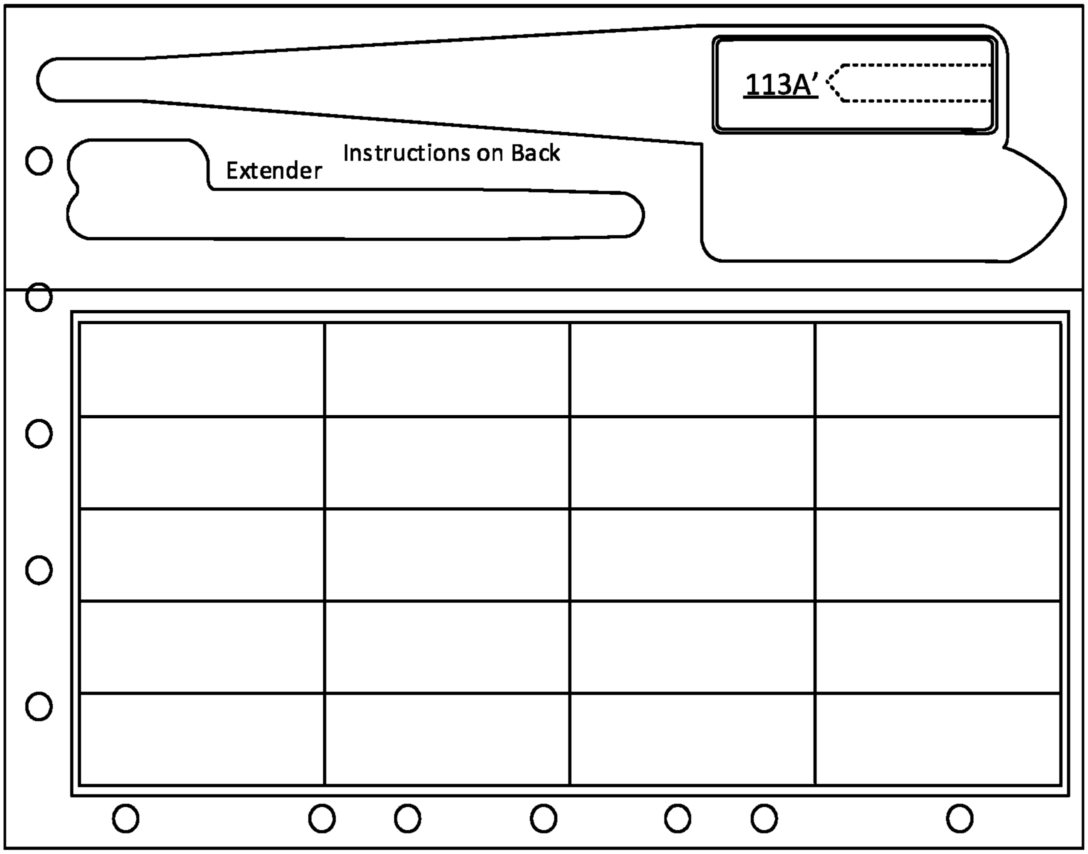
FIG. 1A shows a front view of a portion of the business form of FIG. 1 with an object situated beneath a back side of the business form.
Figure 6:
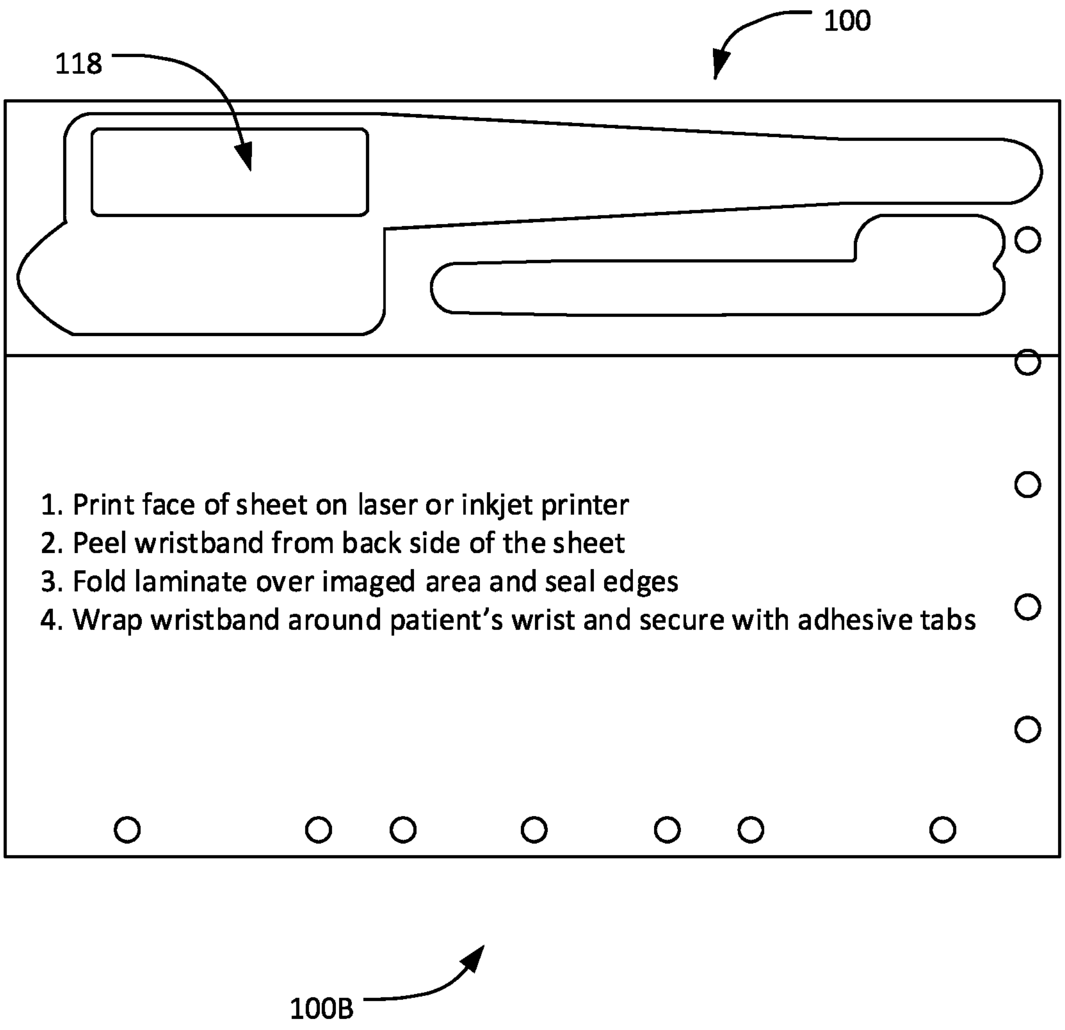
FIG. 6 shows the form of FIG. 1 with the wristband removed.

FIG. 6 shows the back side 100B of the form 100 with the wristband 102 removed. As can be seen, the paper section 130 (FIG. 1) of the wristband area 104 at the front side 100F of the form 100 may include a void 118 (see also FIG. 6) corresponding to all or part of one of the panels 113A, 113B, and this void extends through the form 100 when the wristband 100 is removed. Thus, as shown in FIG. 1, while the wristband 102 is removably coupled to the form 100, the void 118 may expose panel 113A (FIG. 4) of the wristband 102, and specifically, a portion 113A' thereof that faces away from the form back side 100B. The exposed portion 113A' may, in embodiments, include printable substance P. For example, the exposed portion 113A' may include a printable substance P that is white. In some embodiments, the printable substance P may be of a different color. The printable substance P may be, e.g., ink. Alternately or additionally, the printable substance P may be a printable coating. The printable substance P may allow for the form 100 to be passed through a printer such that the printing device (e.g., print head) faces the form front side 100F and indicia is printed directly onto the panel 113A, and specifically, on the exposed portion 113A' thereof, through the void 118. In the prior art, conversely, variable indicia is printed on a paper section of the wristband that is accessible at the front side of the form. Thus, as can be seen in FIG. 1A, the exposed portion of the disclosed form 100 does not have associated therewith a paper portion. An object, e.g., a writing utensil, placed underneath the exposed portion 113A' on the form back side 100B is generally visible through the void 118 and the polyester/printable substance P (e.g., ink) from the form front side 100F while the wristband 102 is coupled to the form 100.

Printed indicia 1021 on the form back side (see FIG. 2) and/or the form front side 100F, including the indicia on the wristband 102, may be preprinted-except for the variable indicia that is printed on the exposed portion 113A' from the form front side 100F. A user may print variable information on the exposed portion 113A' through the void 118 when the wristband 102 is ready for use (e.g., where the form 100 is being used by a hospital for a patient, the hospital staff may pass the form 100 through the printer to print the patient name and/or other information (e.g., machine readable code, medication name, et cetera) on the exposed portion 113A'). For example, while not required, wearer information or other variable indicia V (FIG. 3) may be printed on the exposed portion through the void 118 (e.g., using a printer). The wristband 102 may thereafter be uncoupled from the form 100 for use and be configured on the wearer.

Figure 7:
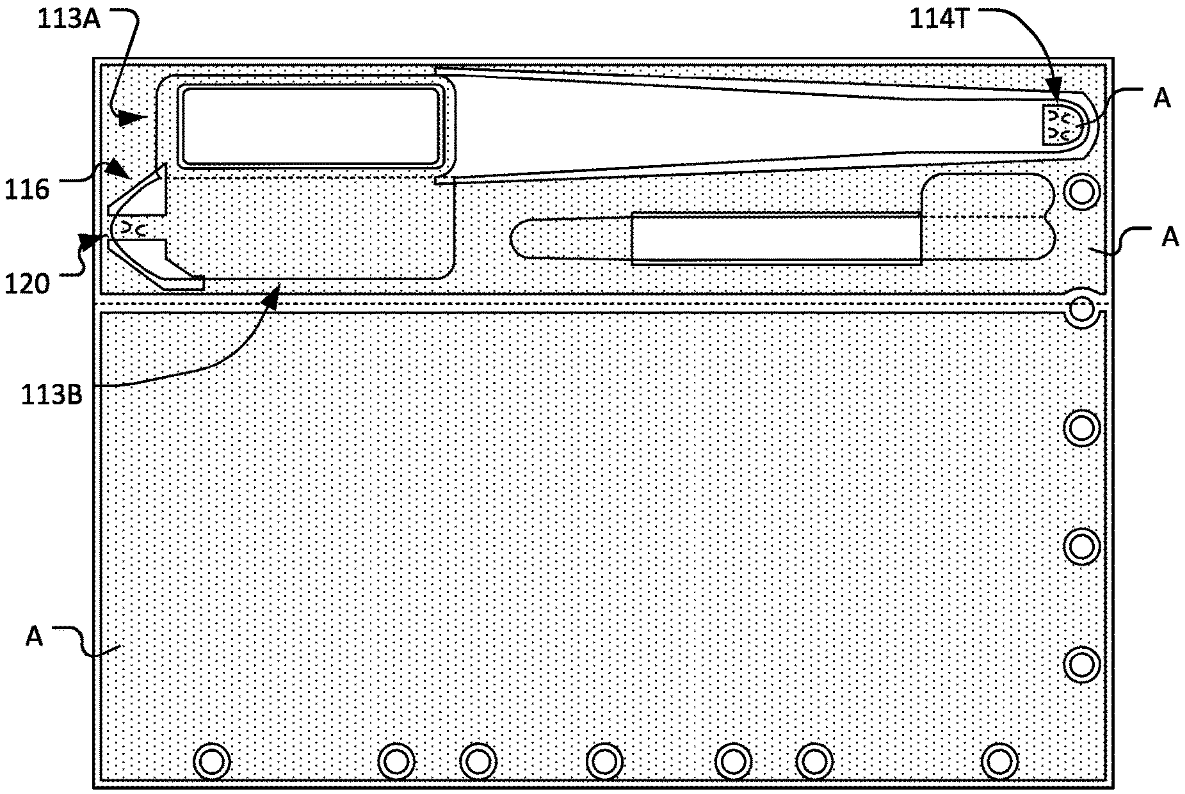
FIG. 7 shows areas of the business form of FIG. 1 comprising adhesive.
Figure 8:
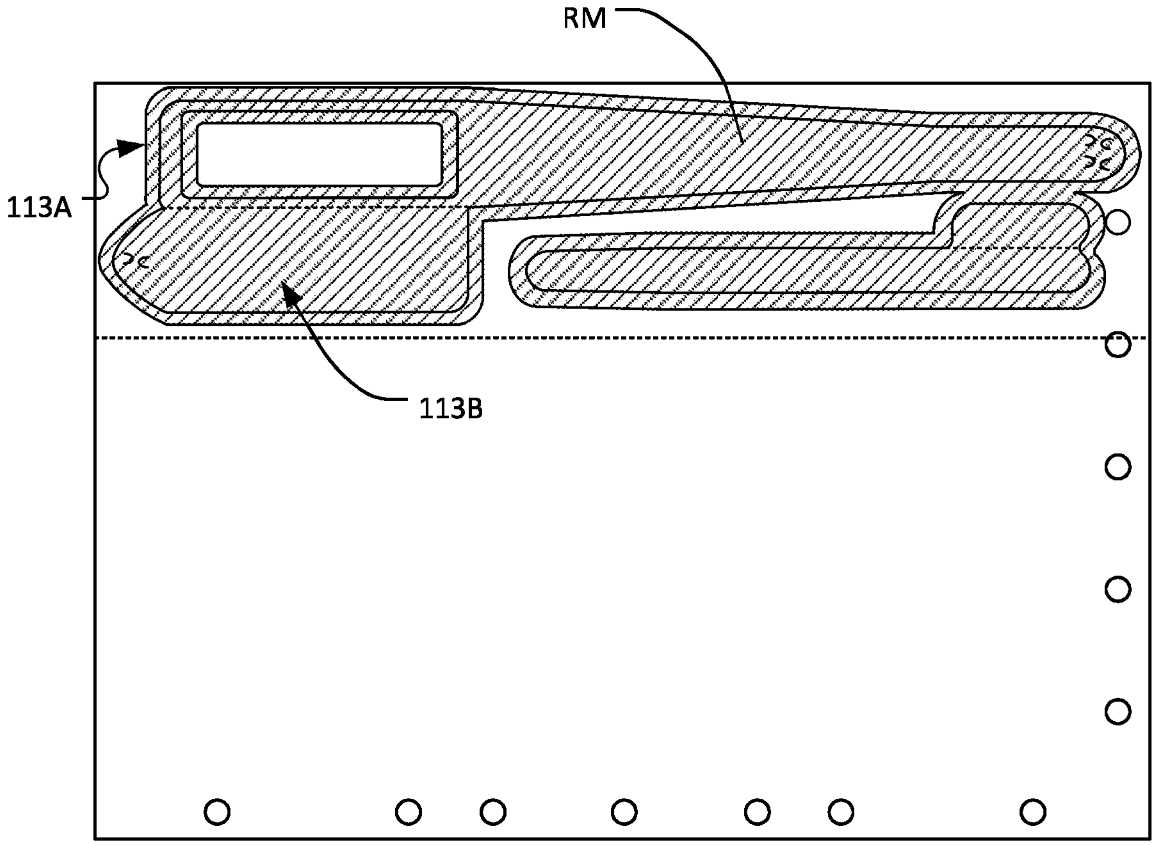
FIG. 8 shows areas of the business form of FIG. 1 comprising a release material.

The wristband 102 may be removed from the form 100 for use along the die cuts DC from the back side 100B in one smooth motion. To illustrate, attention is directed to FIGS. 7 and 8, which respectively show the placement of adhesive A and release material RM that is selectively applied to the form 100 to allow the wristband 102 to be removably coupled to the form 100. The artisan will understand the placement of the adhesive A and the release material RM in the figures is merely exemplary and is not intended to be independently limiting.

Specifically, adhesive A may be provided on a portion of the tip 114T, on the panel 113B, and/or a border portion of the panel 113A, and release material RM may correspondingly be provided on these areas to allow the wristband 102 to be selectively secured to the form 100 and removed therefrom. All or part of the strap 114, however, may be devoid of adhesive A (and similarly, the strap of the extender 102E may be devoid of adhesive A). The user may therefore place his finger under the strap 114 at the form back side 100B and easily peel the wristband 102 from the form 100 in one smooth motion. Alternately, the user may hold the wristband 102 from another location and peel the wristband 102 from the form back side 100B for use. The exposed portion 113A' (which is on the front side of form 100 while the wristband 102 is coupled thereto) may also be devoid of adhesive A, to ensure that indicia may be printed thereon by the printer without the printer contacting any adhesive A on the form 100. Further, the lack of adhesive A on various portions of the wristband 102 may ensure that the wristband 102 does not inadvertently stick to the wrist of the patient or other wearer.

In embodiments, the release material RM may be located adjacent the form front side 100F while the adhesive A may be located adjacent the form back side 100B, e.g., adjacent the wristband 102. In other words, the adhesive A that corresponds to the wristband 102 may be sandwiched between the release material RM and the wristband 102. This release material RM and adhesive A configuration may provide for a business form 100 where at least a portion of the adhesive A is both permanently secured to the wristband 102 and temporarily secured to the form front side 100F. Thus, the wristband 102 may be removed from the rest of the business form 100 while retaining some of the adhesive A. The adhesive A remaining on the wristband 102 may be used to laminate one of the panels 113A, 113B after the printing of indicia and to secure the strap 114 to a wrist of a user.

Figure 5:
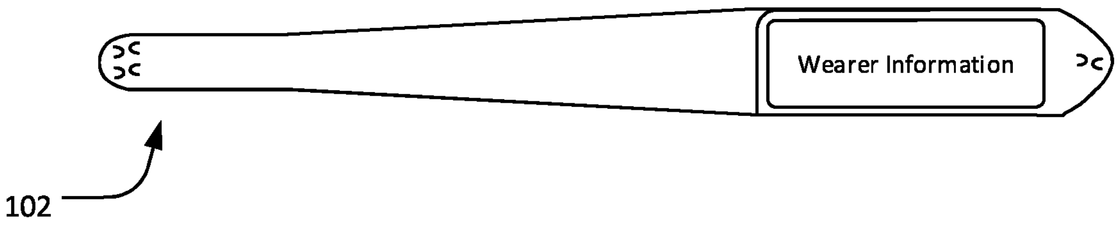
FIG. 5 shows the single ply wristband with the printable portion being laminated using a panel of a foldable area.

Once variable indicia is printed on the exposed portion 113A' through the void and the wristband 102 is peeled from the form 100 from the back side 100B, the panels 113A, 113B of the foldable area 113 may be folded along the fold line F to cover the exposed panel 113A, thus laminating the variable indicia printed thereon (see FIG. 5). Specifically, the printable substance P (e.g., ink) is situated on the front side of the panel 113A (and in embodiments, also on one or more other portions of the wristband except for the panel 113B), and after the wristband 102 is removed, the panel 113B may be folded such that the panel 113B is in front of the variable indicia V printed on the exposed portion 113A'. The variable indicia V may therefore be sandwiched by the panels 113A and 113B. As noted, printed matter may be provided only on the perimeter portion 113B' of the panel 113B whereas the remainder thereof may be generally transparent. Thus, the variable indicia V printed on the printable substance P on the exposed portion 113A' of the panel 113A may be readily viewable through the panel 113B. In embodiments, the printable substance P, e.g., ink, may be omitted from the panels 113A and/or 113B and variable indicia may be printed directly on the transparent polyester. In other embodiments, the variable indicia V may be printed on the printable substance P and on the transparent polyester. In other embodiments still, a substance may be provided on one side of the panel 113A (e.g., the side of the panel 113A that faces the form back side 100B) and the variable indicia V may be printed on the other side of the panel 113A (specifically, on the exposed portion 113A' thereof) through the void 118 from the form front side 100F. In all embodiments though, the wristband 102 itself may only comprise a single ply and may have no paper. That is, the variable indicia V may be printed directly on the polyester of the wristband 102 or indirectly on the polyester via the use of the printable substance P.

The wristband 102 may be secured around an appendage of the wearer, e.g., around the wrist or forearm. The tip 114T of the wristband 102 may include adhesive A (FIG. 7), and a securement area 120 of the protruding portion 116 (and, in embodiments, only the securement area 120 of the protruding portion 116) may likewise include adhesive A. The securement area 120 may be generally rectangular as shown or take on other symmetrical or nonsymmetrical shapes. The strap 114 may be wrapped around the wearer's wrist and the tip 114T may be adhesively secured to the securement area 120 of the protruding portion 116 to secure the wristband 102 to the wearer. Adhesive A on each of the tip 114T and the securement area 120 (as opposed to only on one of the tip 114T and the securement area 120) may ensure the wristband 102 does not inadvertently come loose after it is secured to the wearer. In use, the wristband may be secured around the wrist such that the variable indicia V faces away from the wrist of the wearer and is easily accessible by the user and others. In an embodiment, when the wristband 102 is so secured, the strap tip 104T secured to the rounded tab 116 is inwardly adjacent the rounded tab 116 (i.e., the strap tip 104T is between the rounded tab 116 and the user's wrist).

The finished wristband 102 secured to the wearer, thus, is of unitary construction and is devoid of paper. As noted, the prior art wristbands typically include paper and polyester and the variable indicia is printed on the paper of the wristband. An added paper layer in the wristband may undesirably add to the thickness of the wristband, make the wristband uncomfortable to wear, make the wristband more prone to tearing or other damage (e.g., water damage), and/or increase manufacturing costs. Elimination of the paper layer from the wristband may address these and other concerns.

Figure 9:
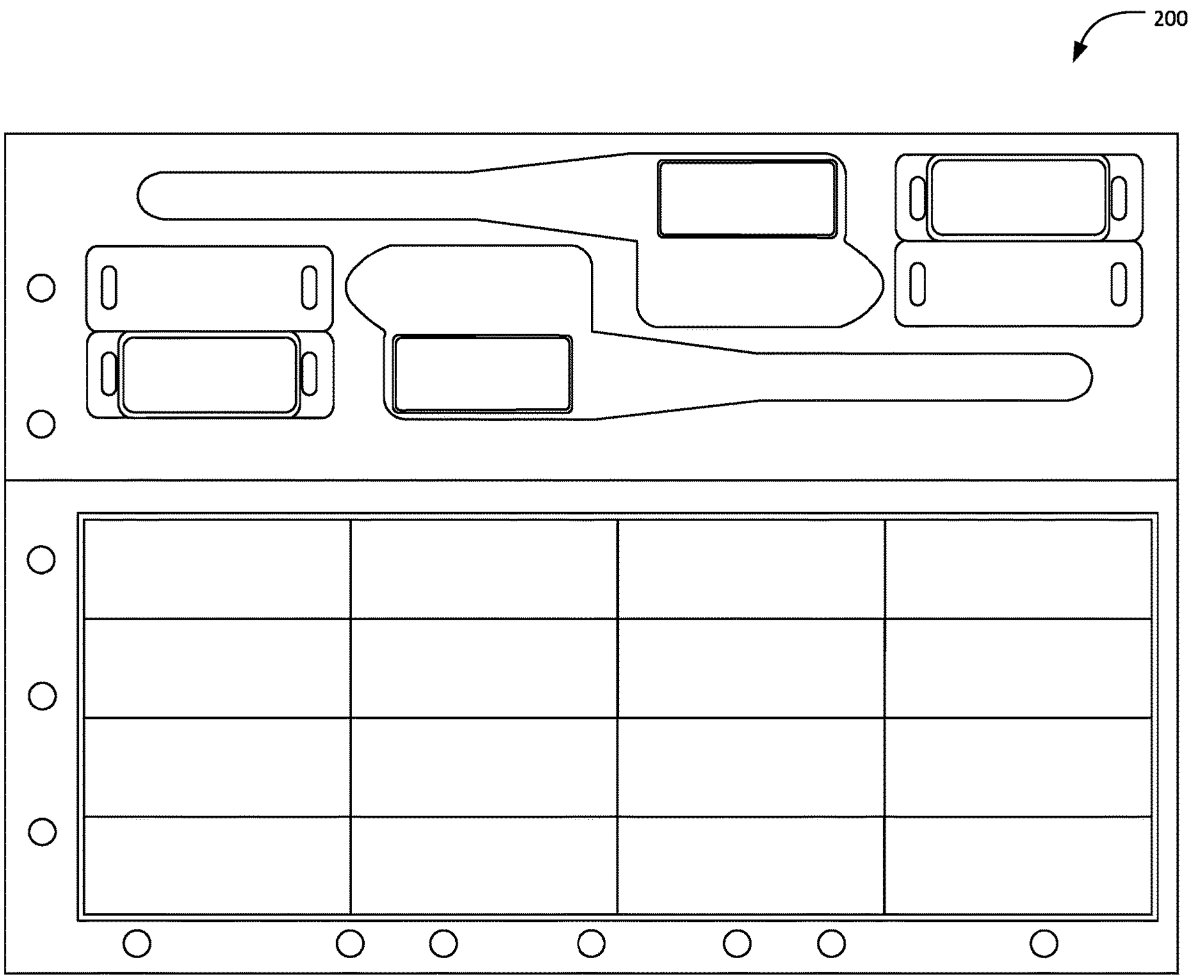
FIG. 9 shows a front view of a business form having a pair of single ply wristbands, according to another embodiment.
Figure 10:
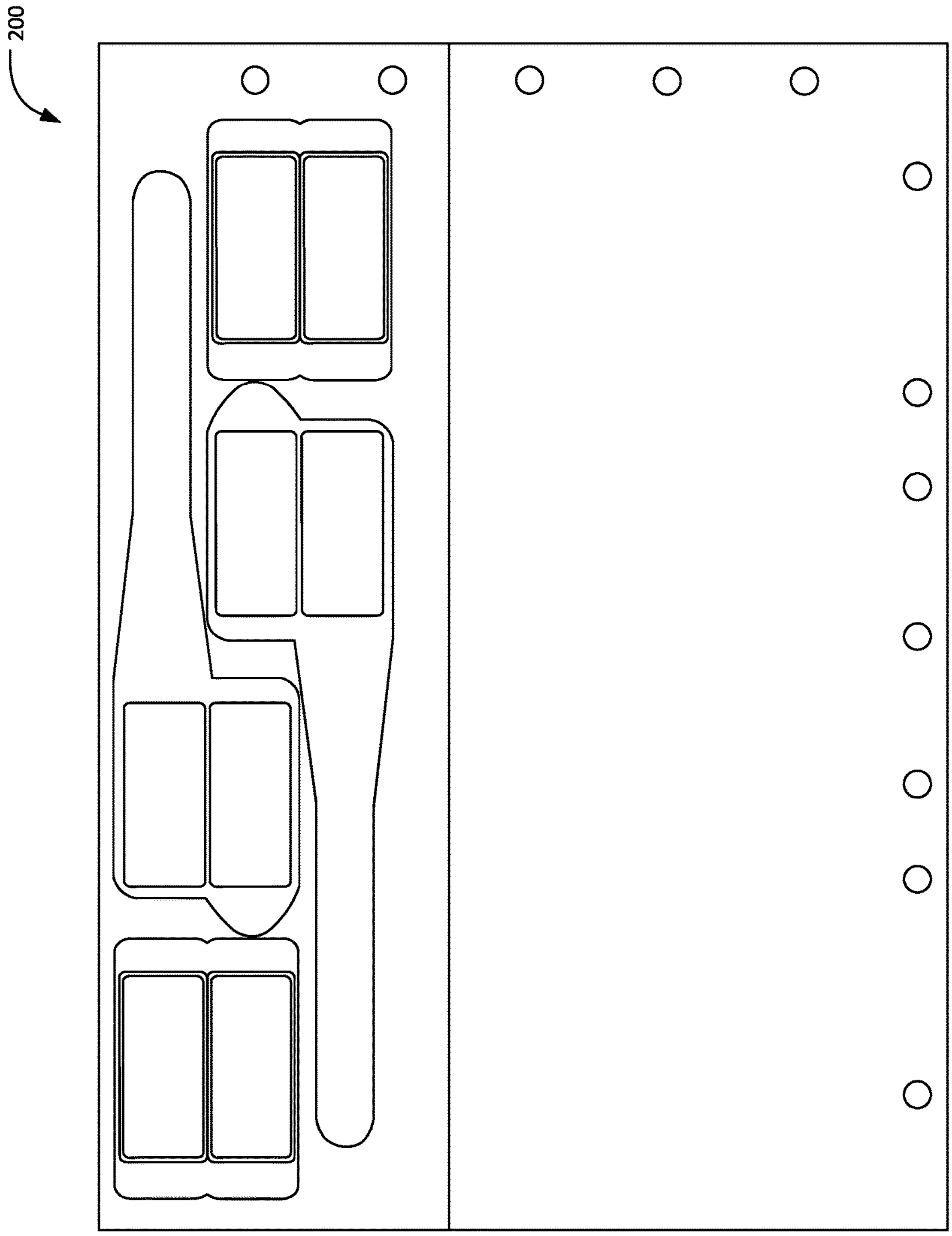
FIG. 10 shows a rear view of the business form of FIG. 9.
Figure 11:
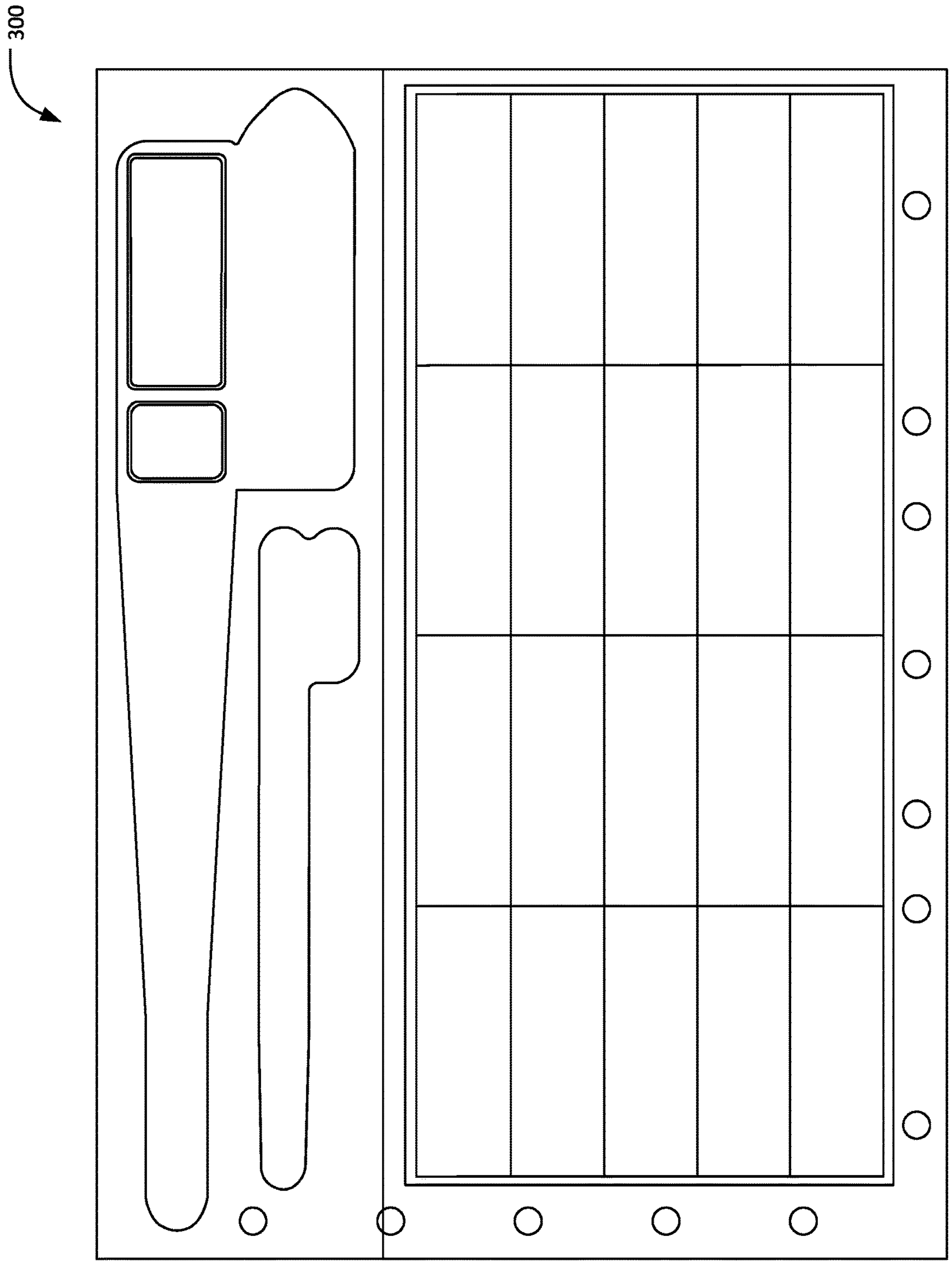
FIG. 11 shows a front view of a business form having a single ply wristband, according to yet another embodiment.
Figure 12:
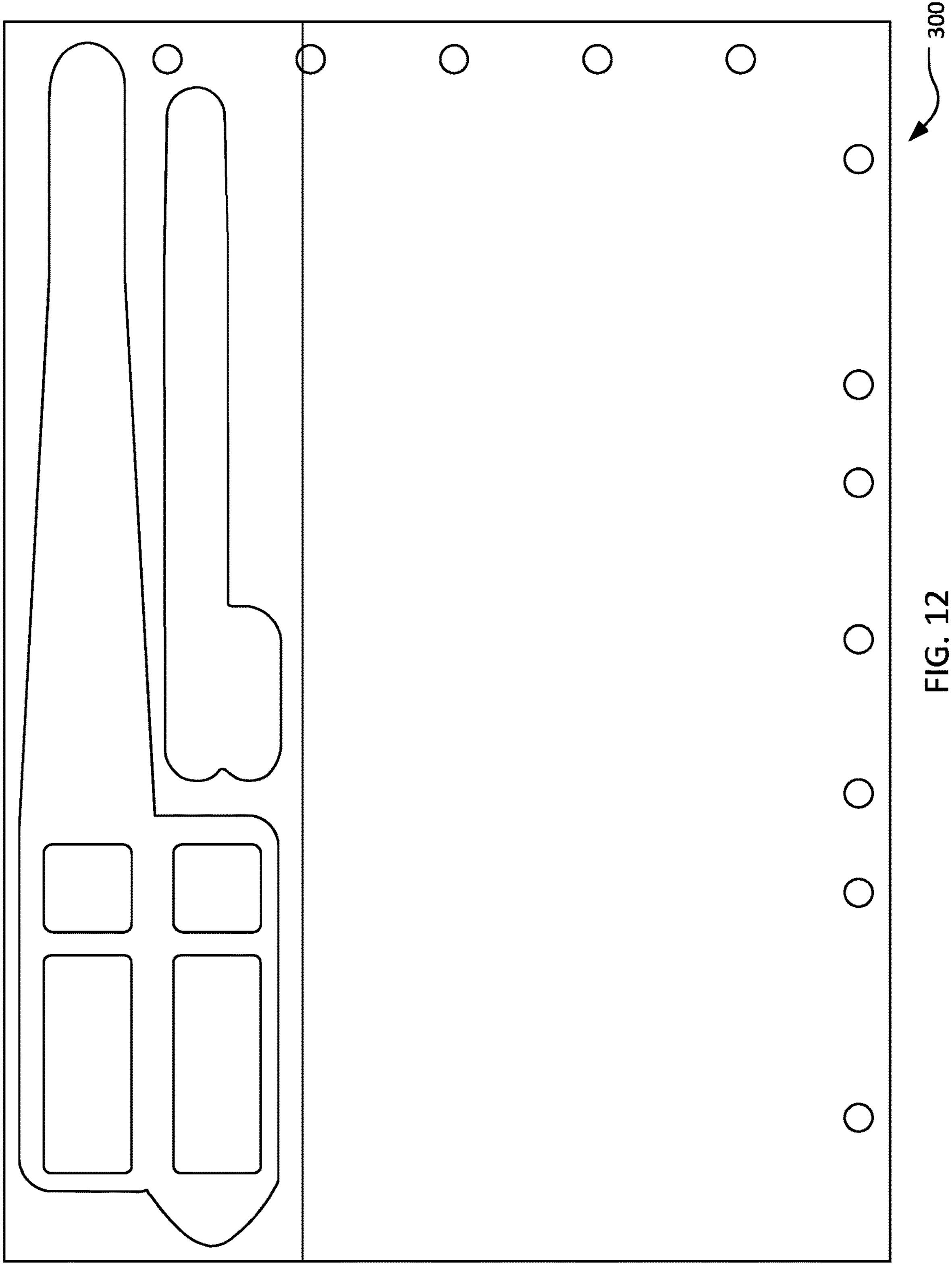
FIG. 12 shows a rear view of the business form of FIG. 11.
Figure 13:
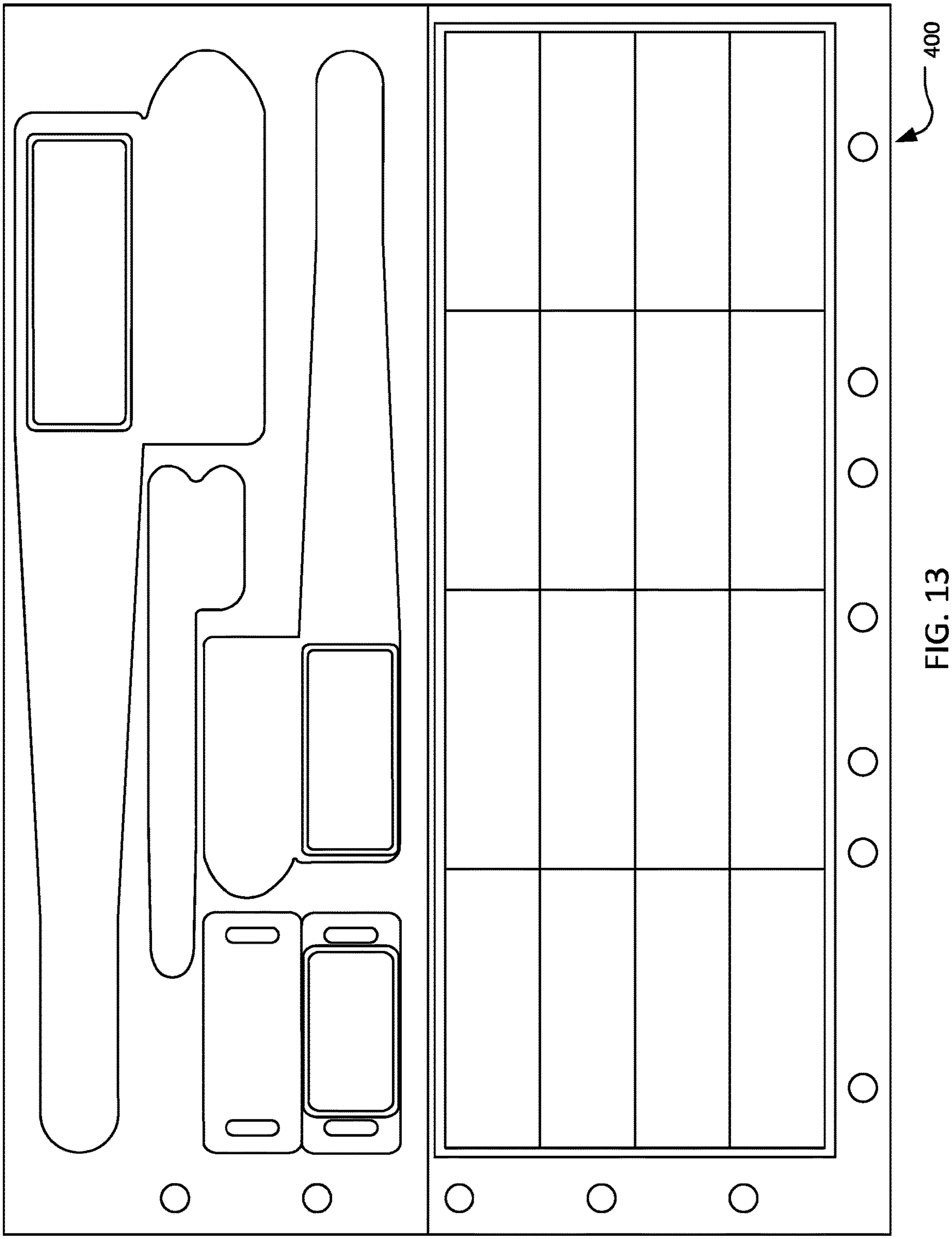
FIG. 13 shows a front view of a business form having single ply wristbands, according to still another embodiment.
Figure 14:
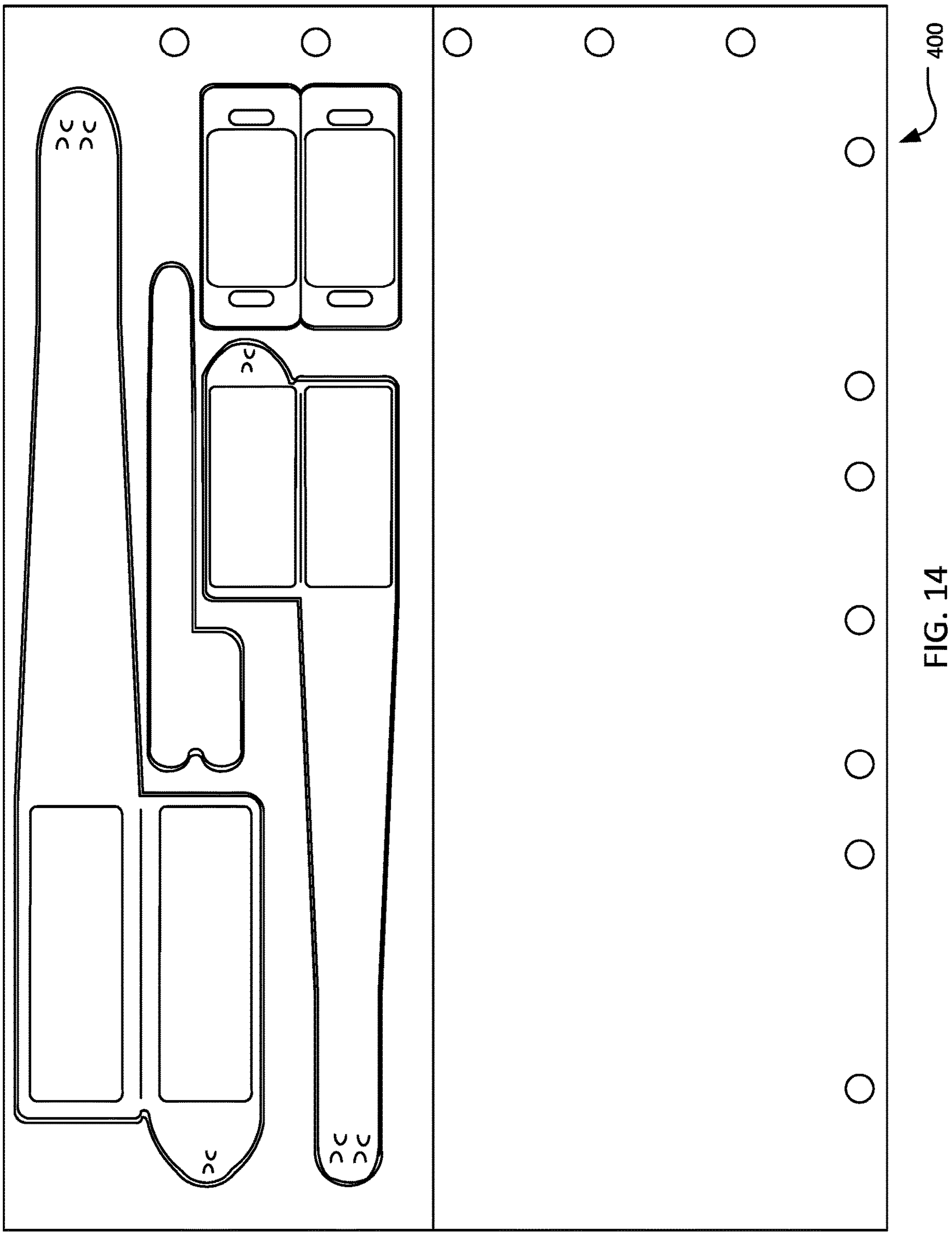
FIG. 14 shows a rear view of the business form of FIG. 13.
Figure 15:
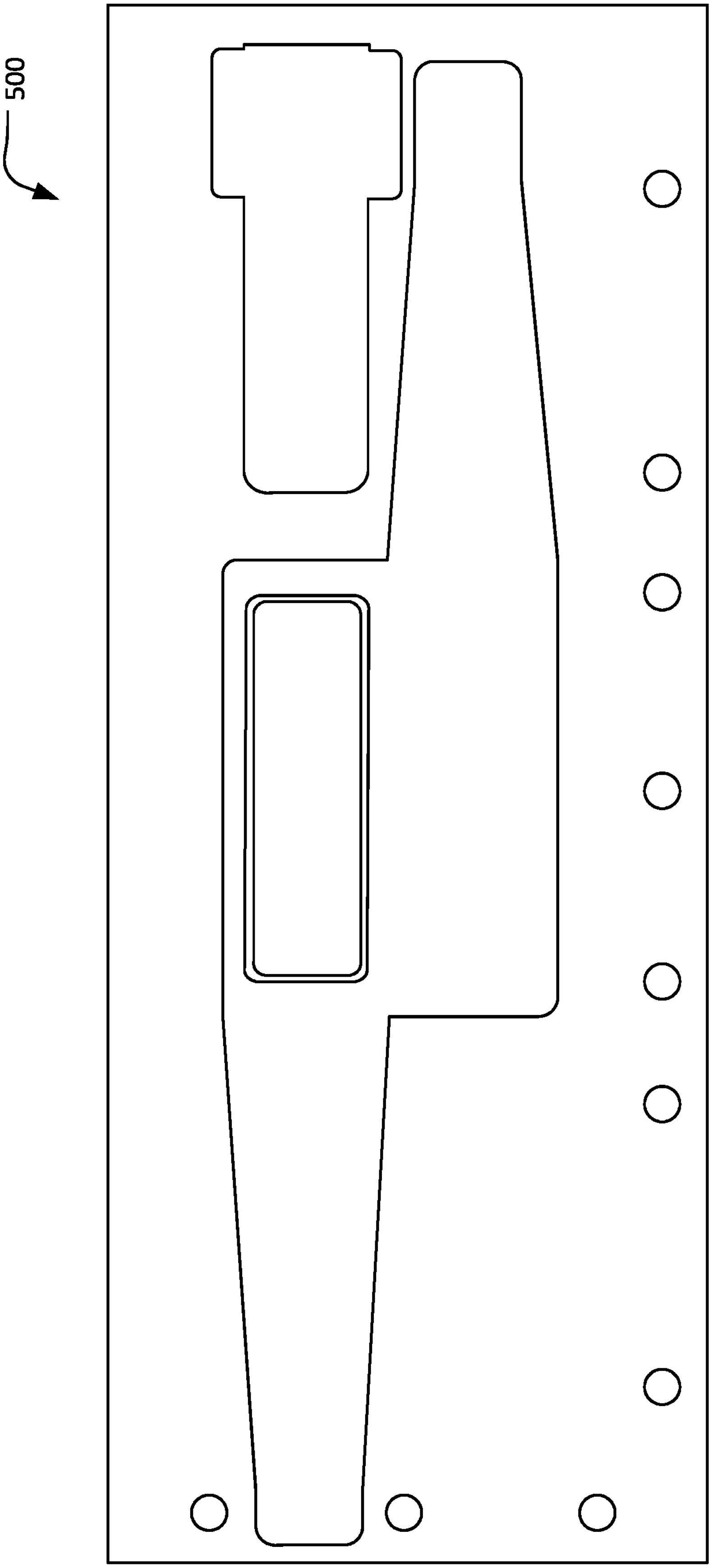
FIG. 15 shows a front view of a business form having a wristband, according to a further embodiment.
Figure 16:
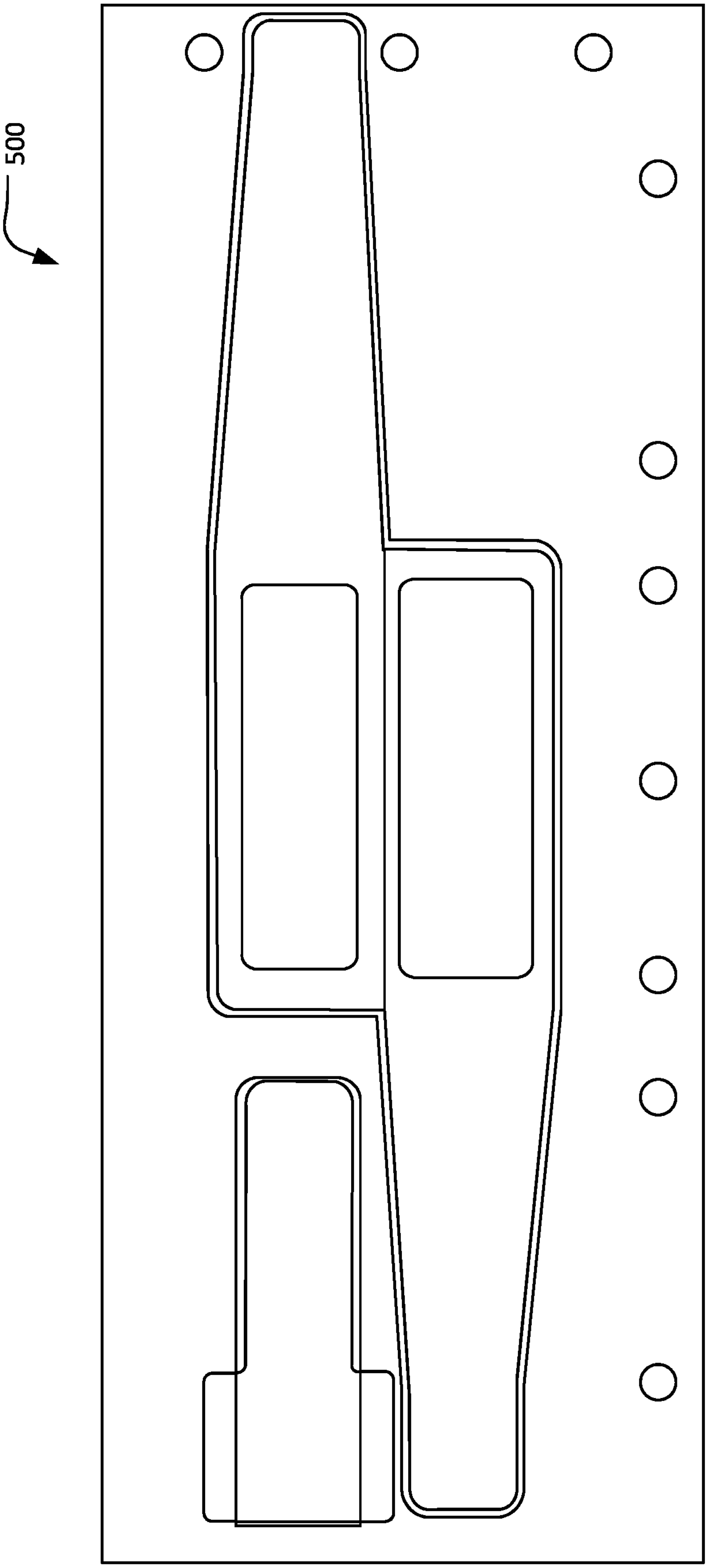
FIG. 16 shows a rear view of the business form of FIG. 15.
Figure 17:
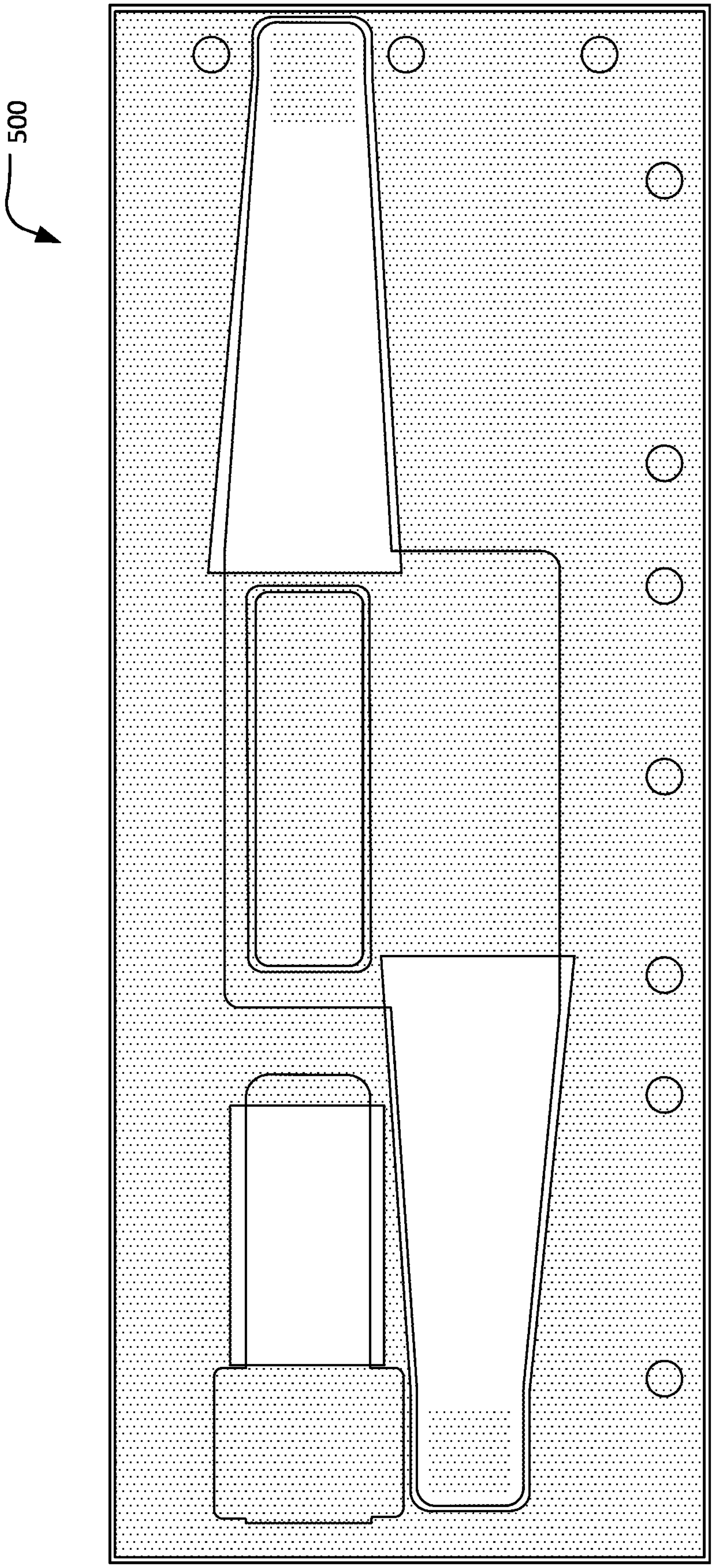
FIG. 17 shows areas of the business form of FIG. 15 comprising adhesive.
Figure 18:
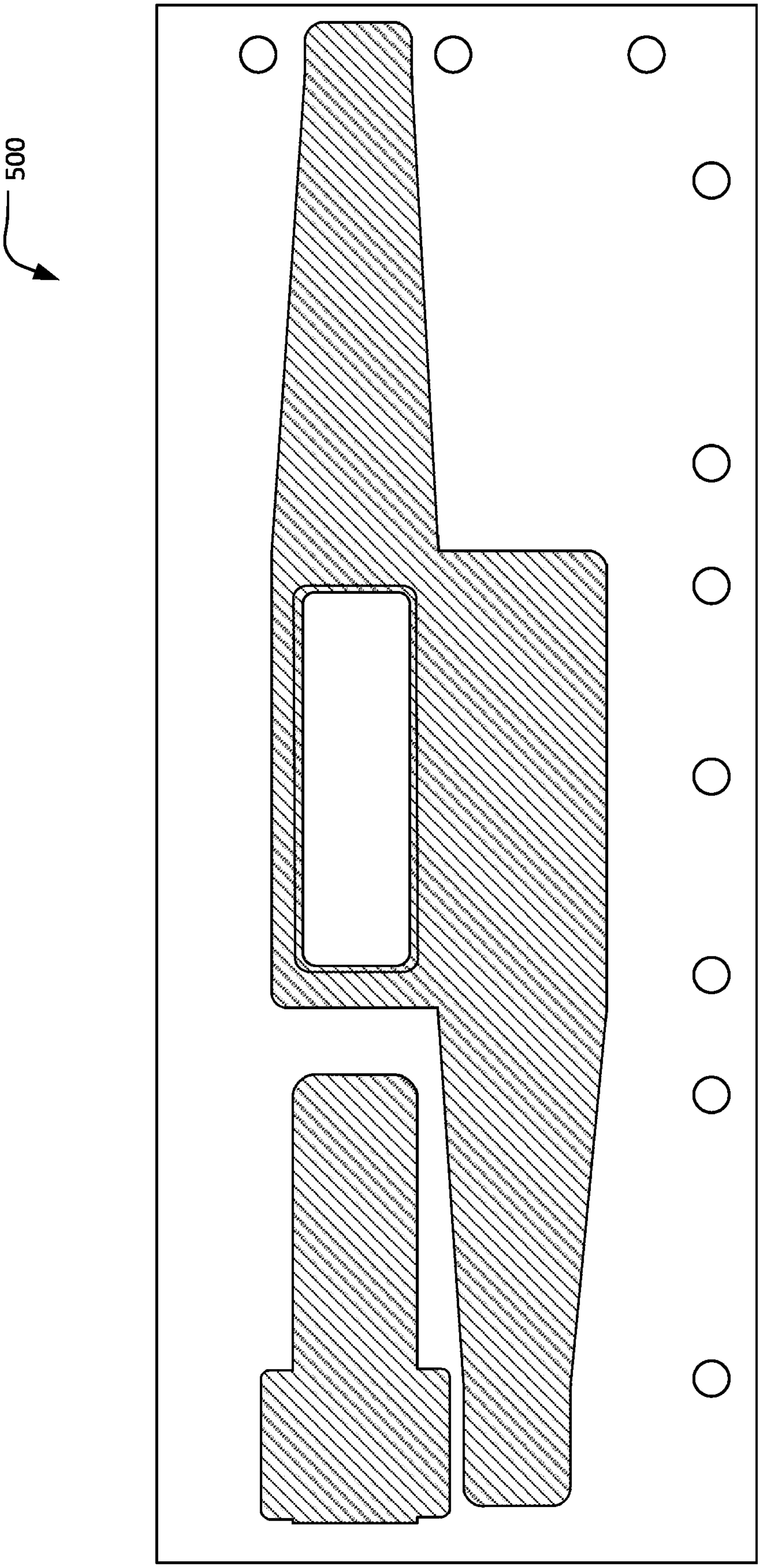
FIG. 18 shows areas of the business form of FIG. 15 comprising a release material.
Figure 19:
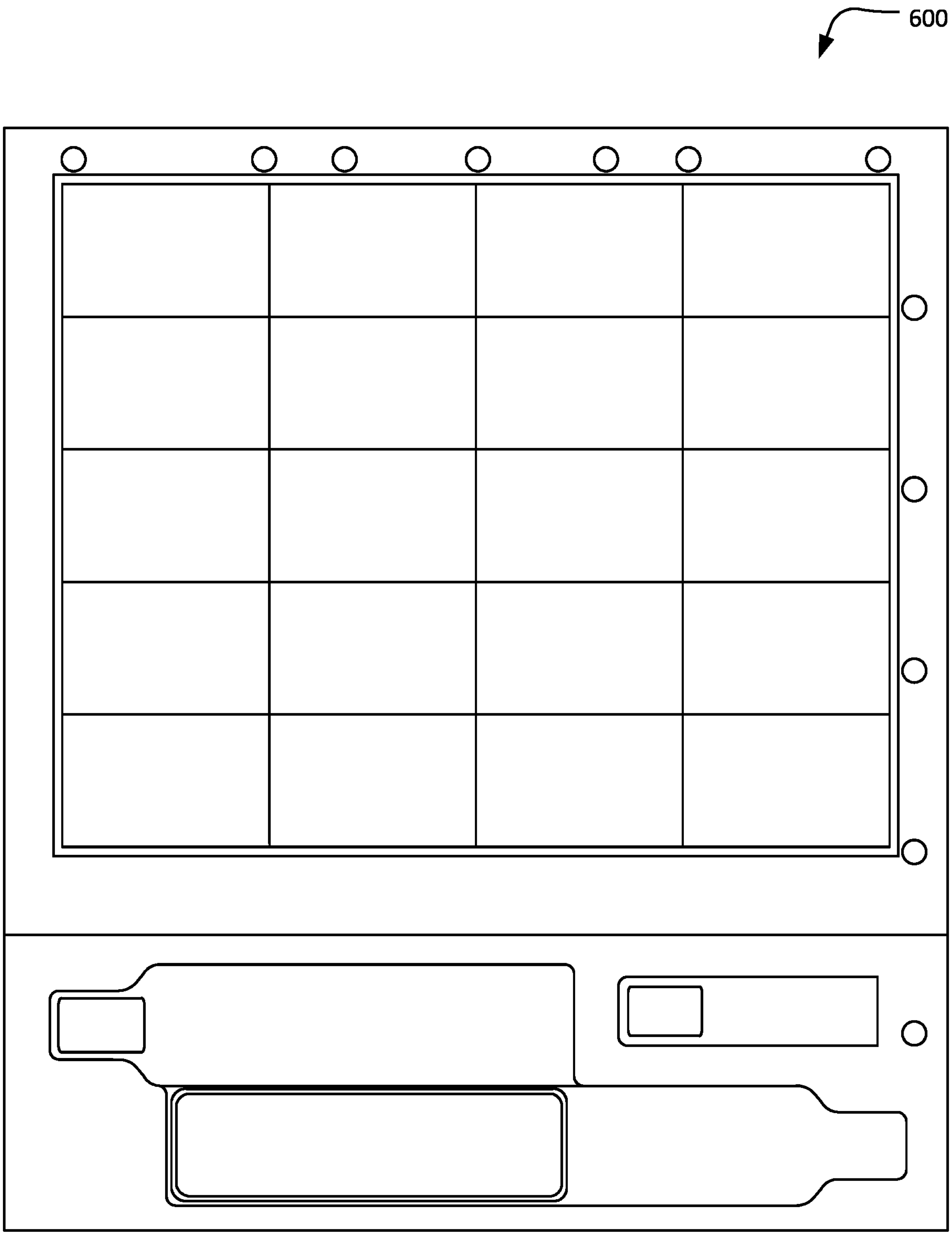
FIG. 19 shows a front view of a business form having a single ply wristband, according to another embodiment.
Figure 20:
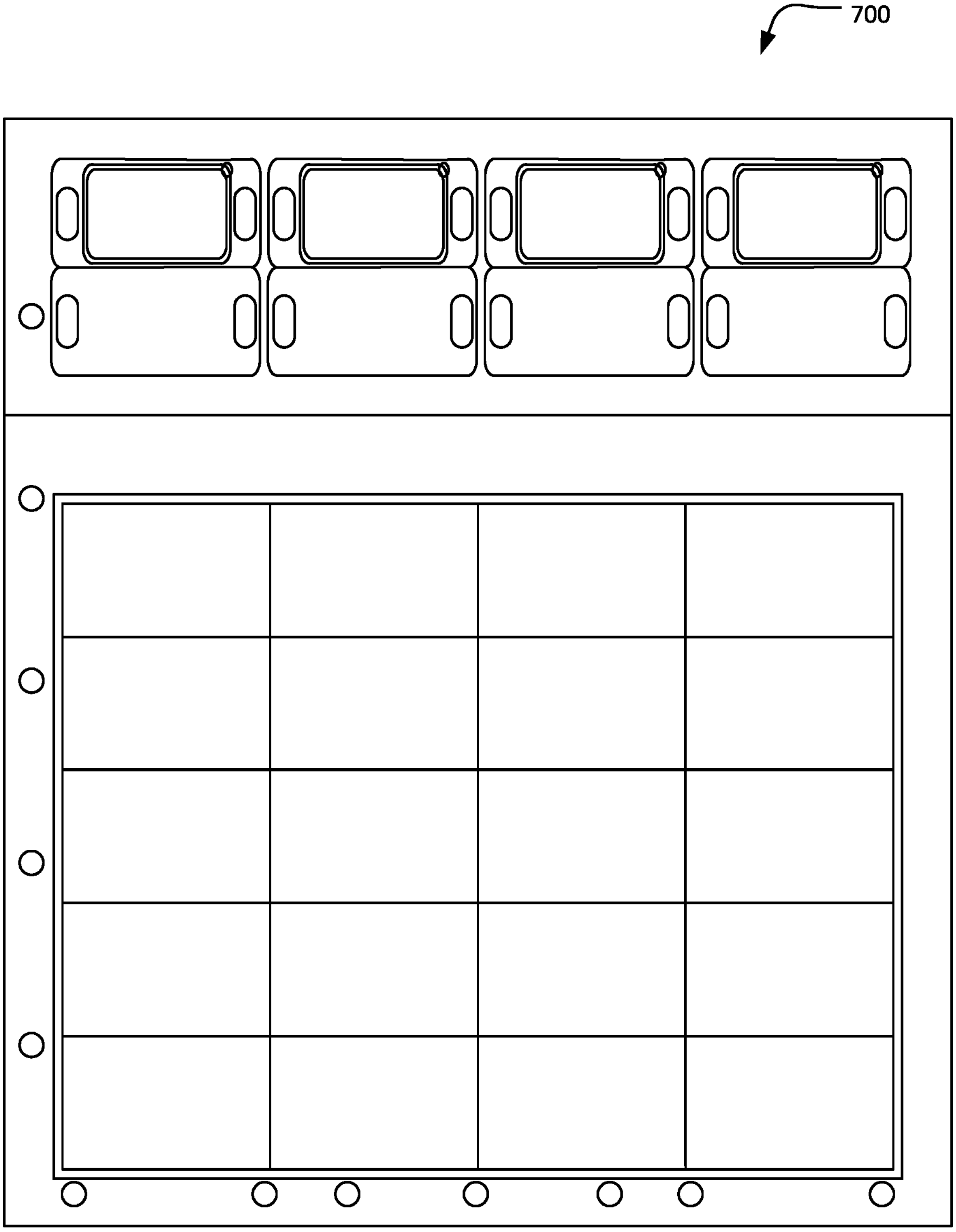
FIG. 20 shows a front view of a business form having single ply tags, according to still another embodiment.
Figure 21:
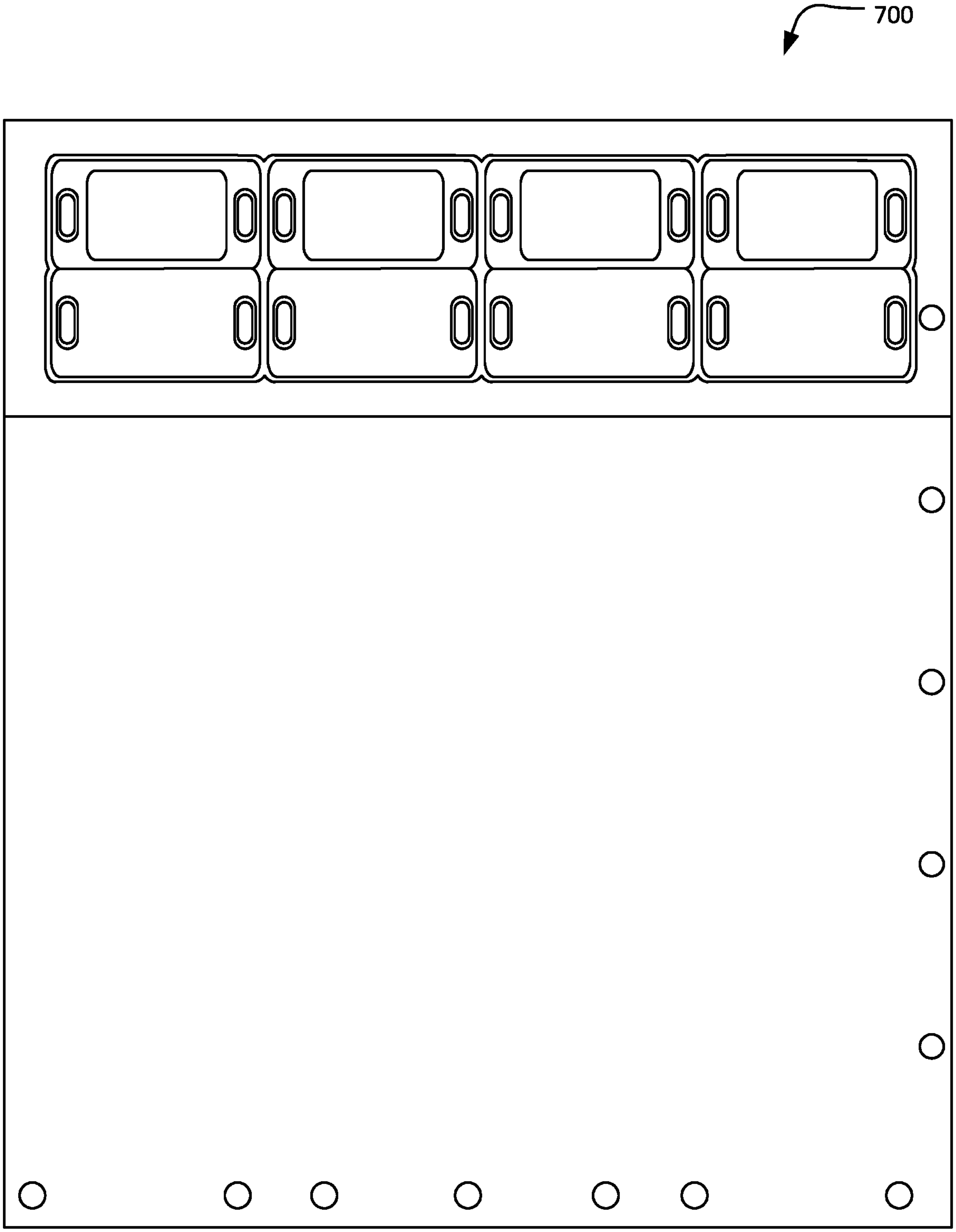
FIG. 21 shows a rear view of the business form of FIG. 20.
Figure 22:
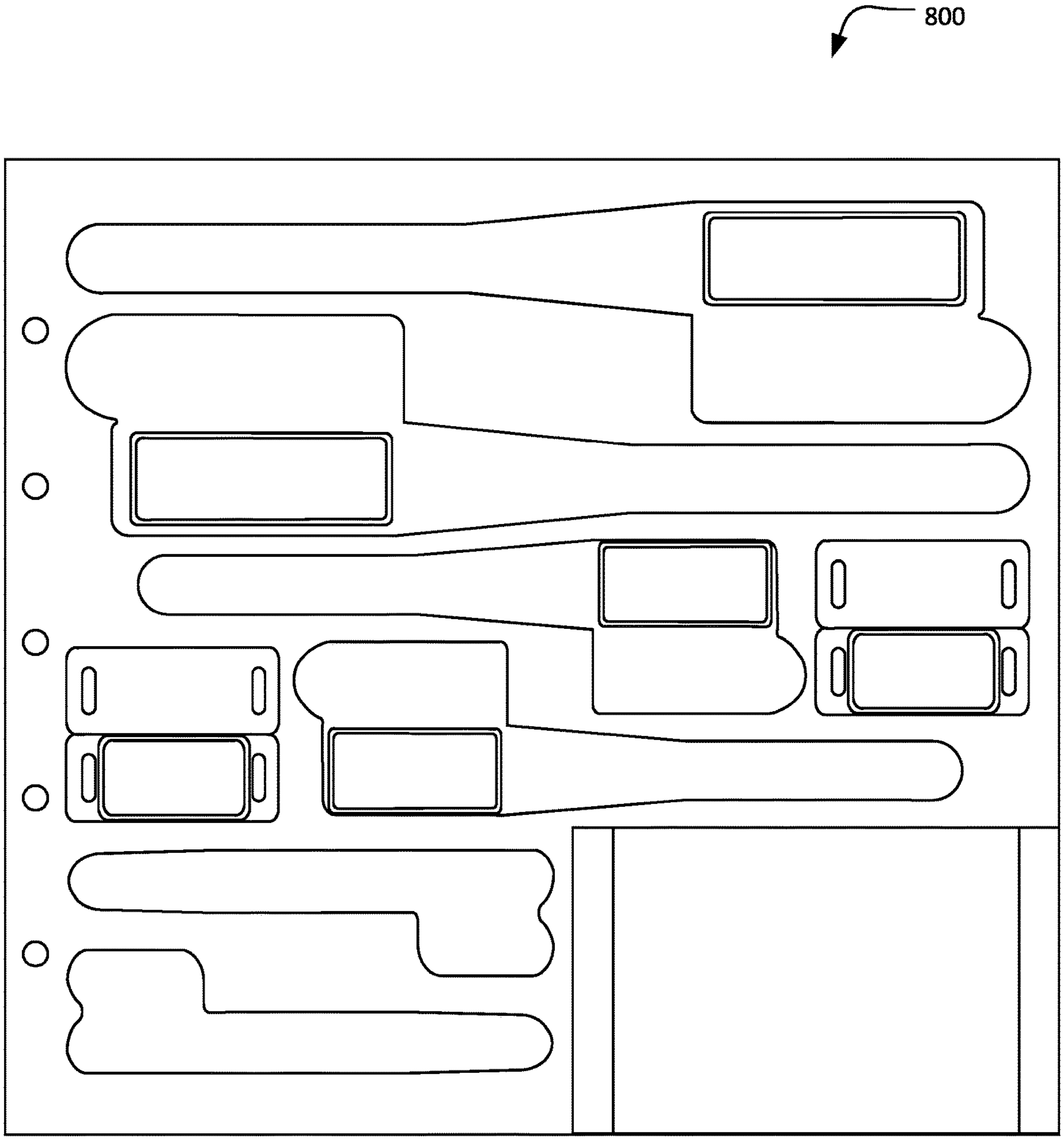
FIG. 22 shows a front view of a business form having single ply wristbands, according to yet another embodiment.
Figure 23:
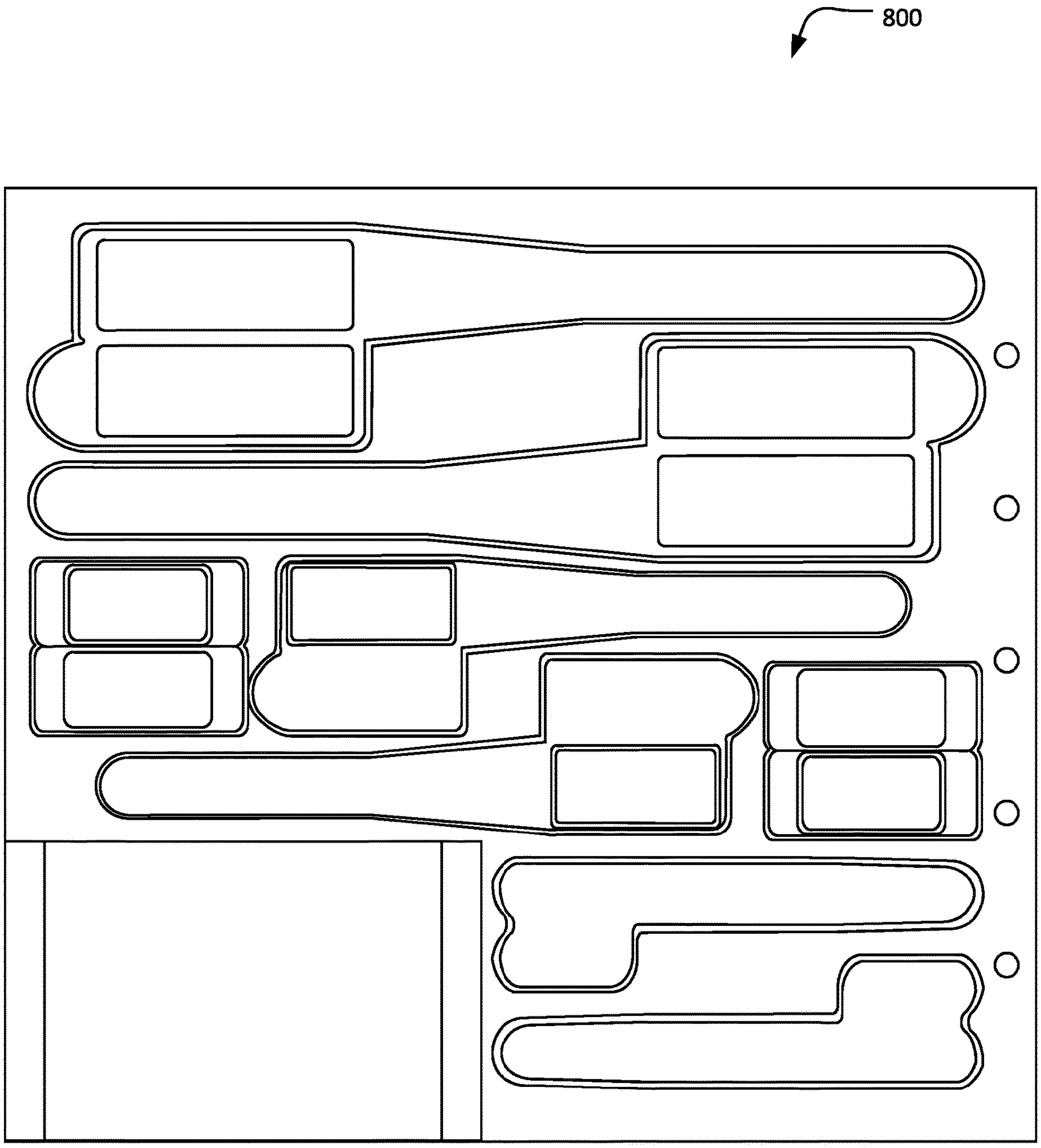
FIG. 23 shows a rear view of the business form of FIG. 22.
Figure 24:
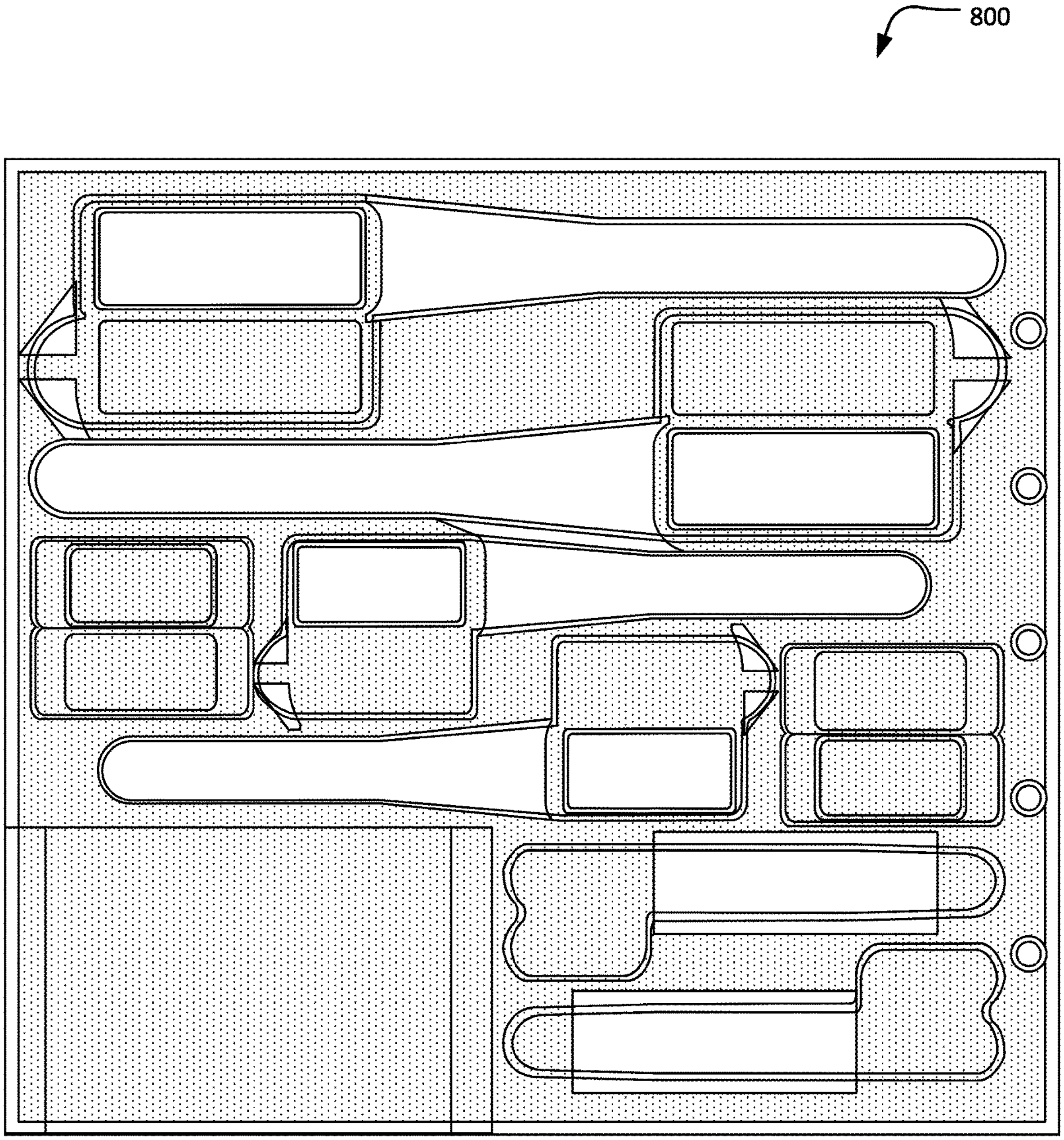
FIG. 24 shows areas of the business form of FIG. 22 comprising adhesive.
Figure 25:
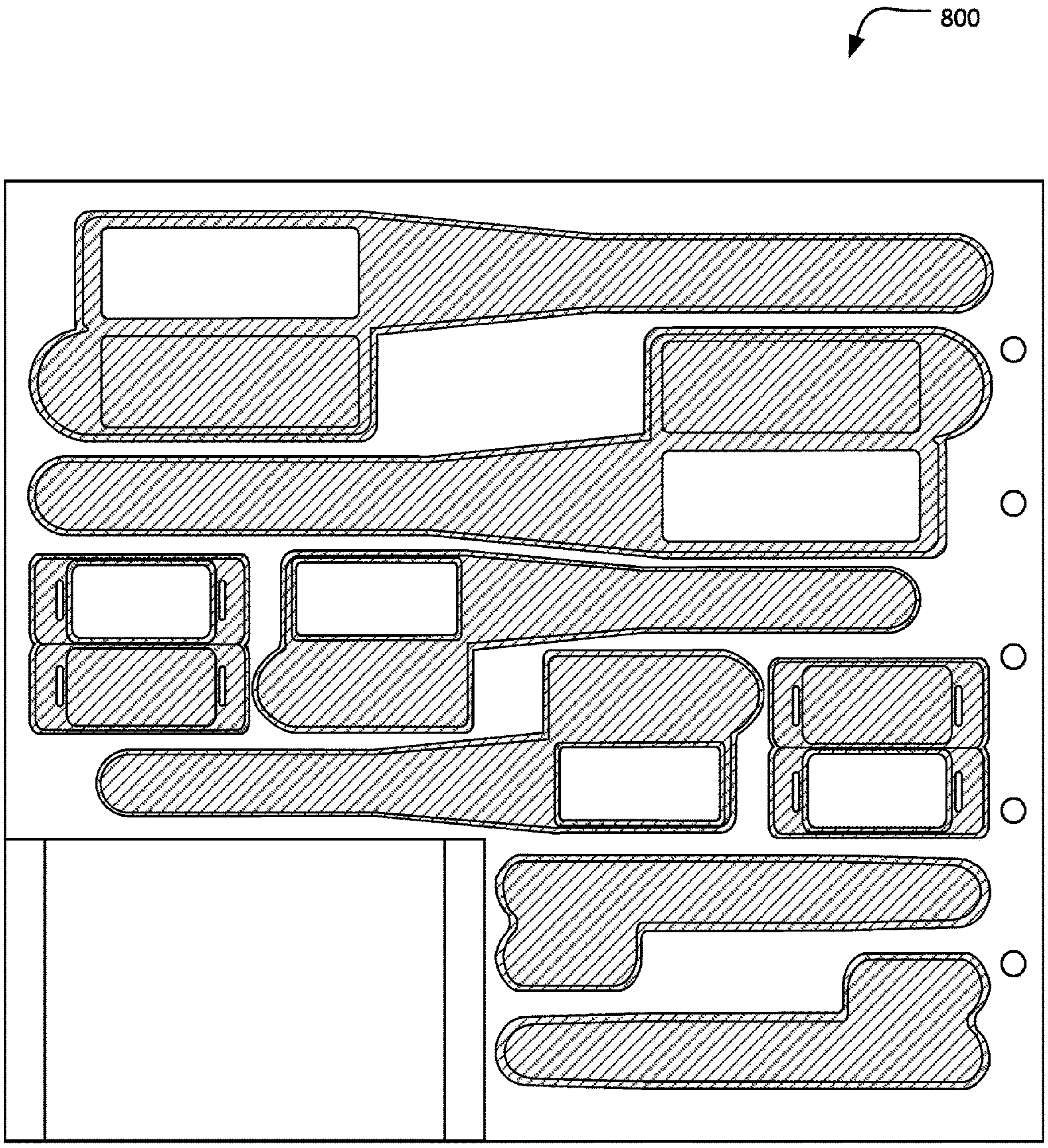
FIG. 25 shows areas of the business form of FIG. 22 comprising a release material.
Figure 26:
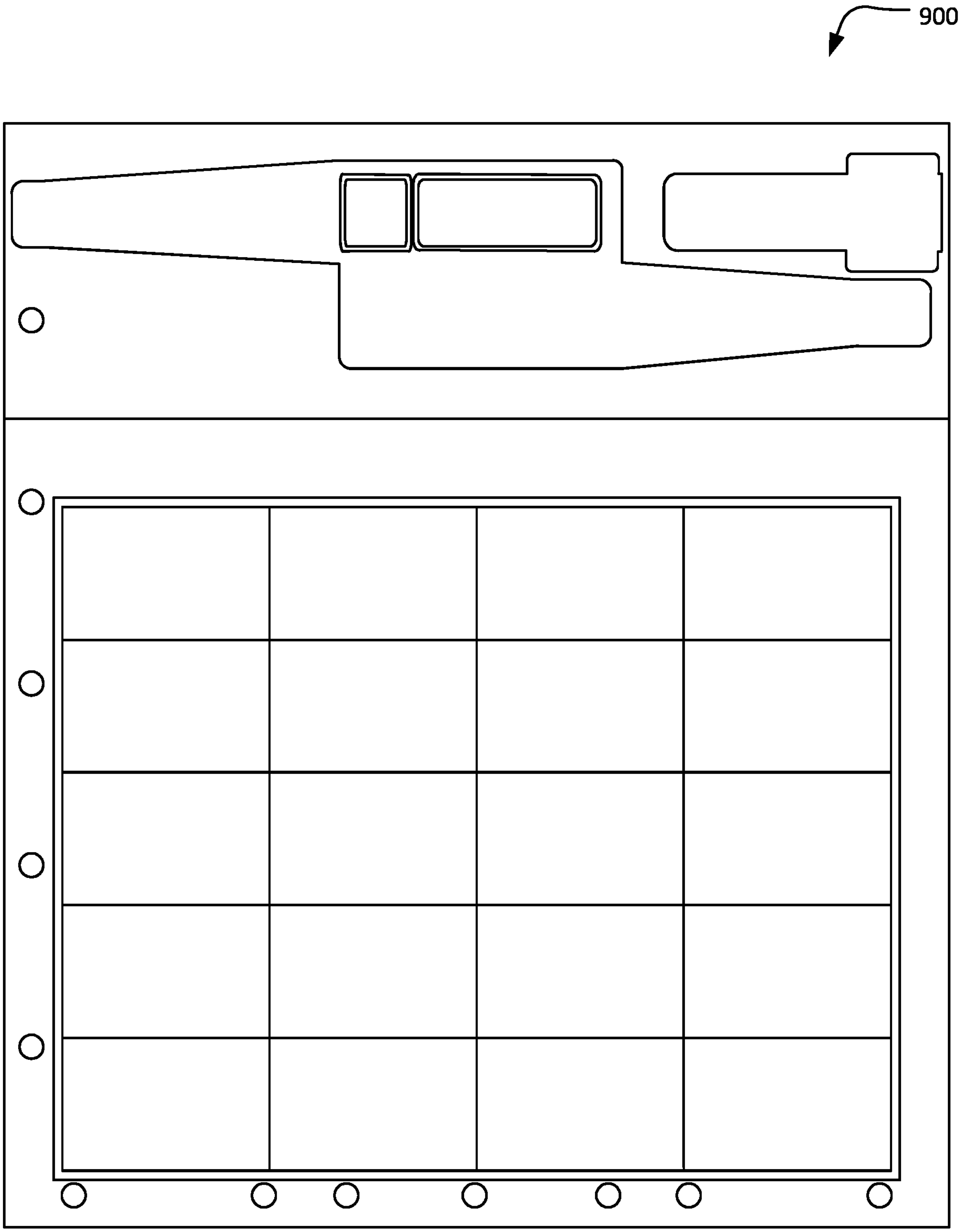
FIG. 26 shows a front view of a business form with a wristband, according to a further embodiment.
Figure 27:
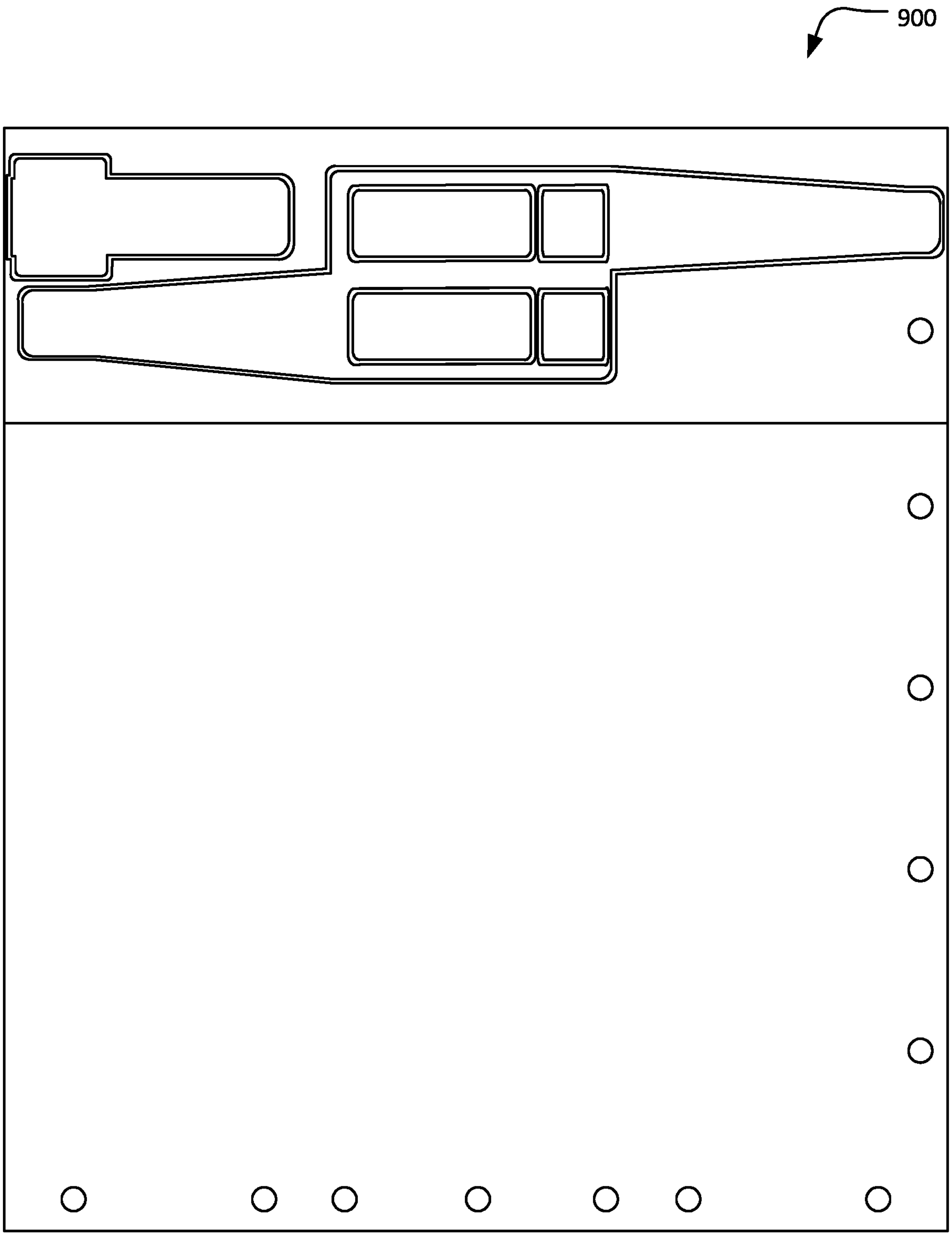
FIG. 27 shows a rear view of the business form of FIG. 26.
Figure 28:
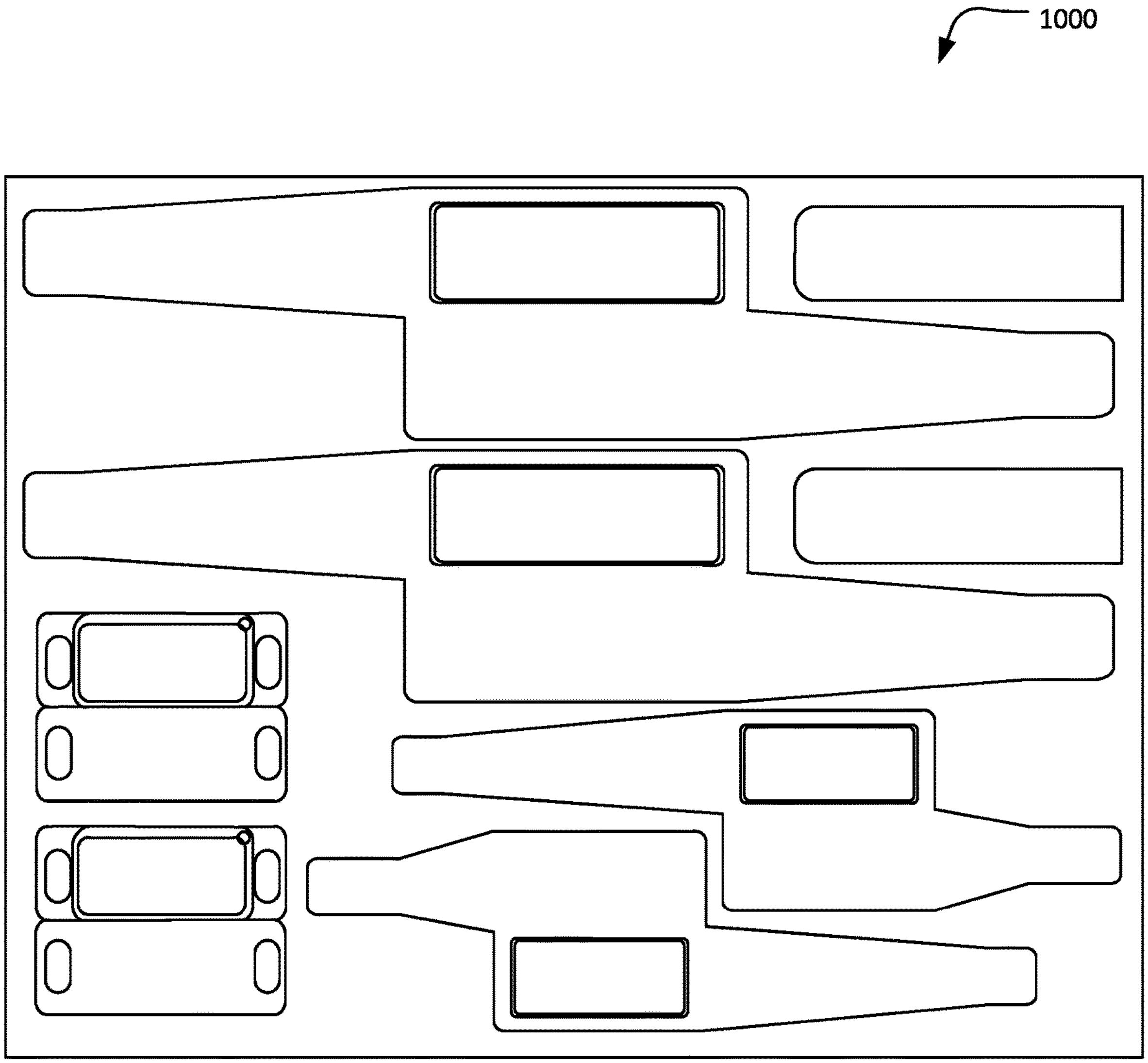
FIG. 28 shows a front view of a business form with wristbands, according to another embodiment.
Figure 29:
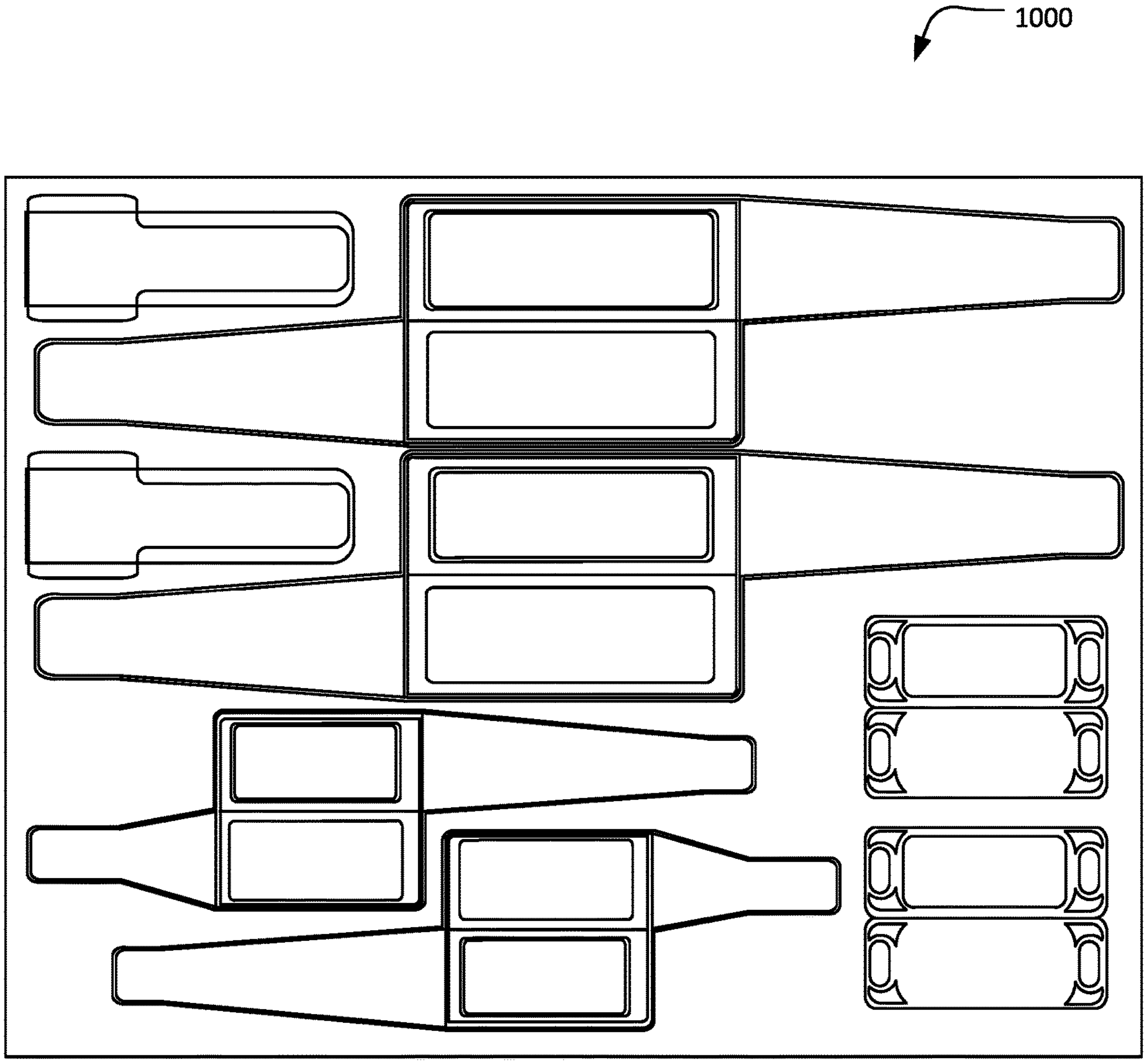
FIG. 29 shows a rear view of the business form of FIG. 28.
Figure 30:
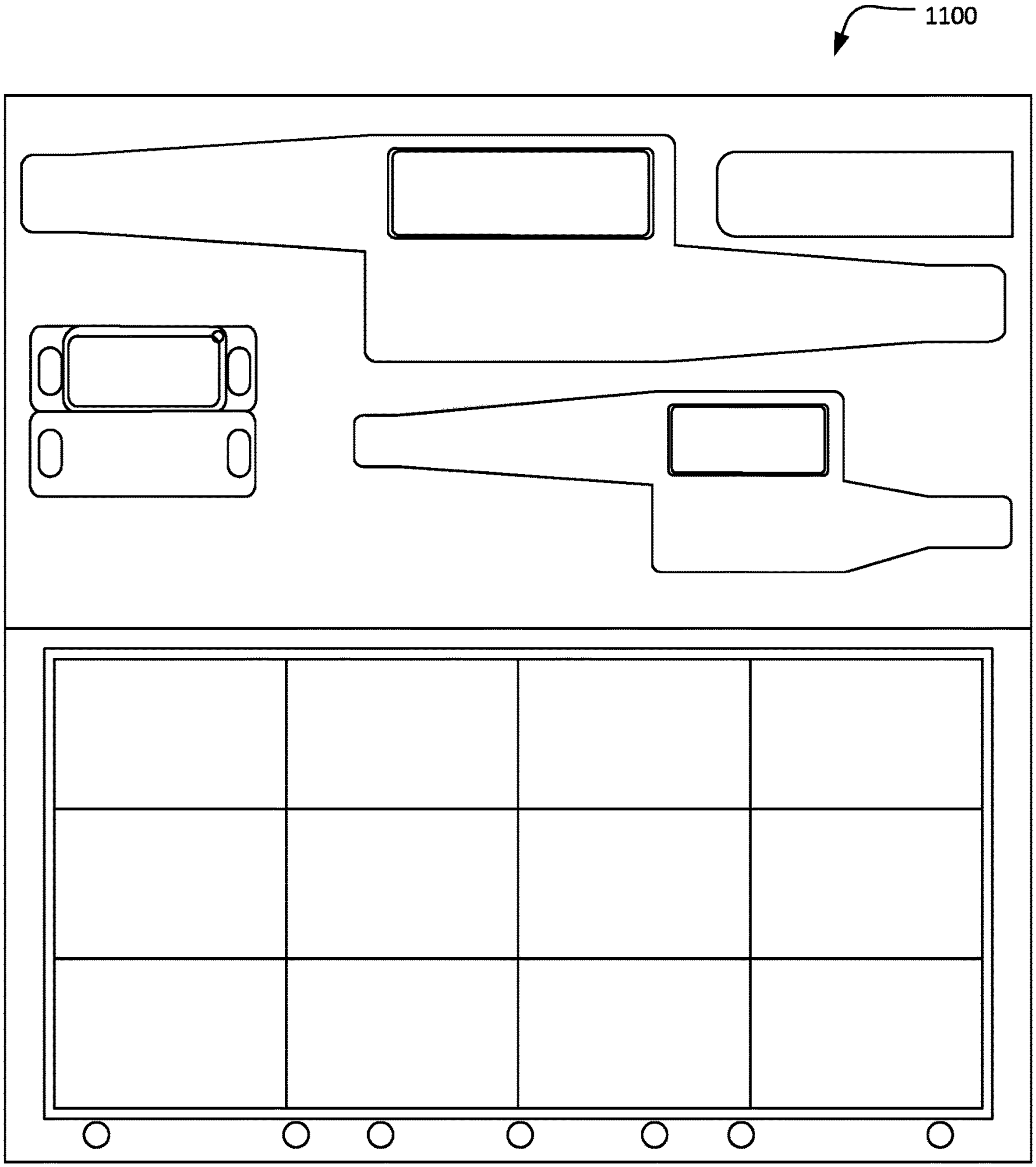
FIG. 30 shows a front view of a business form with wristbands, according to yet another embodiment.
Figure 31:
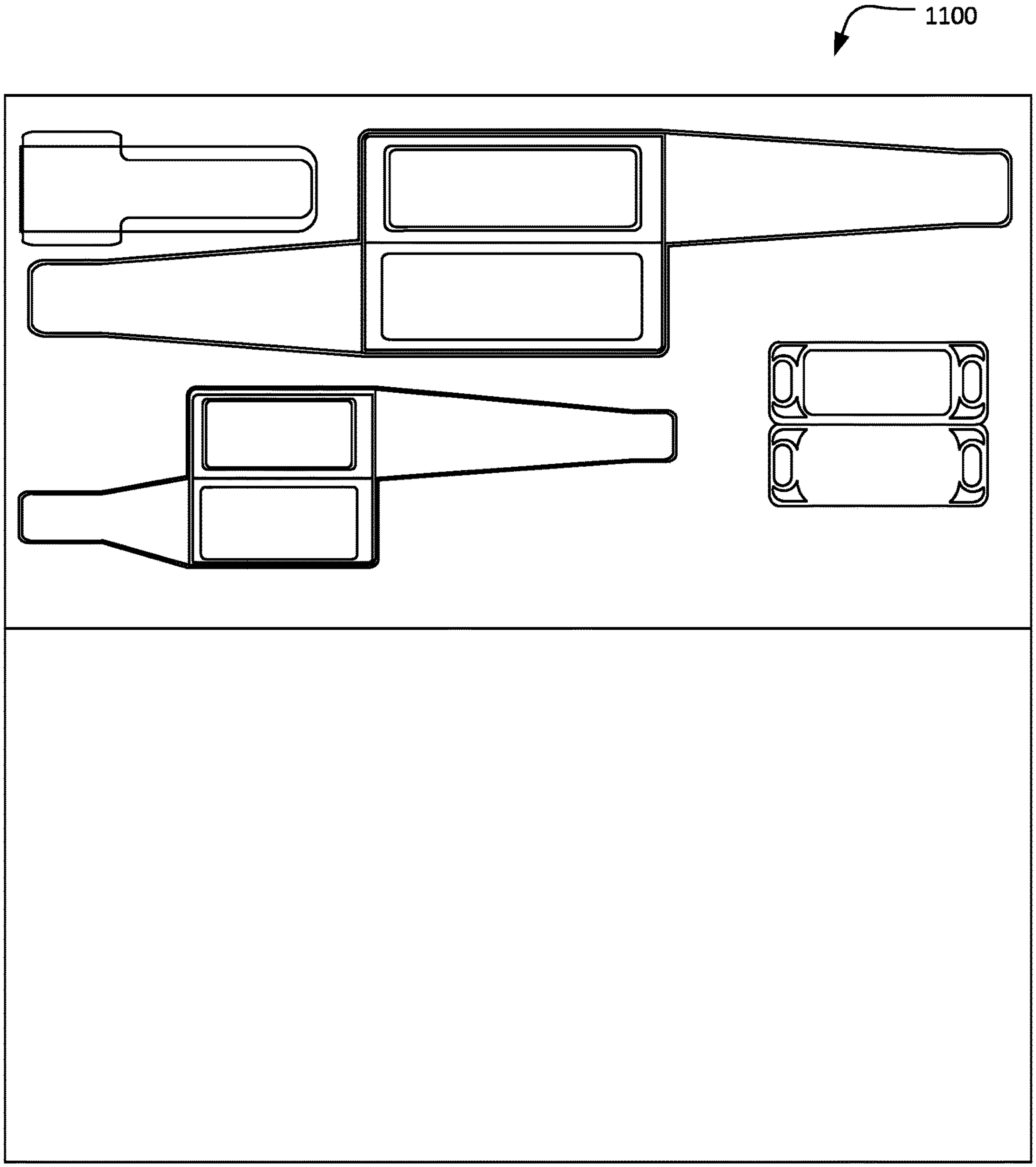
FIG. 31 shows a rear view of the business form of FIG. 30.

FIGS. 9-31 illustrate a plurality of embodiments that depict various alternate configurations of the business form described herein. Specifically, FIGS. 9-31 illustrate business forms 200-1100. The components of the alternate embodiments 200-1100 shown in FIGS. 9-31 may be similar to those of the business form 100 (e.g., the alternate embodiments may include a wristband, a strap, an extender, a void, a label area, a printable coating, a protruding portion, and/or any other component described herein). However, the alternate embodiments of FIGS. 9-31 may differ from the business form 100 in the configuration and/or orientation of these components. For example, one or more of the alternate embodiments may include a plurality of wristbands (see form 200 in FIGS. 9 and 10, and form 1100 in FIGS. 30 and 31), a plurality of straps (see form 500 in FIGS. 15-18), a plurality of extenders (see form 800 in FIGS. 22-25), a plurality of windows (see form 300 in FIGS. 11 and 12, and form 900 in FIGS. 26 and 27) and/or one or more windowed tags (see form 400 in FIGS. 13-14). Alternately or additionally, one or more of the alternate embodiments may be devoid of a wristband (see form 700 in FIGS. 20-21, which comprises only tags), an extender (see form 500 in FIGS. 15-18), labels (see form 1000 in FIGS. 28 and 29), and/or a windowed tag (see form 600 in FIG. 19). Each of the plurality of components may be substantially the same to the other, though some embodiments may have plurality of components that differ from each other (e.g., by having different sizes, orientations, shapes, et cetera). One embodiment of the present invention, described in detail herein, provides for a wristband which may be removed from a form via one generally continuous motion. The wristband may have adhesive on one end only, or on both ends. Further, the wristband may be configured to include only a single layer of a light, synthetic (or other similar) material, thus making the wristband approximately half of the thickness of traditional wristbands currently on the market. Finally, the synthetic material may be water and tear resistant such that the wristband will not tear when removed from the backing sheet prior to affixing the wristband to the person. In one embodiment, the wristband may be configured to be removed from a form without leaving a hole in the form, thus leaving the backing sheet intact such that the form may be passed through a printer multiple times. In embodiments, the wristbands and/or tags of each of the forms 200-1100 may be devoid of paper, may comprise only a solitary ply, and indicia thereon may be printed directly on the plastic (e.g., polyester) wristband or on a printable coating thereover.

Figure 32:
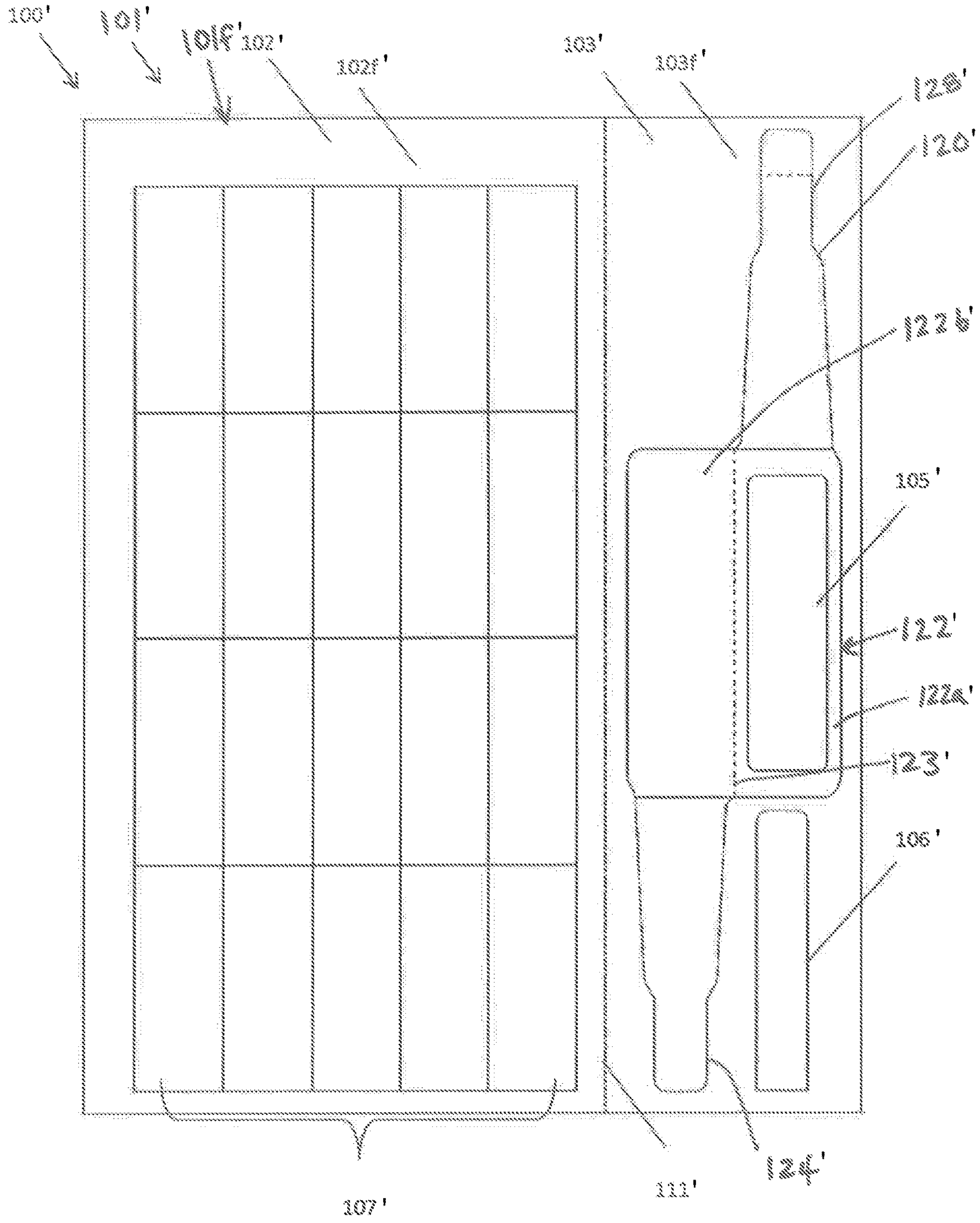
FIG. 32 is a front side view of a combination wristband and label form according to still embodiment of the invention.
Figure 34:
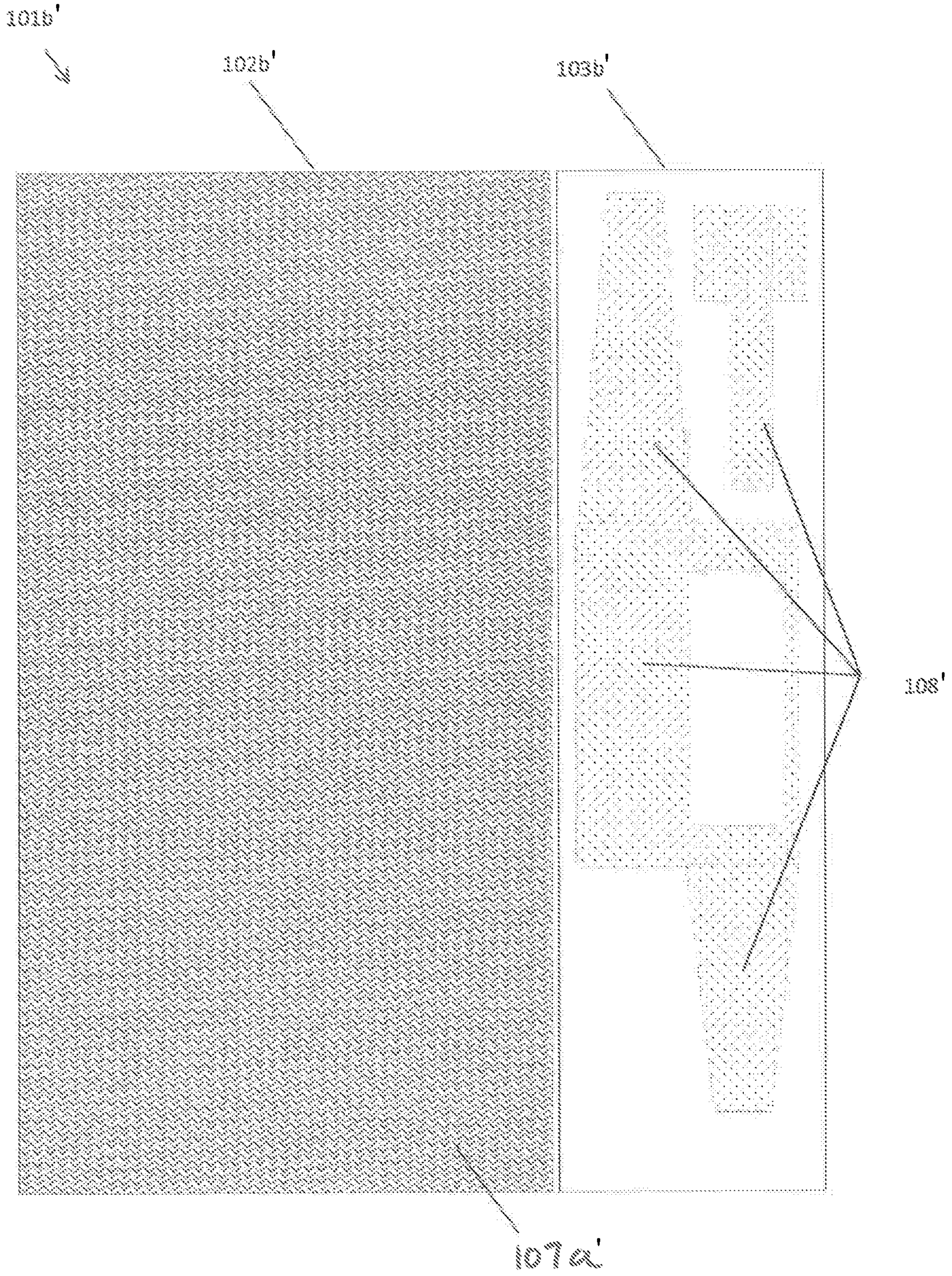
FIG. 34 is a back side view of the combination wristband and label form showing an adhesive and silicone pattern according to the embodiment of FIG. 32.
Figure 35:
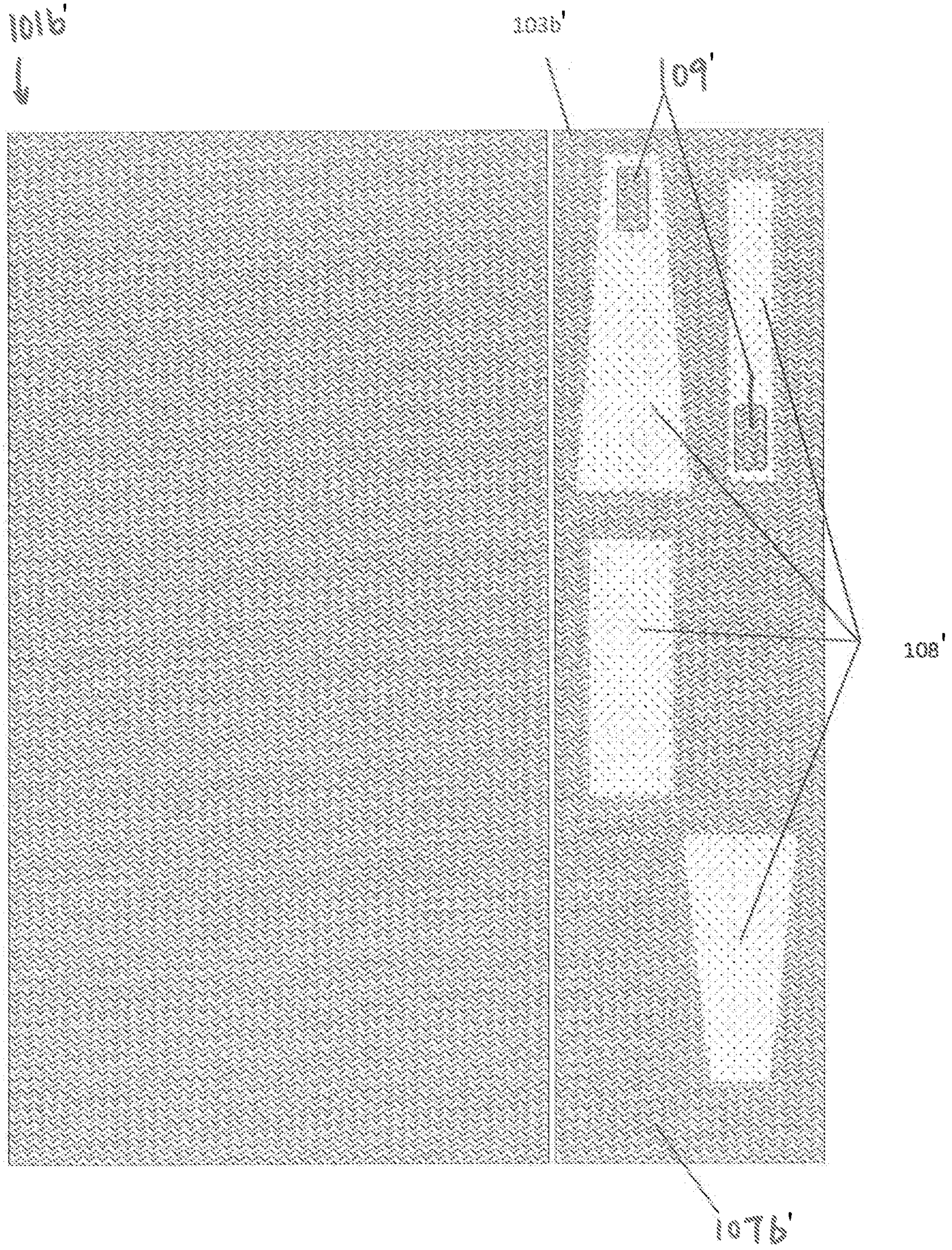
FIG. 35 is a back side view of an alternative embodiment of adhesive and silicone patterns of the form of FIG. 32.

FIG. 32 illustrates one embodiment of a combination wristband and label form 100'. The form 100' includes a front sheet 101' adhered to a backing sheet 140'. The front sheet 101' has a front side **101*f*' and a back side 101*b*' (FIGS. 34 and 35). The front sheet 101' may in some embodiments be separated into a top portion 102' and a bottom portion 103' having a relatively small gap therebetween. The top portion 102' and the bottom portion 103' may each have a front face 102*f*' and 103*f*', and a back face 102*b*' and 103*b*', respectively. The top portion 102' and the bottom portion 103' may be separated by a vertical perforation 111'**.

The front surface **102*f*' of the top portion 102' may include a plurality of labels 107'. The labels 107' may be arranged in columns and rows, for example, 4×6. However, the labels 107' may be provided in any combinations of columns (e.g., 1, 2, 3, 4, etc.) and rows (e.g., 1, 2, 3, 4, etc.). The labels 107' may be configured to receive indicia. Accordingly, the front surface 102*f*** may be constructed of paper or other appropriate textile sufficient for receiving ink, e.g., from a printer or other marking device.

The labels 107' may have a variety of constructions. For example, the figures illustrate the labels 107' as having a generally rectangular configuration. However, the labels 107' may be square, circular, polygonal, etc. Additionally, a combination of label configurations may be employed on a single form 100'

The bottom portion **103*f* may comprise one or more outlines of wristbands 120'. The wristbands 120' may include a paper area 105' which is be configured to be printable. In some embodiments, the form 100' may be configured to be passed through a printer so that indicia (e.g., patient name, patient medications, machine readable information such as barcodes, et cetera) may be printed directly on the wristband paper area 105'. The paper area 105' may be die cut into the bottom portion 103*f*. In this manner, the paper area 105' may face the same direction as the labels 107', making it easier for indicia to be simultaneously printed on the labels 107' and the paper area 105'**.

Attention is now directed to FIGS. 34 and 35, which shows the back side **101*b*' of the form 100'. The back side 101*b*' may include a back face 102*b*' of the top portion 102' and a back face 103*b*' of the bottom portion 103'. The back face top portion 102*b*' may include an adhesive area 107*a*'. The adhesive area 107*a*' may allow for the labels 107' to be releasably secured to the backing sheet 140'. The back face bottom portion 103***b*' may additionally have an adhesive area 107*b*'. The adhesive area 107*b*' may correspond to the area surrounding the wristband 120' which remains in place when the wristband 120' is removed from the form 100'.

Figure 33:
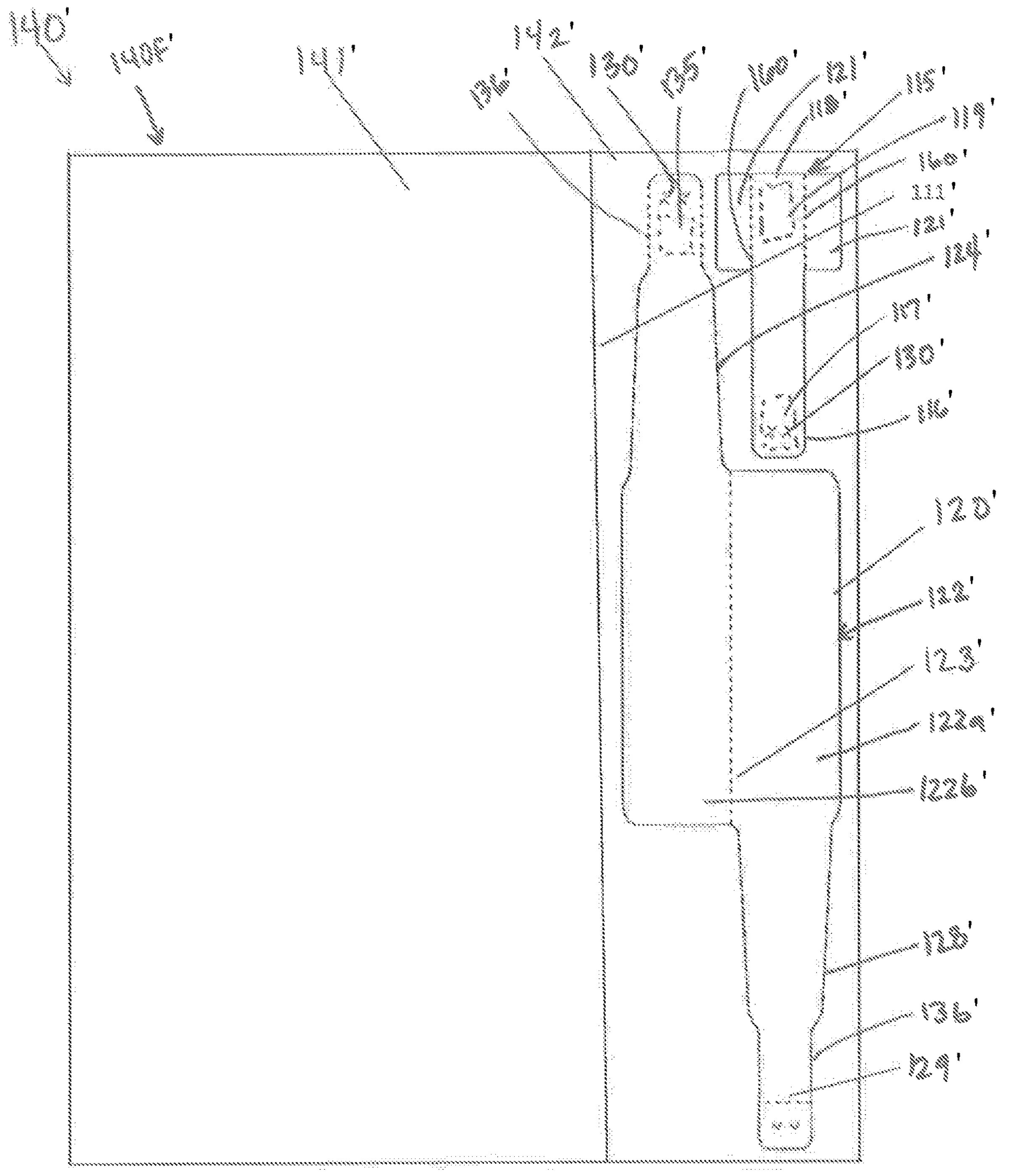
FIG. 33 is a back side view of the combination wristband and label form according to FIG. 32.

The adhesive areas 107*a*' and 107*b*' of the back faces 102*b*' and 103*b*' may adhere to a back side of the backing sheet 140', illustrated in FIG. 33. A top portion 141' of the backing sheet 140' may be constructed of paper or a synthetic resin, and the back side of the top portion 141' (not shown) may include a layer of silicone (or another similar release material) in the area corresponding to the adhesive area 107*a*'. A back side of the bottom portion 142' of the backing sheet 140' may additionally include a layer of silicone in the area corresponding to adhesive area 107*b*', or may alternatively be permanently adhered to adhesive area 107*b*' (such that the bottom portion 142' does not include a silicone layer). For example, the adhesive area 107*a*' may releasably adhere to the silicone material on top portion 141', and adhesive area 107*b*' may releasably (or permanently) adhere to bottom portion 142' as appropriate. The silicone material may be applied in a pattern which may allow for a more permanent adhesion between the backing sheet 140' and the front sheet 102' in areas void of silicone (e.g., the bond between the area of the bottom portion 142' surrounding the wristband 120' and the back side bottom portion 103*b*' may be stronger than the bond between the top portion 102*b*' and the top portion 141' of the backing sheet 140'). This may keep the area of the bottom portion 142' surrounding the wristband 120' in place upon removal of the wristband 120'. In some embodiments, the silicone material 107*b*' may be completely omitted so that the area of the bottom portion 142' surrounding the wristband 120' permanently adheres to the back side bottom portion 103*b*'.

As shown in FIG. 34, the back side bottom portion 103*b*' may further include areas of silicone 108' which may coincide with the wristband 120'. Additionally, as illustrated in FIG. 35, areas of adhesive 109' may be provided on the areas of silicone 108' to adhere the wristband 120' in place. Alternatively, as described below, adhesive 117', 119', and 135' may be applied to a back side of the backing 142' corresponding to portions of the wristband 120' and/or extension portion 115' in order to adhere the ends 124' and 128' of the wristband 120' together.

FIG. 33 illustrates the backing sheet 140' having a top portion 141' and a bottom portion 142'. The wristband 120' may be die cut into the bottom portion 142' of the backing sheet 140', and may be defined by two laterally opposing sides (or ends) 124' and 128' which may extend directly (e.g., without a transition) from a central portion 122' having an upper portion 122*a*' and a lower portion 122*b*' separated by an indention 123'. The laterally opposing sides (or ends) 124' and 128' may extend from the lower portion 122*b*' and the upper portion 122*a*', respectively (or vice versa).

The sides 124' and 128' extend directly from a central portion 122', without any transition, such as a shoulder, or other type of transition. With such a configuration, the material required for the wristband 120' may be less than otherwise may be required. Further, the design is sleek, having no protrusions or other unneeded and/or unwanted areas of material extending from the central portion 122' and/or the sides 124' and 128'.

As noted above, the upper portion 122*a*' (or the lower portion 122*b*') of the central portion 122' may include a small paper area 105' that is removed from the front sheet 101' along with the wristband 120'. The small paper area 105' may leave a small hole in the form 100' after removal therefrom. The wristband 120' may be configured to be self-laminating to protect the paper area 105'. Accordingly, adhesive may be applied to surround the paper area 105' on the central upper portion 122*a*'. Upon removal of the wristband 120' from the form 100', the wristband 120' may be folded about the indention 123' such that the adhesive on the central upper portion 122*a*' adheres to the central lower portion 122*b*' so that the paper area 105' is secured therebetween. Optionally, adhesive may be applied to the backside of the central lower portion 122*b*' in addition to, or instead of adhesive applied to the backside of the central upper portion 122*a*'.

One of the laterally opposed sides, e.g., side 128', may include perforations 129', and have no adhesive inwardly adjacent the perforations 129'. The other laterally opposed side, e.g., side 124', may contain an area of adhesive 135' (FIG. 33) on a backside of the wristband 120', which may be in addition to the adhesive 109' provided on the face sheet portion back side 103*b*'. Alternatively, the adhesive at side 124' may be provided instead of the adhesive 109'. The adhesive 135' and/or 109' may keep the end 124' secured to the front sheet back side bottom portion 103*b*'. The wristband 120' may be substantially held into position via the adhesive patch 135' and the perforated side 128'. The wristband 120' may contain no adhesive apart from the adhesive 135' adjacent the end 124' and the adhesive surrounding the paper area 105' as described above.

The laterally opposing sides 124' and 128' of the wristband 120' may be generally rectangular. In one embodiment, the sides 124' and 128' are completely straight, without a taper. Alternatively, as shown in the figures, the sides 124' and 128' may gradually taper towards the end and may conclude in a tongue 136'. Alternatively, the wristband 120' may take on other desirable shapes. In one embodiment, a height of the tongue 136' (e.g., end 124') may be less than a height of the remainder of the wristband 120' (including being less than the height of the end 128').

The wristband 120' may be further equipped with security slits 130'. The security slits 130' may be configured to tear, should the wristband 120' be tampered with after the wristband 120' is applied to a wearer. This may be beneficial to ensure that the wristband 120' remains associated with the intended wearer, particularly in a healthcare environment where the wristband 120' includes patient-specific information.

In addition to the wristband 120', an extension portion 115' may be die cut into the bottom portion 142' of the backing sheet 140' to allow the wristband 120' to accommodate larger wrists. The extension portion 115' may include a first end 116' having an area of adhesive 117' on the backside thereof. A second end 118' may additionally have an area of adhesive 119' on the backside. Adhesive may not be located between the first and second ends of the extension portion 116' and 118', respectively. The second end 118' may additionally include arms 121' extending outwardly from the second end 118', and separated from the second end 118' by lines of perforation 160'. Adhesive may be located on the backside of the arms 121'. In one embodiment, the arms 121' may be separated from the second end 118' by tearing away at the lines of perforation 160'. In another embodiment, the extension second end 118' may be aligned with an end 124' or 128' of the wristband 120' and placed thereupon. The arms 121' may then be folded about the lines of perforation 160', one at a time, to further secured the extension 115' to the wristband 120'.

As noted above, the extension portion 115' may attach to either end 124' and 128' of the wristband 120', and may extend the reach of the band 120' my approximately one and one-half inches, for example, although other lengths may additionally or alternatively be accommodated. Further, the extension may also incorporate tamper evident slits 130'.

The bottom portion 142' may be constructed of a synthetic material, such as polyester fabric or plastic, for example. Other materials may additionally, or alternately, be appropriate. Those of skill in the art may recognize that it may be beneficial for the wristband 120' material to be resistant to water or other liquid, which may cause the integrity of the wristband 120' to be prematurely compromised.

In use, after the wristband 120' has been printed, the user may peel the side 124' of the wristband 120' up and away from the form 100', inserting his or her finger under, for example, the bottom edge, until the finger exits at the top edge. The user may then tear the side 128' along the perforations 129' to free the wristband 120' from the form 100'. Alternately, the user may hold the wristband 100', e.g., from the top or bottom edge, between his index finger and thumb, tear the side 128' along the perforations 129', and then separate the wristband 120', including the side 124' having the adhesive 119', from the form 100'. In this way, the user may remove the wristband 120' from the form 100' in one generally continuous motion. The user may then fold the wristband 120' about the indention 123' and subsequently attach the wristband 120' to a person's wrist by wrapping the wristband 120' around the wrist, face up, and fastening the adhesive end (e.g., side 124') to the face of the wristband 120'. The extension portion 115' may similarly be removed from the form 100' and secured to the wristband 120' as described above.

Such quick and convenient removal of the wristband 120' and/or the extension portion 115' from a single side (e.g., of the backing sheet 140') of the form 100' and its ready securement to a person's wrist may be preferable, as compared for example, to wristbands that must be removed from the associated forms in several steps. This may allow the user to save valuable time, especially where many wristbands 120' are utilized in a single setting. Further, the wristband 120' being removed from a single side of the form 100' eliminates the difficulty of the user having to access both sides of the form 100' in order to push one piece through in order to pull the remainder of the wristband off the form.

Figure 36:
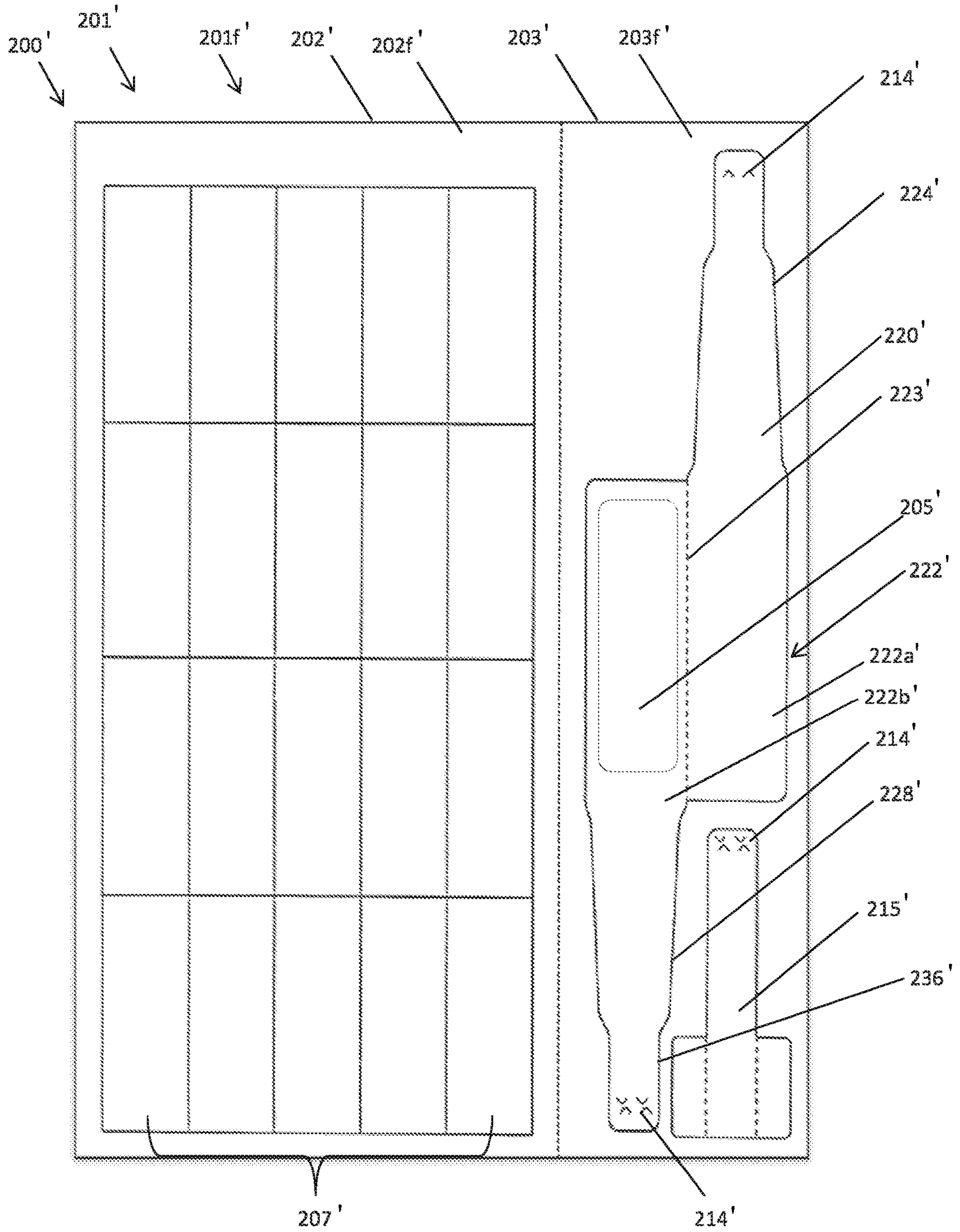
FIG. 36 is a front side view of a combination wristband and label form according to another embodiment of the invention.
Figure 37:
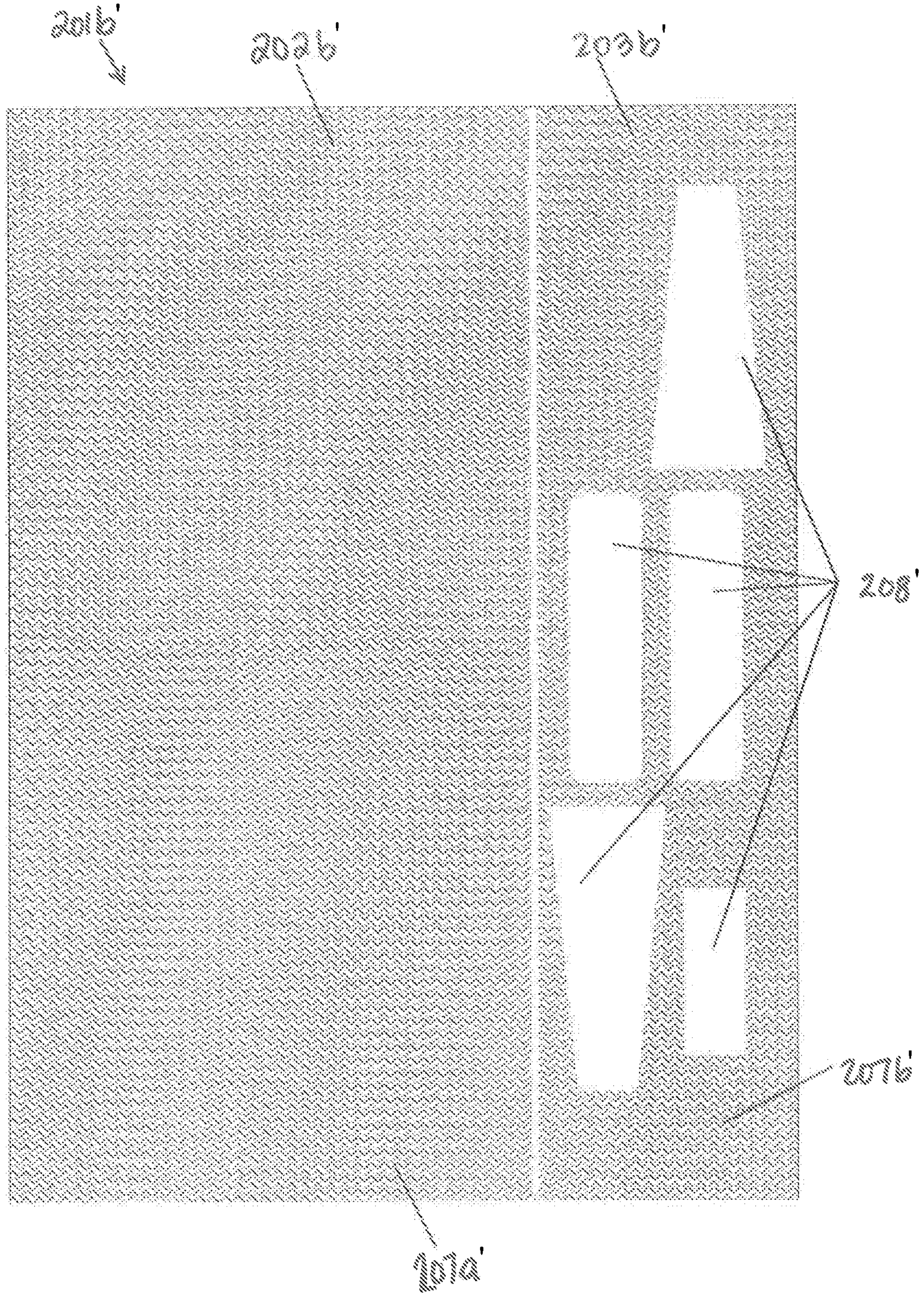
FIG. 37 is a back side view of the combination wristband and label form of FIG. 36.

Referring now to FIGS. 36-37, an alternative embodiment of a form 200' is illustrated which is similar to the form 100' except as shown and described herein. Here, the wristband 220' of the form 200' may be die cut into the bottom portion front face **203*f*', and may be defined by two laterally opposing sides (or ends) 224' and 228' which may extend directly (e.g., without a transition) from a central portion 222' having an upper portion 222*a*' and a lower portion 222*b*' separated by an indention 223'. The laterally opposing sides (or ends) 124' and 128' may extend outwardly from the lower portion 222*b*' and the upper portion 222*a*', respectively (or from the upper portion 222*a*' and the lower portion 222*b*'**, respectively).

The sides 224' and 228' may be generally rectangular, and may be completely straight. Optionally, the sides 224' and 228' may taper aware from the central portion 222' and conclude in a tongue 226', similar to the wristband 120' described above. One or both ends 224' and 228' may include tamper evident slits 214', configured to tear should the wristband 220' be tampered with after the wristband 220' is applied to the wearer.

The lower portion **222*b*' (or the upper portion 222*a*' as the case may be) of the central portion 222' may include a small laser printable area 205' which may allow indicia to be printed on the wristband 220' without having to provide a paper area. Further, the laser printable area may allow for the wristband 220' to be removed from the form 200' without leaving a hole in the form 200'**.

An extension band 215', substantially similar to extension band 115' may additionally be included with the wristband 220' on the front face bottom portion **203*b*'**.

Referring now to FIG. 37, which illustrates a back side **201*b*' of the form 200', adhesive areas 207*a*' and 207*b*' may be provided. It may be advantageous to additionally have areas 208' without adhesive. The adhesive areas 207*a*' and 207*b*' may adhere to a backing sheet which may be made of, for example, paper or synthetic resin and may be generally similar to back sheet 140'. The backing sheet may include silicone or other suitable release material on the side of the backing sheet which contacts the adhesive areas 207*a*' and 207*b*'. This may thus allow the top portion 202' and bottom portion 203' to be releasably adhered to the backing sheet. As can be seen my comparing FIGS. 36 and 37, the area of adhesive 207*b*' may be such that it encompasses a portion of the sides 224' and 228', and further such that adhesive is provided around the perimeter(s) of the central upper and lower portions 222*a*' and 222*b*'**.

The configuration of the wristband 220' on the form 200' may be such that the adhesive ends 224' and 228' are initially all facing the same direction (e.g., toward the backing sheet). Upon folding the wristband 220' about the indention 223', the adhesive covered ends 224' and 228' may face in opposite directions such that they meet back to back, thus forming a solid adhesion to the wristband 220' (or the extension portion 215') and not exposing the adhesive to the patient.

In use, a user may peel the wristband 220' from the form 200', wherein the adhesive remains at the desired location on the underside of the wristband. The wristband 220' may be peeled from the form 200' in a similar manner as that described above regarding wristband 120'. Specifically, a user may insert his or her finger under the wristband 220' from the bottom edge, the finger exiting under the top edge. The user may then slide his or her finger toward one of the ends (e.g., end 228') to release the adhesive under the end 228' from the backing. The user may then grasp the end (e.g., 228') and peel the rest of the wristband 220' from the backing. Therefore, as with the wristband 120', the wristband 220' may similarly be pulled from a single side of the form 200'.

When the wristband 220' is removed from the form 200', the area of the backing sheet behind the wristband 120' may remain intact. Such a configuration may provide several benefits over prior art wristbands. For example, as noted above, other methods may consist of "punching out" the wristband from the form leaves a void that may prevent the rest of the form from being used at a later time. However, if the form remains intact, as in the present invention, it may be used multiple times, for example, to print on the labels 207'. This may be beneficial because it is often desirable to print the labels 207' at different times (for example, it may be desirable to print new labels 207' to reflect changes made to medications prescribed to a patient during the course of his treatment). A new label 207', such as a label 207' leftover on the form 200', may thus be printed with the new information until all the labels 207' have been used. Of course, the labels 207' may be used for any desirable purposes, such as for labeling patient files and other documents, vials, etc. The labels 207' may all be printed with information in a single pass through the printer, or the form 200' may be passed through the printer multiple times such that the labels 207' are printed as needed.

Figure 38:
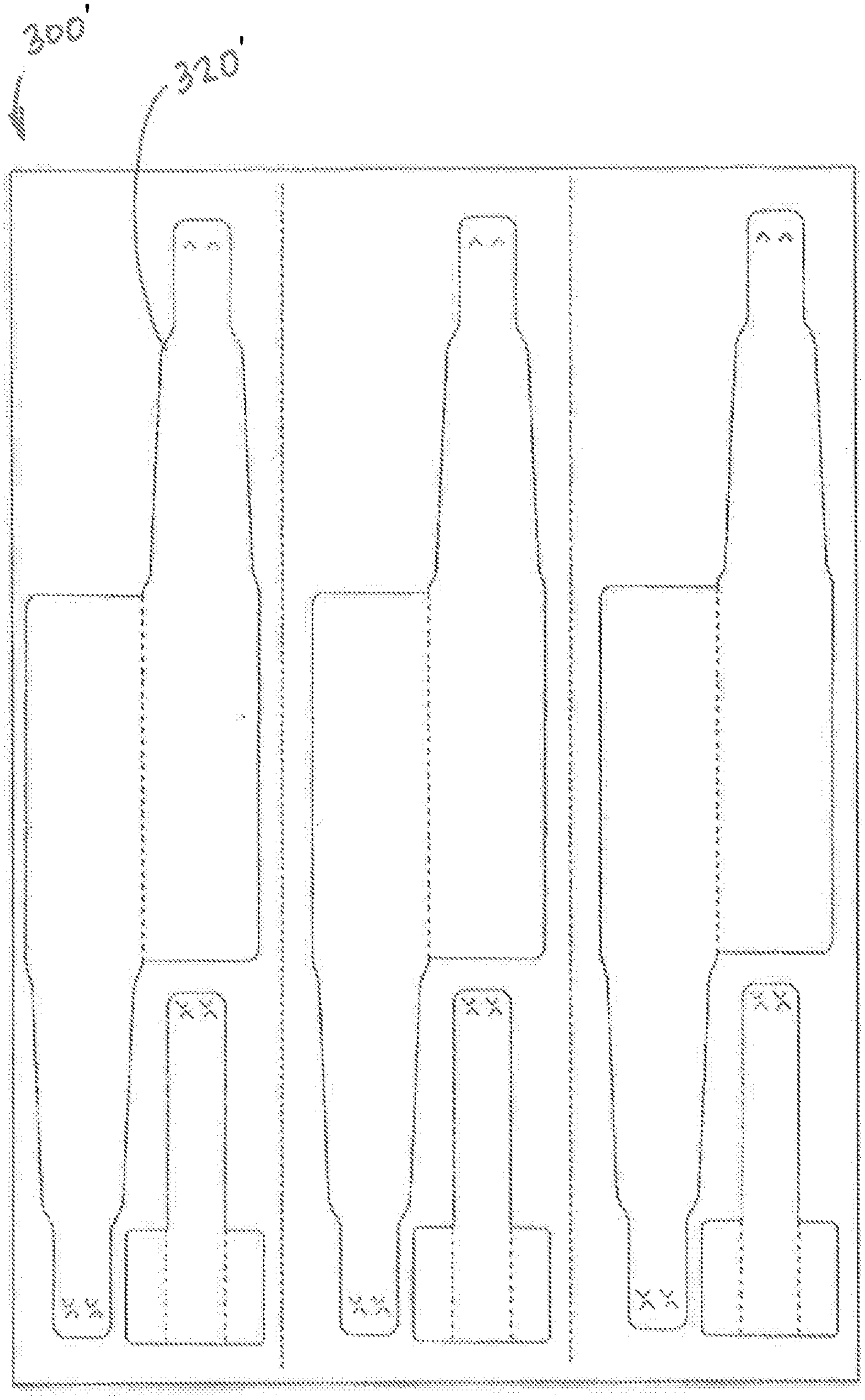
FIG. 38 is a front side view of an alternative embodiment of the form of FIG. 36.

In another embodiment, illustrated in FIG. 38, a form 300' may consist of a plurality of wristbands 320' (which may be wristband 120', 220', or another alternative wristband) and does not include labels 107' and 207'. Alternately, a form may include only a single wristband. The form 300' may be approximately the size of a standard piece of paper (e.g., 8½"×11"), or the form may be tailored to the size of the required wristbands and/or labels. For example, if only a single wristband is required, the form may be only the size necessary to contain one wristband.

Figure 39:
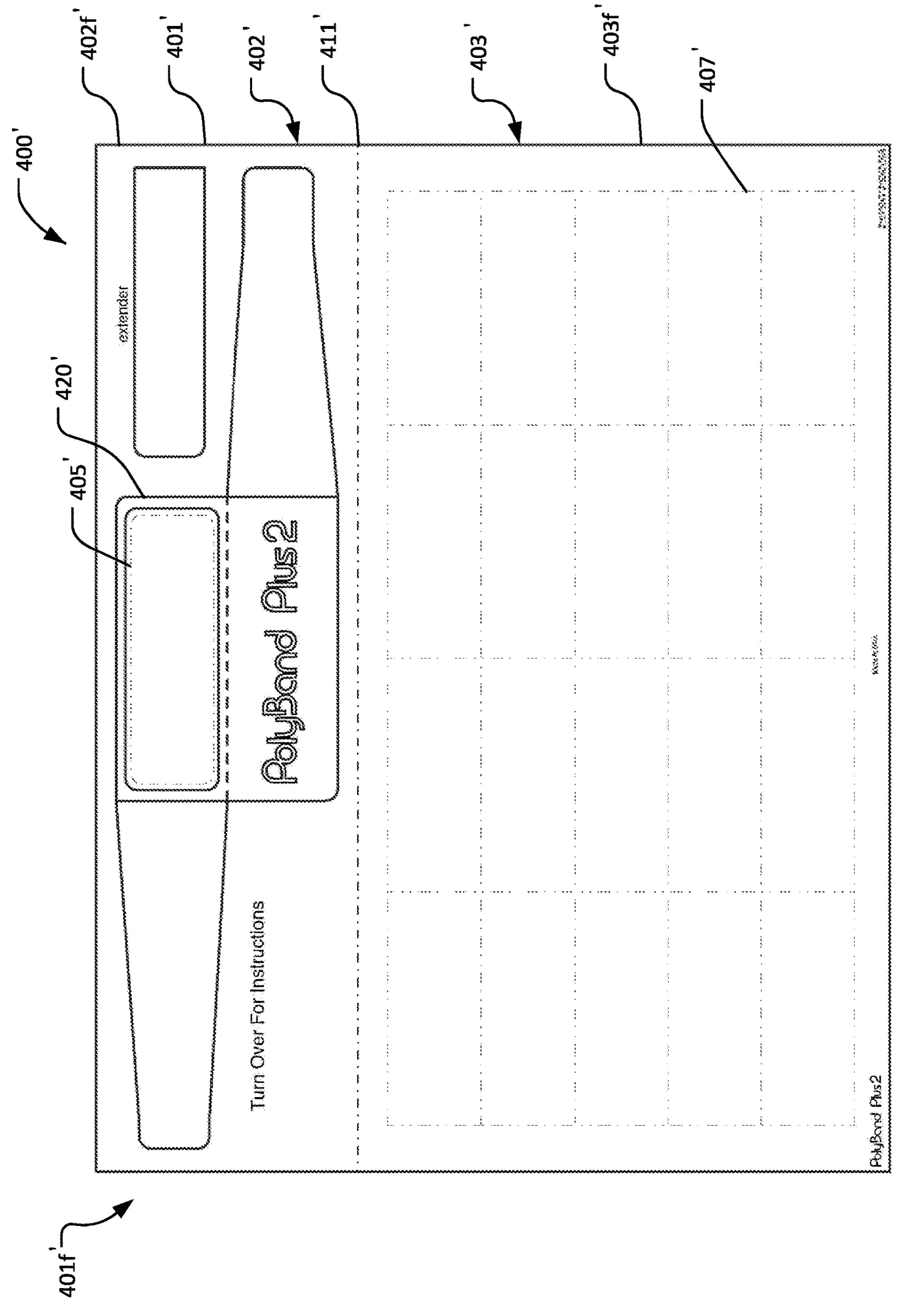
FIG. 39 is a front view of a front side of a combination wristband and label form according to another embodiment of the invention.
Figure 40:
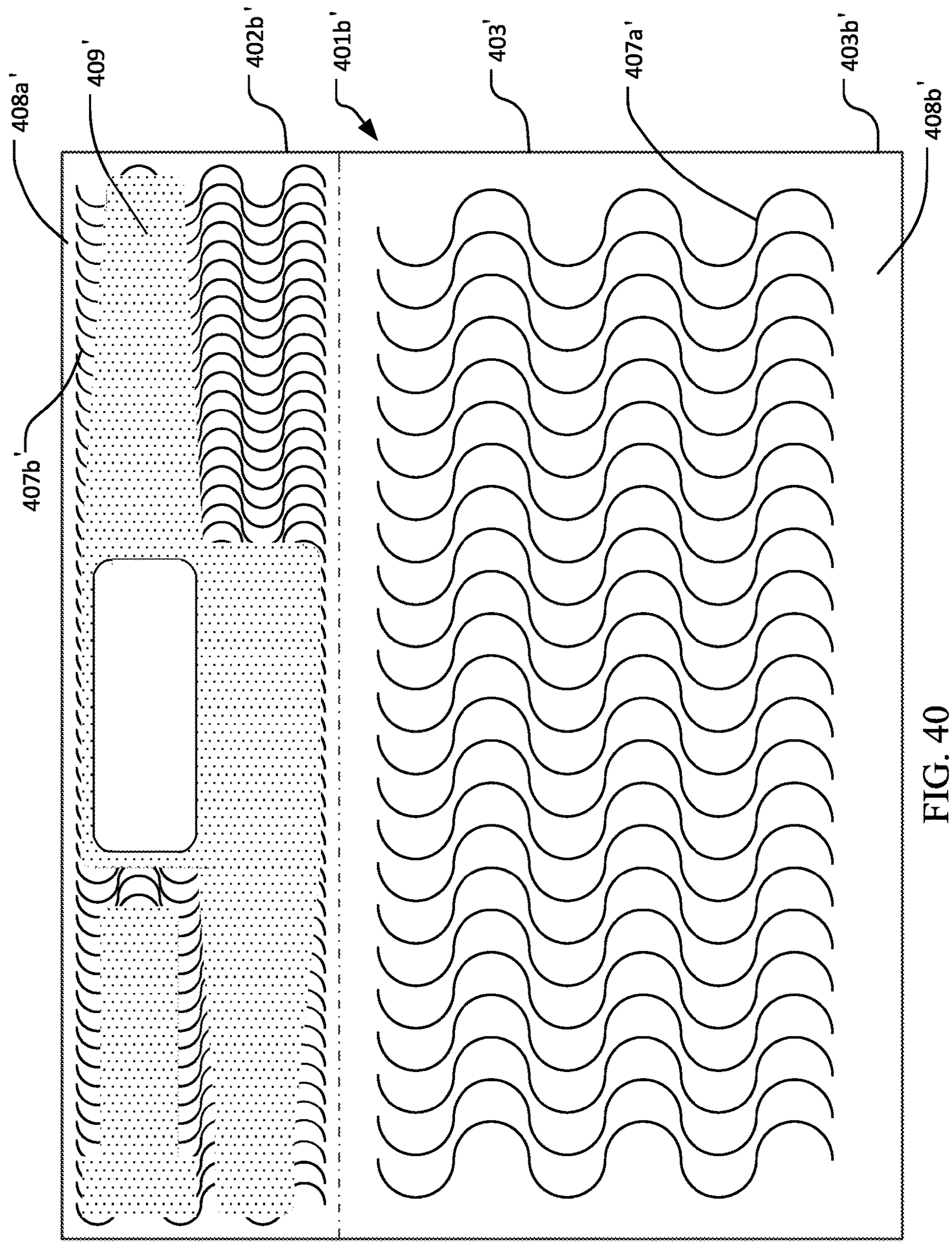
FIG. 40 is a back view of the front side of the combination wristband and label form of FIG. 39.

Moving on, FIGS. 39-42 illustrate yet another embodiment of a combination wristband and label form 400'. The form 400' includes a front sheet 401' adhered to a back sheet 440'. The front sheet 401' has a front side **401*f* and a back side 401*b*' (FIGS. 39 and 40, respectively). The front sheet 401' may in some embodiments be separated into a top portion 402' and a bottom portion 403' having a relatively small gap therebetween. The top portion 402' and the bottom portion 403' may thus each have a front face 402*f*' and 403*f*', and a back face 402*b*' and 403*b*', respectively. The top portion 402' and the bottom portion 403' may be separated by a perforation 411'**.

The front face **403*f* of the bottom portion 403' may include a plurality of labels 407'. As noted above, the labels 407' may be arranged in columns and rows, for example, 4×6. However, the labels 407' may be provided in any number of combinations of columns (e.g., 1, 2, 3, 4, etc.) and rows (e.g., 1, 2, 3, 4, etc.). The labels 407' may be configured to receive indicia. Accordingly, the front face 403*f*** may be constructed of paper or other appropriate textile sufficient for receiving ink, e.g., from a printer or other marking device.

The labels 407' may have a variety of constructions. For example, the figures illustrate the labels 407' as having a generally rectangular configuration. However, the labels 407' may be square, circular, polygonal, etc. Additionally, a combination of label configurations may be employed on a single form 400'.

The front face **402*f*' of the top portion 402' may comprise one or more outlines of a wristband 420'. An indicia-receiving area 405' may be defined within the outline 420', and may be die cut into the top portion. In some embodiments, rather than a die cut indicia-receiving area, a void may be formed into the top portion 402' such that a top portion back side 441*b*' (FIG. 42) of the back sheet 440' is accessible through the void. In embodiments, a generally opaque substance (e.g., one or more layers of translucent or opaque ink, paint, or other such coating) configured to receive indicia may be disposed on the top portion back side 441*b*' of the back sheet 440' in the area of the void to form the indicia-receiving area 405'. In these embodiments, the wristband may be completely devoid of the paper ply traditionally used for the printing of indicia on the wristband. More specifically, wristbands traditionally include a paper area (e.g., paper area 105' in FIG. 32) on which indicia is printed and which paper area is thereafter laminated by a panel of the wristband when the wristband is folded (e.g., along indentation 123' in FIG. 32). In embodiments of the present disclosure, however, the wristband may be devoid of the paper area; indicia may instead be printed directly onto the generally opaque coating (e.g., the generally opaque ink) and laminated thereafter by a wristband panel when the wristband is folded along indentation 423', as discussed herein. In these embodiments, the wristband itself may thus comprise only a single ply (formed, e.g., of polyester, plastic, fabric, and/or other suitable materials). The single-ply wristband may, in applications, be considered more desirable relative to the two-ply wristbands because of the lower manufacturing costs, reduced thickness, et cetera. In other embodiments, the indicia receiving area 405'** may comprise paper (i.e., the wristband may not be a single-ply wristband).

In any event, the indicia-receiving area 405' (both, in embodiments of the wristband comprising a paper area and in embodiments of the wristband devoid of the paper area) may be configured to be printable. In some embodiments, the form 400' may be configured to be passed through a printer so that indicia (e.g., patient name, patient medications, machine readable information such as barcodes, et cetera) may be printed directly on the wristband indicia-receiving area 405'. The indicia-receiving area 405' may face the same direction as the labels 407', making it easier for indicia to be simultaneously printed on the labels 407' and the indicia-receiving area 405'.

Attention is now directed to FIG. 40, which shows the back side **401*b*' of the front sheet 401' of the form 400'. The back side 401*b*' may include a top portion back face 402*b*' and a bottom portion back face 403*b*', which may be separated by a small gap. The bottom portion back face 403*b*' may include an adhesive area 407*a*'. The adhesive area 407*a*' may allow for the labels 407' to be releasably secured to the back sheet 440'. In embodiments, a perimeter 408*b*' is defined between an outside edge of the bottom portion back face 403*b*' and the adhesive area 407*a*'. The top portion back face 402*b*' may additionally have an adhesive area 407*b*'. The adhesive area 407*b*' may correspond to the area surrounding the wristband 420' which remains in place when the wristband 420' is removed from the form 400' as is described in greater detail below. Similarly, a perimeter 408*a*' may be defined between an outside edge of the top portion back face 402*b*' and the adhesive area 407*b*'**.

Figure 41:
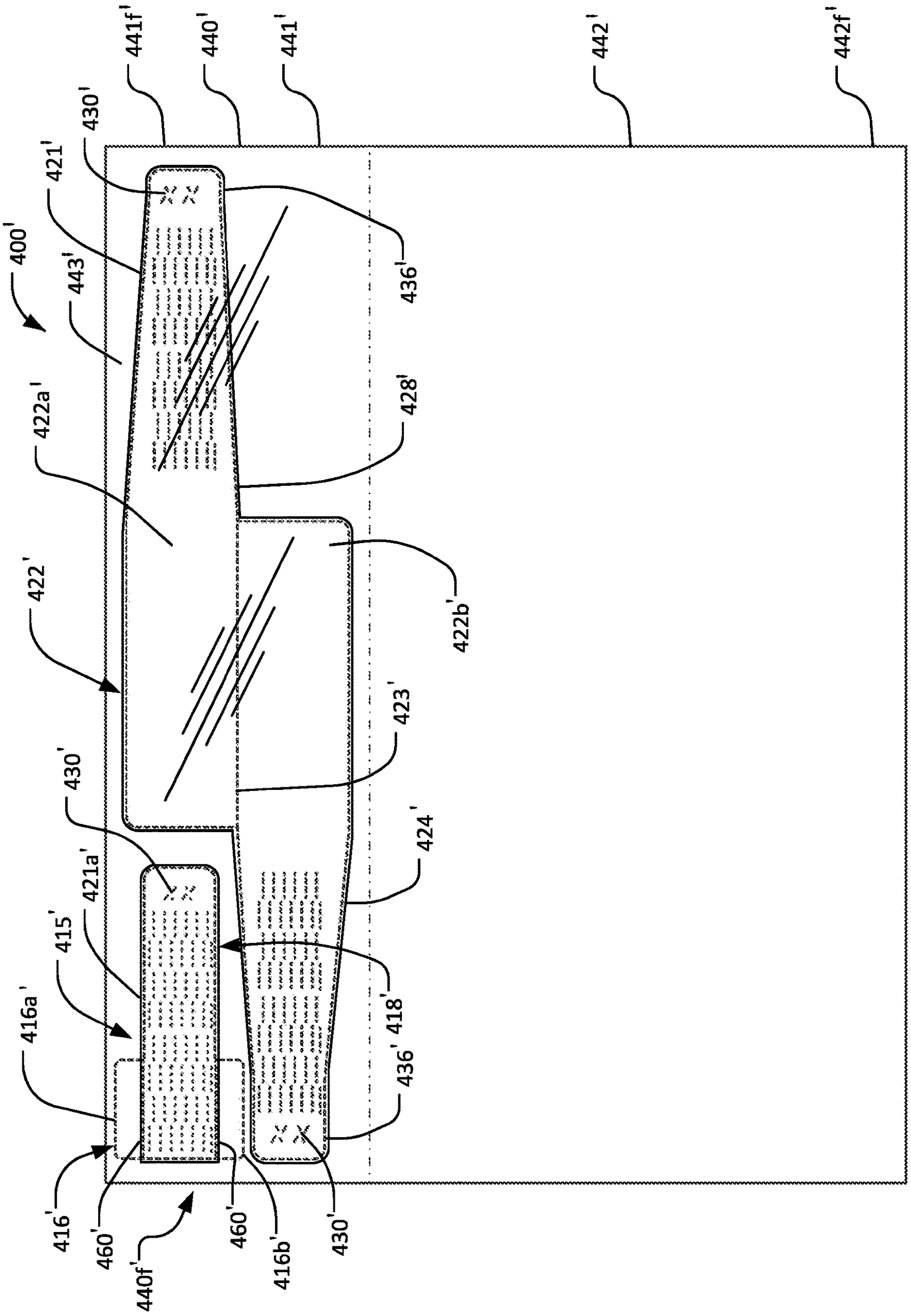
FIG. 41 is a front view of a back side of the combination wristband and label form of FIG. 40.
Figure 42:
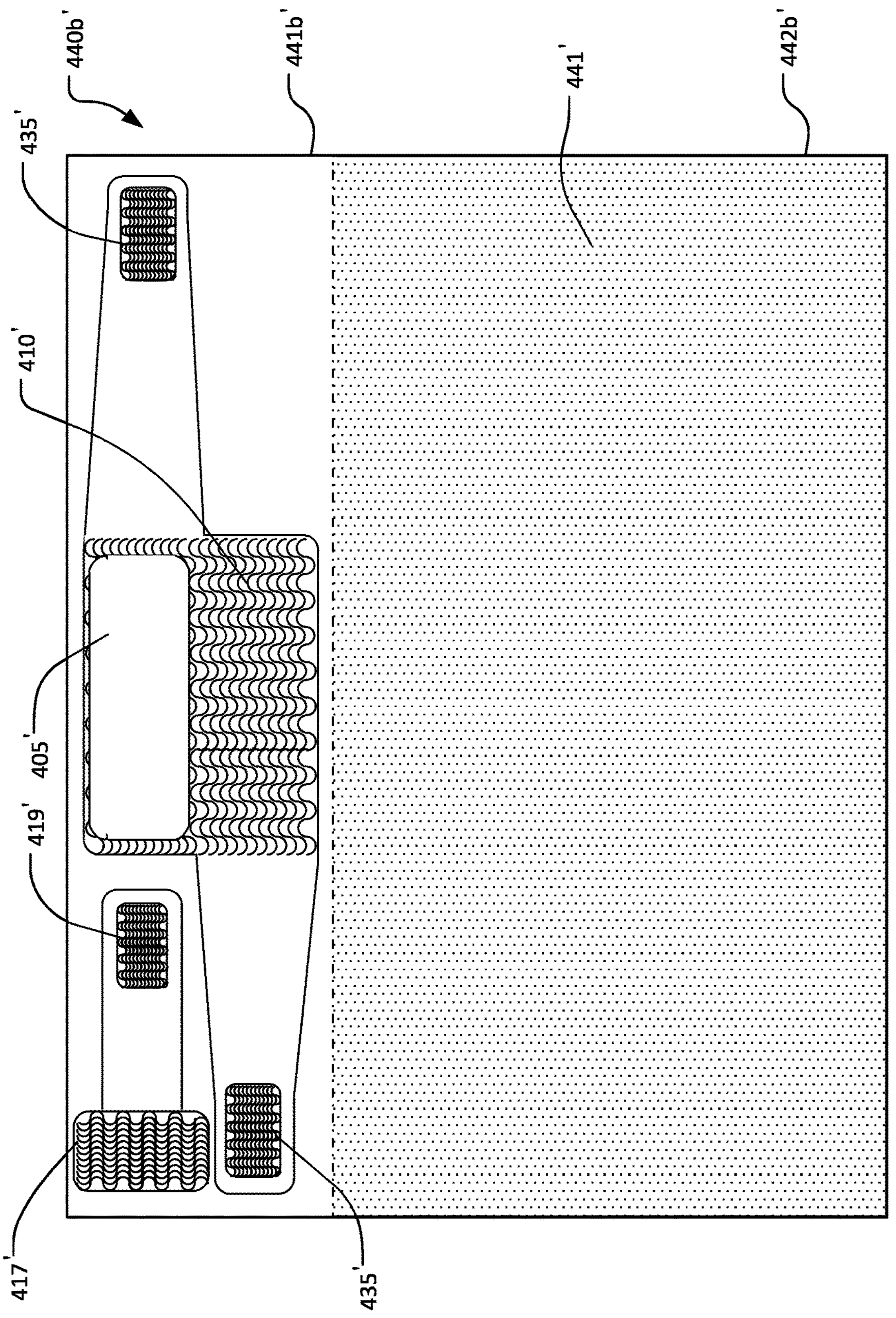
FIG. 42 is a back view of the back side of the combination wristband and label form of FIG. 41.

The adhesive areas **407*b*' and 407*a*' of the back faces 402*b*' and 403*b*' may allow adherence of the back side 401*b*' of the front sheet 401' to a back side 440*b*' of the back sheet 440', illustrated in FIG. 42. To prevent permanent adherence of the back side 440*b*' to the back side 401*b*', the back face 402*b*' of the top portion 402' may include a layer of silicone in the area corresponding to the die cut wristband 420', and may further include a layer of silicone in the area corresponding to the adhesive area 407*b*' (e.g., the adhesive area 407*b*' may be applied above the layer of silicone). Alternately, the back face 402*b*' may be devoid of silicone in the area corresponding to the adhesive area 407*b*' such that the back sheet top portion 441' is substantially permanently adhered to the front sheet top portion 402' in the area of the adhesive 407*b*'. In some embodiments, the silicone material (if present) may be applied in a pattern which may allow for a somewhat less permanent adhesion between the back sheet top portion 441' and the front sheet top portion 402' in the areas with patterned silicone. In any event, the area 443' of the back sheet top portion 441' surrounding the die cut wristband 421' (FIG. 41) will preferably remain in place upon removal of the wristband 421' from the form 400'**.

A bottom portion 442' of the back sheet 440' may be constructed of paper or a synthetic resin, and the back side **442*b*' of the bottom portion 442' may include a layer of silicone (or another similar release material) in an area generally corresponding to the adhesive area 407*a*'. The layer of release material allows the back sheet 440' to be removably adhered to the front sheet 401'. Thus, when combined, the back sheet bottom portion 442' is adhered to the front sheet bottom portion 403' via the adhesive 407***a*'. The back sheet bottom portion 442' remains adhered to the front sheet bottom portion 403' until it is removed (or a portion of it is removed) by a user.

As noted briefly above, the back sheet top portion 441' includes a die cut of a wristband 421' (FIG. 41). A die cut of other wristband accessories, such as a wristband extension 421*a*', may additionally be included in the back sheet top portion 441'. The wristband 421' may be defined by two laterally opposing sides (or ends) 424' and 428' which may extend directly (e.g., without a transition) from a central portion 422' having an upper portion 422*a*' and a lower portion 422*b*' separated by an indention 423'. The laterally opposing sides (or ends) 424' and 428' may extend from the lower portion 422*b*' and the upper portion 422*a*', respectively (or vice versa).

Similar to the other embodiments, the sides 424' and 428' extend directly from a central portion 422', without any transition, such as a shoulder, or other type of transition. With such a configuration, the material required for the wristband 421' may be less than otherwise may be required. Further, the design is sleek, having no protrusions or other unneeded and/or unwanted areas of material extending from the central portion 422' and/or the sides 424' and 428'.

The upper portion 422*a*' (or the lower portion 422*b*') of the central portion 422' may include a small indicia-receiving area 405' that is removed from the front sheet 401' along with the wristband 421'. The indicia-receiving area 405' may comprise a generally opaque printable coating (e.g., ink, paint, etc.) and the wristband may be a one-ply wristband (i.e., the indicia-receiving area 405' may be integral to the wristband); alternately, the indicia-receiving area 405' may comprise paper that is adhesively secured to the wristband and the wristband may be a two-ply wristband. Removal of the wristband 421' may leave a hole in the front sheet 401'.

The wristband 421' is configured to be self-laminating to protect the indicia-receiving area 405'. Accordingly, adhesive 410' may be applied to the wristband back side 441*b*' in an area surrounding the indicia-receiving area 405', as shown in FIG. 42. Adhesive 410' may not be present on the indicia-receiving area 405' itself. Further, adhesive 410' may be applied to the entire, or substantially entire, area of the central portion (either 422*a*' or 422*b*') that does not have the indicia-receiving area 405'. Upon removal of the wristband 421' from the form 400', the wristband 421' may be folded about the indention 423' such that the adhesive 410' on the central upper portion 422*a*' adheres to the adhesive 410' on the central lower portion 422*b*' sandwiching the indicia-receiving area 405' therebetween.

The laterally opposed sides 424' and 428' may contain an area of adhesive 435' (FIG. 42) on a backside of the wristband 421'. The adhesive 435' may keep the ends 424' and 428' of the wristband 421' secured to the front sheet back side top portion 402*b*'. The wristband 421' may be substantially held into position to the front sheet back side top portion 402*b*' via the adhesive areas 410' and 435'. The wristband 421' may contain no adhesive apart from that described above.

The laterally opposing sides 424' and 428' of the wristband 421' may be generally rectangular. In some embodiments, the sides 424' and 428' are entirely straight, without a taper. Alternately, as shown in the figures, the sides 424' and 428' may gradually taper towards the end and may conclude in a tongue 436'. The wristband 420' may alternately have other shapes, as desired. In embodiments, a height of the tongue 436' (e.g., at end 424') may be less than a height of the remainder of the wristband 421' (including being less than the height of the end 428').

The wristband 421' may be further equipped with security slits 430'. The security slits 430' may be configured to tear, should the wristband 421' be tampered with after the wristband 421' is applied to a wearer. This may be beneficial to ensure that the wristband 421' remains associated with the intended wearer, particularly in a healthcare environment where the wristband 421' includes patient-specific information.

Similar to the embodiments described above, in addition to the wristband 421', an extension portion 415' may be die cut into the top portion 441' of the backing sheet 440' to allow the wristband 421' to accommodate larger wrists. The extension portion 415' may include a first end 416' having an area of adhesive 417' on the backside thereof. A second end 418' may additionally have an area of adhesive 419' on the backside. Adhesive may not be located between the first and second ends of the extension portion 416' and 418', respectively. The first end 416' may additionally include arms 416*a*' and 416*b*' extending outwardly from the first end 416', and separated from the first end 416' by lines of perforation 460'. Adhesive may be located on the backside of the arms 416*a*' and 416*b*'. In some embodiments, the arms 416*a*' and 416*b*' may be separated from the first end 416' by tearing away at the lines of perforation 460'. In other embodiments, the extension first end 416' may be aligned with an end 424' or 428' of the wristband 120' and placed thereupon. The arms 416*a*' and 416*b*' may then be folded about the lines of perforation 460', one at a time, to further secured the extension 415' to the wristband 421'. Further, the extension 415' may further incorporate tamper evident slits 430'.

The top portion 441' of the back sheet 400' may be constructed of a synthetic material, such as polyester fabric or plastic, for example. Other materials may additionally, or alternately, be appropriate. Those of skill in the art may recognize that it may be beneficial for the wristband 421' material to be resistant to water or other liquid, which may cause the integrity of the wristband 421' to be prematurely compromised.

In use, after the wristband 421' has been printed, the user may remove the wristband 421' from the form 400' as described above regarding embodiments 100', 200', and/or 300'.

Figure 43:
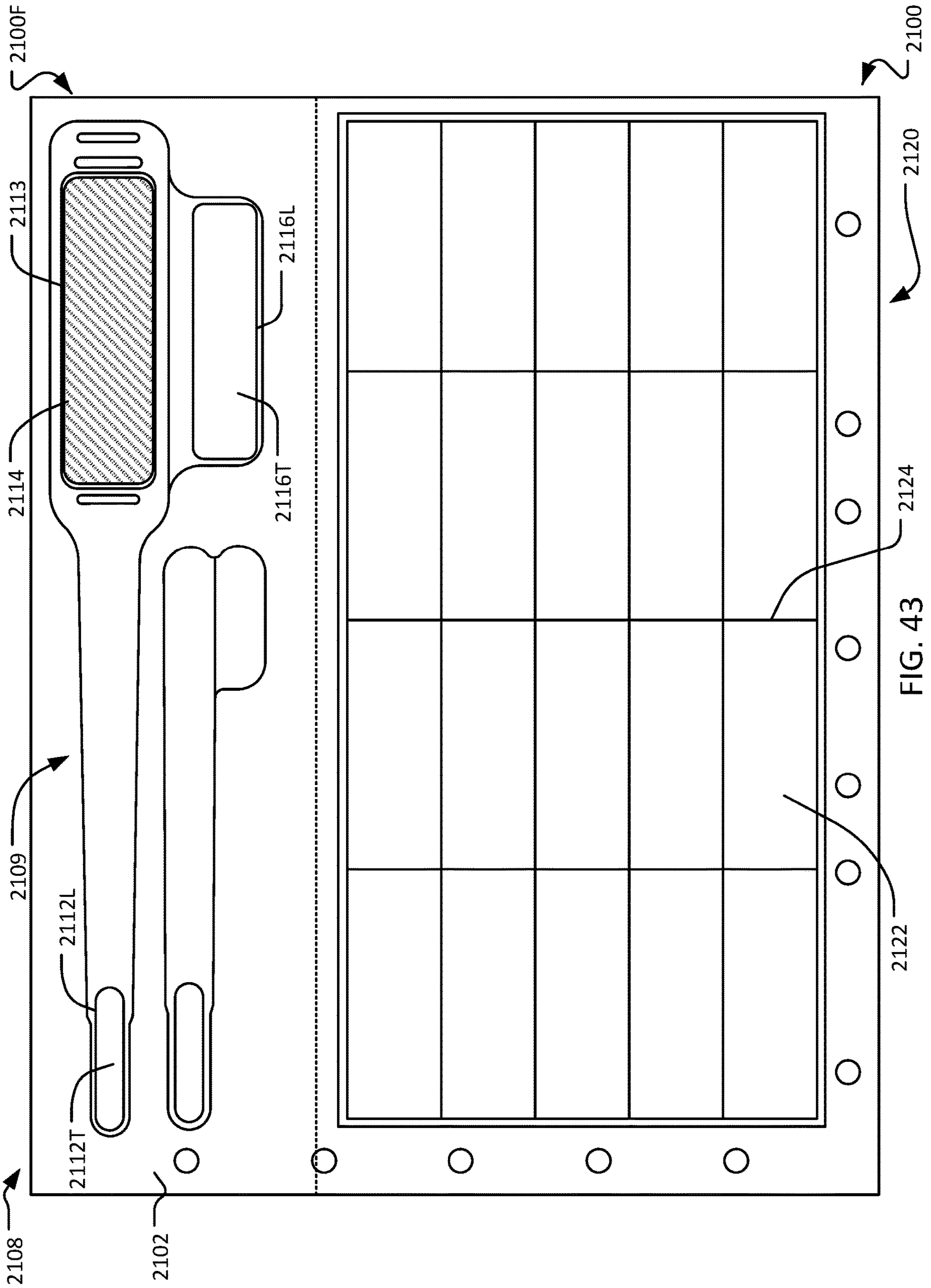
FIG. 43 shows a front view of a wristband label form with uneven lamination panels, according to an embodiment.
Figure 44:
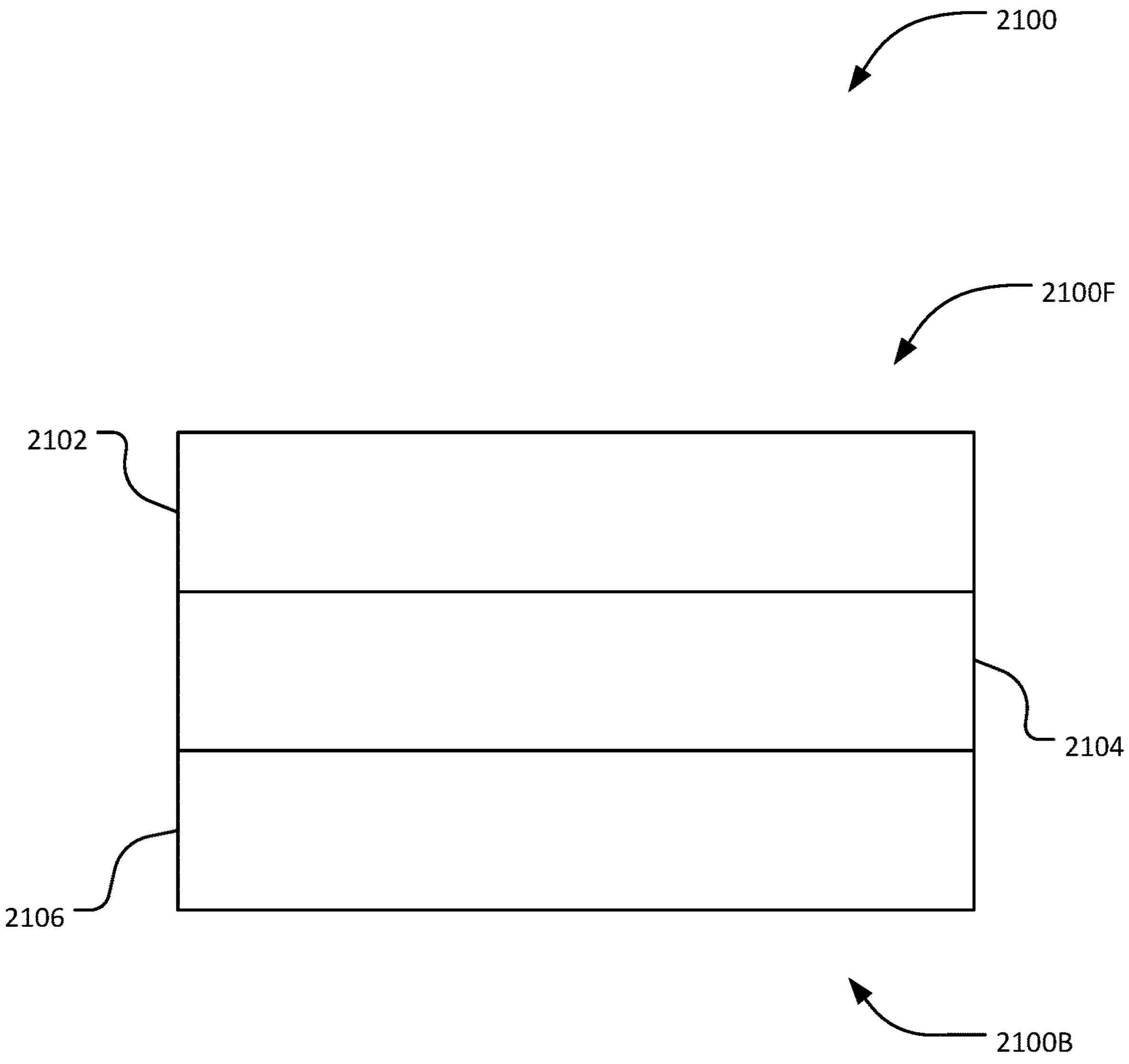
FIG. 44 shows a schematic view of the wristband label form with uneven lamination panels of FIG. 43.
Figure 45:
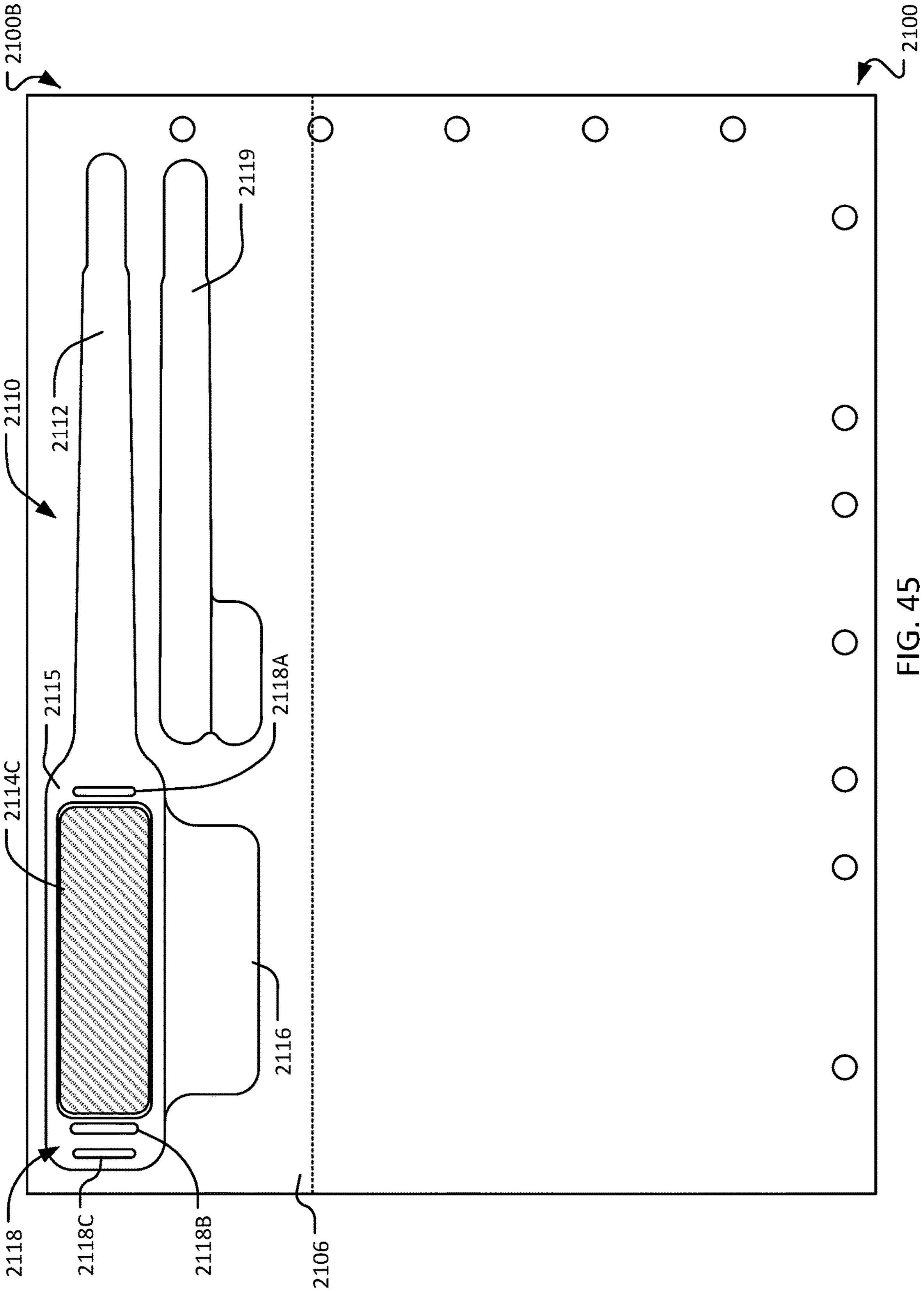
FIG. 45 shows a back view of the wristband label form with uneven lamination panels of FIG. 43.

FIGS. 43-45 show an embodiment 2100 of a wristband label form with uneven lamination panels (sometimes referred to herein as a "combo form" or a "business form"). The combo form 2100 may have a front side 2100F and a back side 2100B, and may include a paper ply 2102, a liner ply 2104, and a lamination ply 2106 (FIG. 44). The plies may be arranged as shown in FIG. 44; alternately, a portion of the back side 2100B (i.e., a portion opposite the chart labels 2122) may comprise the liner ply 2014 and a wristband portion 2108 may comprise the lamination ply 2016 such that the liner ply 2014 and the lamination ply 2016 are co-extensive on the back side 2100B.

The combo form 2100 front side 2100F may have a wristband portion 2108 with indicia 2109 defining a wristband 2110 (FIG. 45), and a label portion 2120. The label portion 2120 may occupy a lower section of the front side 2100F and may contain a plurality of labels 2122. The labels 2122 may be defined by lines of weakness 2124 (e.g., perforations, die cuts, etc.) that may be broken to remove the labels 2122 from the combo form 2100. The labels 2122 may be releasably secured to the liner ply 2104 by an adhesive (not shown). Once released from the combo form 2100, the labels 2122 may be adhered to a surface (e.g., a chart of the patient).

The wristband portion 2108 on the front side 2100F may have indicia 2109 that generally demarcates the wristband 2110 that is formed on the back 2100B of the combo form 2100 (i.e., the wristband 2110 may be composed of the liner ply 2104 and/or the lamination ply 2106 generally not visible in FIG. 43). That is to say, the wristband 2110 may not be present on the front side 2100F of the combo form 2100 and, in embodiments, the wristband 2110 may not include any portion of the paper ply 2102. In other embodiments, the wristband 2110, in an intermediate configuration, may include paper (e.g., paper that covers the adhesive portions of the wristband 2110 after the wristband 2110 is removed from the combo form), and the paper may be removed when securing the wristband 2110 to an appendage of the wearer.

FIG. 45 shows the wristband 2110 as it may appear on the back side 2100B of the combo form 2100. The wristband 2110 may include a strap 2112, an imaging area 2114, an upper lamination panel 2115, a lower lamination panel 2116, and an attachment portion 2118. In some embodiments, the wristband 2110 may include a separate extender 2119 that may be configured to be removably securable to the wristband 2110 to extend a length of the wristband 2110.

Each of the components of the wristband 2110 may be formed of the liner ply 2104 and/or the lamination ply 2106, and in embodiments, preferably the lamination ply 2106. In embodiments, the wristband 2110 may be die cut in the lamination ply 2106 and may be configured to be removed therefrom for use.

The strap 2112 may extend from the upper lamination panel 2115, and may be configured to wrap around an appendage (e.g., a wrist, an ankle, etc.) of the user. The wristband 2110 may be secured to the user by affixing the strap 2112 to the attachment portion 2118 (or other portion of the wristband 2110 such as the strap 2112 itself), after wrapping the strap 2112 around the appendage of the user. A portion (e.g., an end) of the strap 2112 may include adhesive (not shown) configured to affix to a surface, such as the attachment portion 2118. The paper ply 2102 may include lines of weakness 2112L (FIG. 43) that generally match the area of the strap 2112 that contains adhesive. When the wristband 2110 is removed from the combo form 2100, a tab or portion 2112T of the paper ply 2102, that is defined by the lines of weakness 2112L, may be pushed down and the wristband 2110 may thereafter be removed from the back side 2100B of the form 2100. The tab 2112T may prevent the strap 2112 adhesive from undesirably adhering to a surface until the strap 2112 is ready to be adhered. At that time, the tab 2112T is removed from the strap 2112 to expose the underlying adhesive.

The imaging area 2114 may be formed of the lamination ply 2106. In embodiments, the imaging area 2114 may be formed on a part of the upper lamination panel 2115. The imaging area 2114 may be visibly exposed through the front side 2100F (see FIG. 43). That is to say, the paper ply 2102 may have a void 2113 (e.g., a void formed by die cutting the paper ply 2102) and the imaging area 2114 in the lamination ply 2106 may be accessible from the front side 2100F of the form 2100 via this void 2113. Thus, indicia may be printed on the imaging area 2114 via the front side 2100F of the form 2100.

The imaging area 2114, at the front side 2100F of the form 2100, may be generally transparent. That is, patient-specific indicia may be printed on an area that is generally transparent. At the back side 2100B of the form 2100, the imaging area 2114 may contain a coating 2114C that is configured to increase visibility of indicia printed on the imaging area 2114 from the front side. For example, the coating 2114C may be opaque or generally opaque so it enhances visibility of the indicia printed on the front side of the imaging area 2114.

In embodiments, the coating 2114C may be inset from the void 2113 on one or more sides (e.g., on all four sides). That is to say, a portion of the lamination ply 2106 that is accessible via the void 2113 at the front side 2100F of the form 2100 may not include the coating 2114C on the back side thereof, and another portion of the lamination ply 2106 that is accessible through the void 2113 at the front side 2100F of the form 2100 may include coating 2114C on the back side thereof. Thus, the imaging area 2114 (i.e., the portion of the lamination ply 2106 configured to receive patient-specific indicia) may not be defined by the void 2113, but rather by the coating 2114C. In this way, the shape of the imaging area 2114 may be easily modified to suit a particular application by simply changing the shape of the coating 2114C applied to the lamination ply 2106.

The lower lamination panel 2116 may be smaller than both the upper lamination panel 2115 and the imaging area 2114. Specifically, in an embodiment, the lower lamination panel 2116 may have dimensions such that when the wristband 2110 is removed from the combo form 2100 and the lower lamination panel 2116 is folded over the imaging area 2114, one or more edges of the lower lamination panel 2116 may be inwardly adjacent the corresponding edges of the imaging area 2114. Thus, the lower lamination panel 2116 may not encapsulate or surround the imaging area 2114 when folded over, but rather may be inset from the imaging area 2114. In an embodiment, the folded lower lamination panel 2116 may be inset from the edges of the imaging area 2114 on at least three sides.

Similar to the strap 2112, the lower lamination panel 2116 may be at least partially covered by an adhesive (not shown). The face ply 2102 may include lines of weakness 2116L (FIG. 43) in the paper ply 2102 that generally match the area of the lower lamination panel 2116 that contains adhesive. When the wristband 2110 is removed from the combo form 2100, a tab or portion 2116T of the paper ply 2102, that is defined by the lines of weakness 2116L, may be removed with the wristband 2110. The tab 2116T may prevent the lower lamination panel 2116 from undesirably adhering to a surface until the lower lamination panel 2116 is ready to be adhered. When ready for use, the tab 2116T may be removed from the lower lamination panel 2116 to expose the underlying adhesive for adherence, such as to the upper lamination panel 2115. When the upper lamination panel 2115 and the lower lamination panel 2116 are affixed to each other via the adhesive, the panels 2115 and 2116 may protect the indicia printed on the imaging area 2114.

When the wristband 2110 is removed from the combo form 2100 and the lower lamination panel 2115 is folded over and adhesively fixed to the upper lamination panel 2116, the resulting wristband 2110 construction may be formed of a solitary ply and may be devoid of the paper ply 2102. To illustrate, when viewed from the side and going down the layers (not including any adhesive layer), the constructed wristband 2110 may first include the lower lamination panel 2116, then the indicia printed on the imaging area, then the upper lamination panel 2115, and finally the coating 2114C. Such a constructed wristband 2110 may provide an area with printed indicia having enhanced visibility due to the coating 2114C, and the indicia may be protected by the folded panels 2115 and 2116. Because the liner ply 2104 and/or the lamination ply 2106 may be opaque or translucent, the printed indicia may be visible through the folded lower lamination panel 2116.

The attachment portion 2118 may have one or more slots or apertures configured to receive the strap 2112 for securing the wristband 2110 to the user. For example, there may be slots 2118A, 2118B, and 2118C (FIG. 45) arranged along the wristband 2110. In embodiments, the slot 2118A may be adjacent the strap 2112 on one side of the imaging area 2114, and the slots 2118B and 2118C may be located on the opposing side of the imaging area 2114. In use, the strap 2112 may be wrapped around the appendage of the user and passed through one or more of the slots 2118A, 2118B, and 2118C to secure the wristband 2110 to the appendage.

Figure 46:
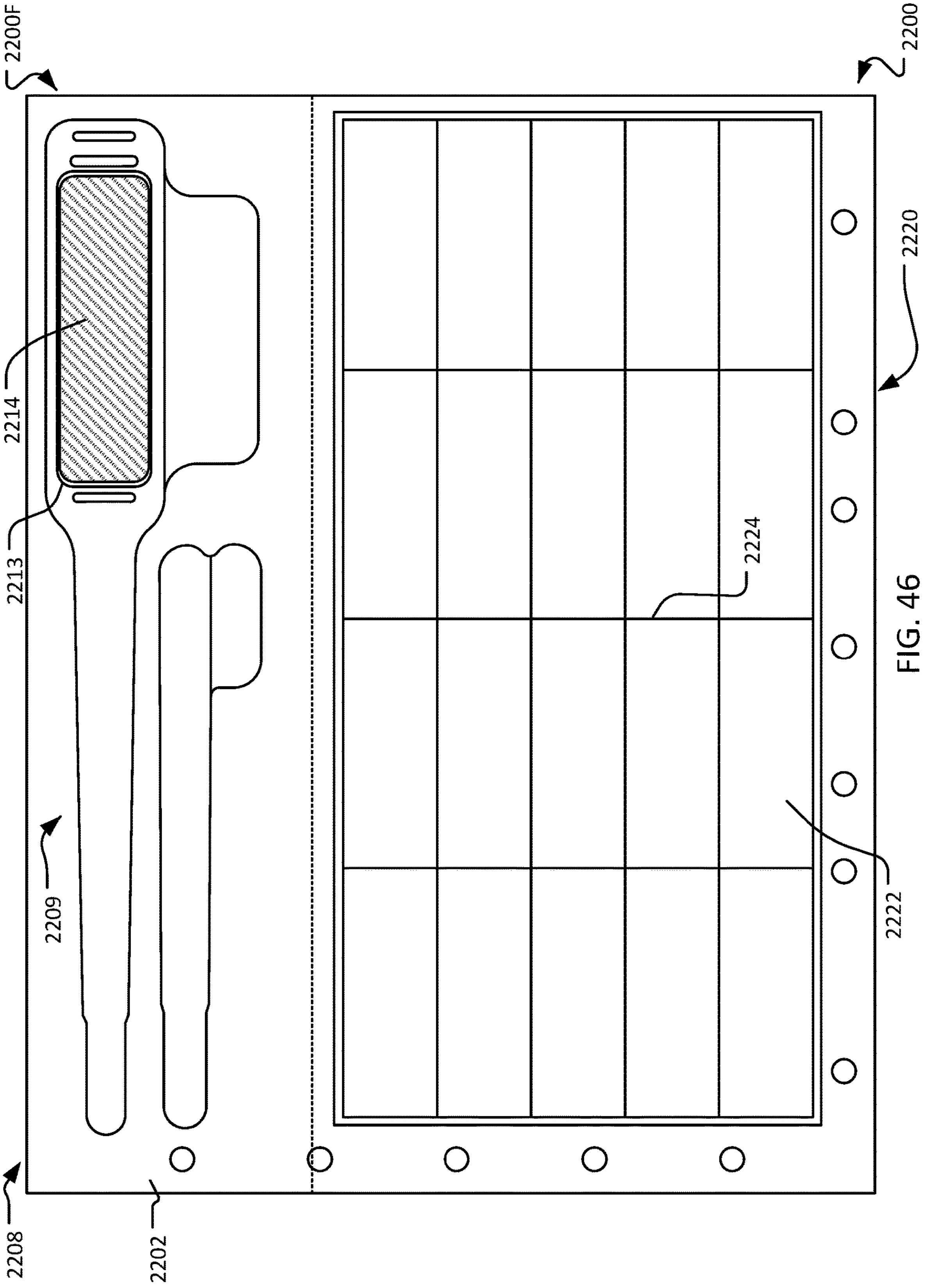
FIG. 46 shows a front view of a wristband label form with uneven lamination panels, according to another embodiment.
Figure 47:
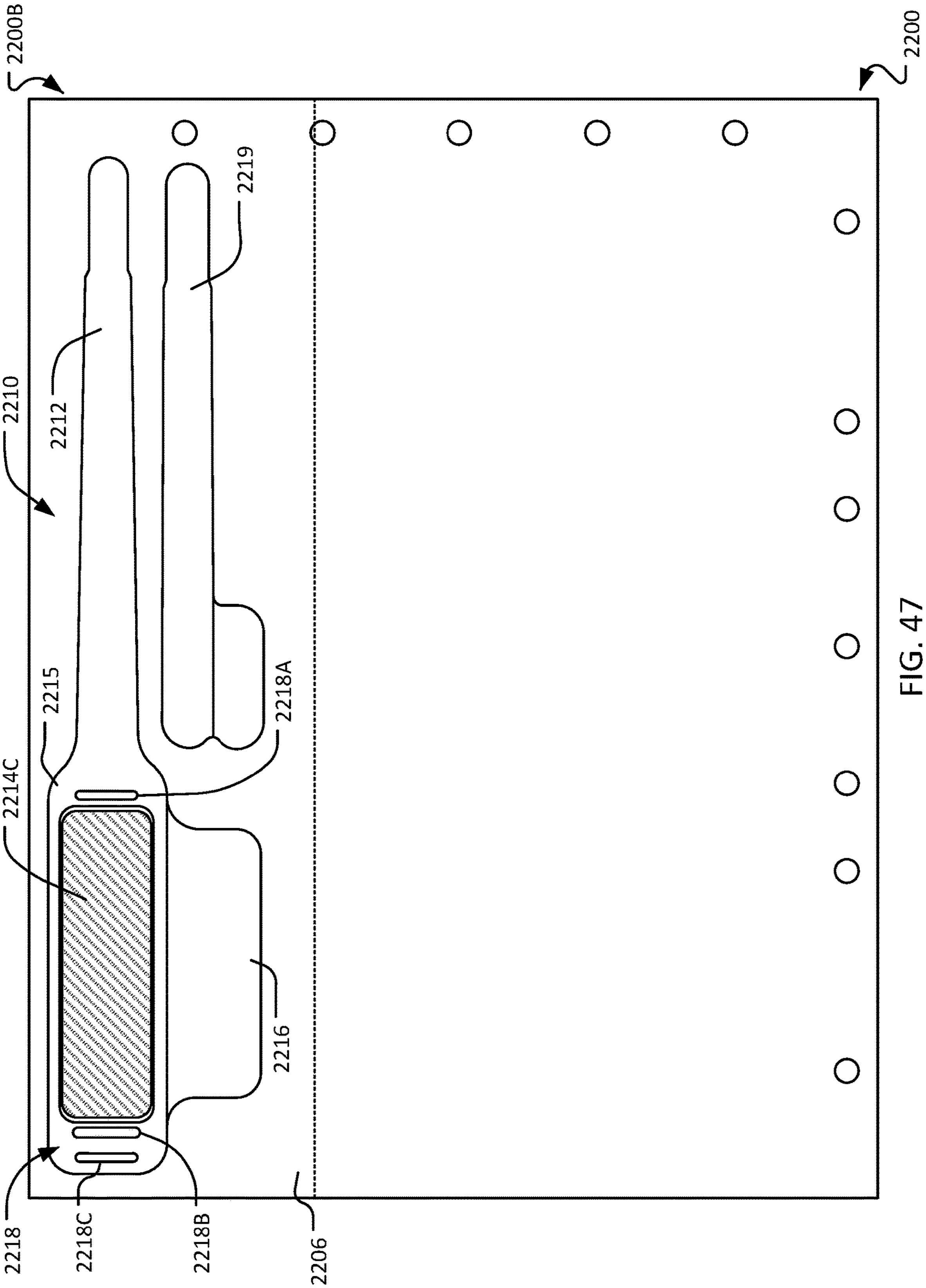
FIG. 47 shows a back view of the wristband label form with uneven lamination panels of FIG. 46.

FIGS. 46 and 47 show a front side 2200F and a back side 2200B, respectively, of an embodiment 2200 of the combo form that is substantially similar to the combo form 2100 except where expressly noted or otherwise implied. For example, the front side 2200F may be substantially the same or similar to the front side 2100F, the wristband portion 2208 may be substantially the same or similar to the wristband portion 2108, the label portion 2220 may be substantially the same or similar to the label portion 2120, the plurality of labels 2222 may be substantially the same or similar to the plurality of labels 2122, the lines of weakness 2224 may be substantially the same or similar to the lines of weakness 2124, the paper ply 2202 may be substantially the same or similar to the paper ply 2102, the wristband indicia 2209 may be substantially the same or similar to the wristband indicia 2109, the imaging area 2214 may be substantially the same or similar to the imaging area 2114, the coating 2214C may be substantially the same or similar to the coating 2114C, et cetera.

However, the combo form 2200 may be devoid of the tabs 2112T, 2116T and the lines of weakness 2112L, 2116L. In operation, this may mean that no portion of the paper ply 2202 comes with the wristband 2210 when the wristband 2210 is removed from the combo form 2200. To put it another way, the wristband 2210 may be formed entirely of a single ply (i.e., the lamination ply 2206). Therefore, the adhesive (not shown) located on the strap 2212 and the lower lamination panel 2216 may be exposed by virtue of the removal of the wristband 2210 from the combo form 2200.

The artisan would recognize that features of the forms 2100 and 2200 may be readily modified in view of features of the other business forms described herein, such as by including additional adhesives, wristbands, labels, tags, extenders, et cetera.

Many different arrangements of the various components depicted, as well as components not shown, are possible without departing from the spirit and scope of the present disclosure. Embodiments of the present disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the present disclosure. It will be understood that certain features and sub-combinations are of utility and may be employed without reference to other features and sub-combinations.

The invention claimed is:

1. A combination wristband and label form, comprising:
- a front side formed of paper, said front side comprising:
  - a first portion having a plurality of labels die cut therein; and
  - a second portion having a printable area associated therewith;
- a back side comprising a polyester section, said polyester section comprising a first section and a second section, said first section being removable from said form and said second section being permanently adhered to said form, said first section comprising a removable wristband and a removable extender, said wristband having a first panel and a second panel, a first strap extending outboard from said first panel and a second strap extending outboard from said second panel, said first panel having defined therein said printable area and a surrounding area surrounding said printable area, a size of said printable area being disparate from a size of said first panel, said second panel configured to folded over said first panel;
- wherein:
  - at least said second panel, said surrounding area of said first panel, said first strap, and said second strap are each devoid of paper;
  - said wristband is devoid of paper.

2. The combination wristband and label form of claim 1, wherein said wristband is formed of a solitary ply.

3. The combination wristband and label form of claim 1, wherein said printable area is defined by a coating configured to accept printed indicia.

4. The combination wristband and label form of claim 3, wherein said second panel is configured to laminate said printed indicia.

5. The combination wristband and label form of claim 1, wherein a size of said first panel and said second panel is disparate.

6. The combination wristband and label form of claim 1, wherein said extender is devoid of paper.

7. A combination wristband and label form, comprising:
- a front side formed of paper, said front side comprising:
  - a first portion having a plurality of labels die cut therein; and
  - a second portion having associated therewith an imaging area;
- a back side comprising a polyester section, said polyester section comprising a removable section and a fixed section, said removable section comprising a removable wristband and an extender, said wristband defined by die cuts in said polyester section and comprising a first panel and a second panel, said first panel having the imaging area and a surrounding area surrounding said imaging area, said second panel configured to laminate said imaging area, and a first strap extending outboard of said first panel and a second strap extending outboard of said second panel;
- wherein:
  - no adhesive is associated with said imaging area;
  - said wristband is formed of a solitary ply.

8. The combination wristband and label form of claim 1, wherein said imaging area is defined by a coating configured to accept printed indicia.

9. The combination wristband and label form of claim 8, wherein said second panel is configured to laminate said printed indicia.

10. The combination wristband and label form of claim 7, wherein said wristband is devoid of paper.

11. The combination wristband and label form of claim 7, wherein a size of said first panel and said second panel is disparate.

12. The combination wristband and label form of claim 7, wherein said extender is devoid of paper.

13. A combination wristband and label form, comprising:

a front side formed of paper, said front side comprising:

a first portion having a plurality of labels die cut therein; and a second portion having associated therewith an imaging area;

a back side comprising a polyester section, said polyester section comprising a removable section and a fixed section, said removable section comprising a removable wristband and an extender, said wristband defined by die cuts in said polyester section and comprising a first panel and a second panel, said first panel having the imaging area and a surrounding area surrounding said imaging area, said second panel configured to laminate said imaging area, and a first strap extending outboard of said first panel and a second strap extending outboard of said second panel;

wherein:

said imaging area comprises printable coating;

said wristband is formed of a solitary ply.

14. The combination wristband and label form of claim 13, wherein said form includes a tag.

15. The combination wristband and label form of claim 14, wherein said tag is devoid of paper.

16. The combination wristband and label form of claim 13, wherein said first strap has a tapered section.

* * * * *